(12) United States Patent
Shin et al.

(10) Patent No.: US 8,482,709 B2
(45) Date of Patent: Jul. 9, 2013

(54) LIQUID CRYSTAL DISPLAY

(75) Inventors: Kyoungju Shin, Hwaseong-si (KR); YongHwan Shin, Yongin-si (KR); Janwoo Lee, Suwon-si (KR); Young Gu Kim, Hwaseong-si (KR); Hyeongchan Ko, Seoul (KR); Hyunku Ahn, Hwaseong-si (KR); Baekkyun Jeon, Yongin-si (KR); Kyoungtae Kim, Osan-si (KR); Gyo Jic Shin, Hwaseong-si (KR); Tai-Huem Om, Asan-si (KR); Min-Sik Jung, Seoul (KR); Hoi-Lim Kim, Seoul (KR); Jin-Soo Jung, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 109 days.

(21) Appl. No.: 13/086,126

(22) Filed: Apr. 13, 2011

(65) Prior Publication Data

US 2011/0261307 A1    Oct. 27, 2011

(30) Foreign Application Priority Data

Apr. 22, 2010  (KR) ........................ 10-2010-0037539
May 7, 2010    (KR) ........................ 10-2010-0043073
Nov. 19, 2010  (KR) ........................ 10-2010-0115819

(51) Int. Cl.
*G02F 1/1337*    (2006.01)

(52) U.S. Cl.
USPC ........................................ 349/129

(58) Field of Classification Search
USPC .......................................................... 349/129
See application file for complete search history.

(56) References Cited

U.S. PATENT DOCUMENTS

| 7,092,060 | B2 | 8/2006 | Yoo |
| 7,161,649 | B2 | 1/2007 | Lee et al. |
| 7,365,817 | B2 | 4/2008 | Kwon et al. |
| 7,532,281 | B2 | 5/2009 | Kim et al. |

FOREIGN PATENT DOCUMENTS

| JP | 2001-281696 A | 10/2001 |
| JP | 2008-145700 A | 6/2008 |
| JP | 2009-080197 A | 4/2009 |
| JP | 2009-109767 A | 5/2009 |
| KR | 1020000009518 A | 2/2000 |
| KR | 1020000061368 A | 10/2000 |
| KR | 1020010102744 A | 11/2001 |
| KR | 100510437 B1 | 8/2005 |
| KR | 1020070028138 A | 3/2007 |

*Primary Examiner* — Phu Vu
(74) *Attorney, Agent, or Firm* — Innovation Counsel LLP

(57) ABSTRACT

In a liquid crystal display, a first alignment layer formed on a first substrate includes a first region aligned in a first direction and a second region aligned in a second direction opposite to the first direction, and a second alignment layer formed on a second substrate facing the first substrate includes a third region aligned in a third direction different from the first direction and a fourth region aligned in a fourth direction opposite to the third direction. The liquid crystal molecules interposed between the first and second alignment layers are aligned in different directions in different domains defined by the first to fourth regions. A pixel electrode includes an extension part extending in at least one of the first to fourth directions. The aperture ratio and the light transmittance of the liquid crystal display are improved.

53 Claims, 36 Drawing Sheets

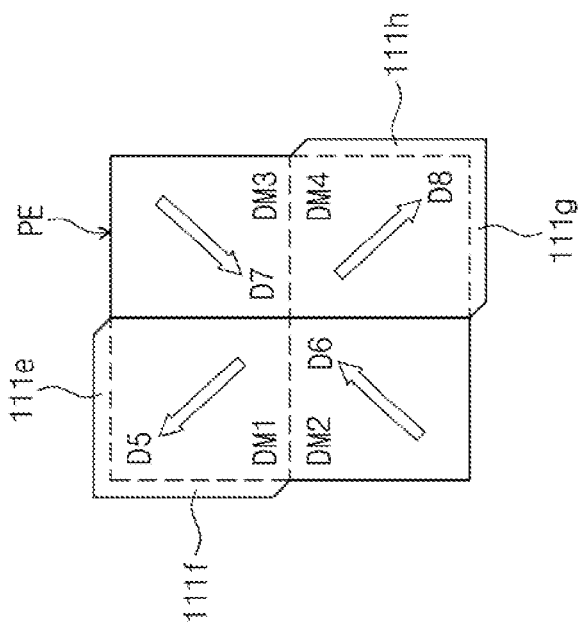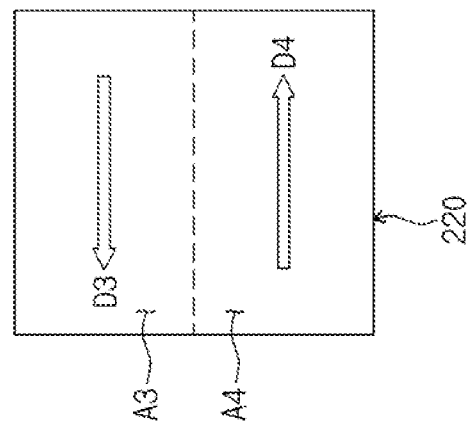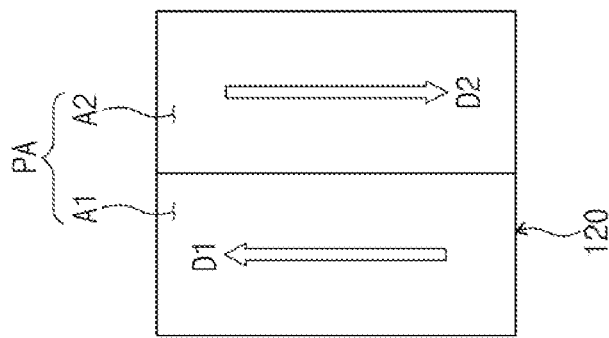

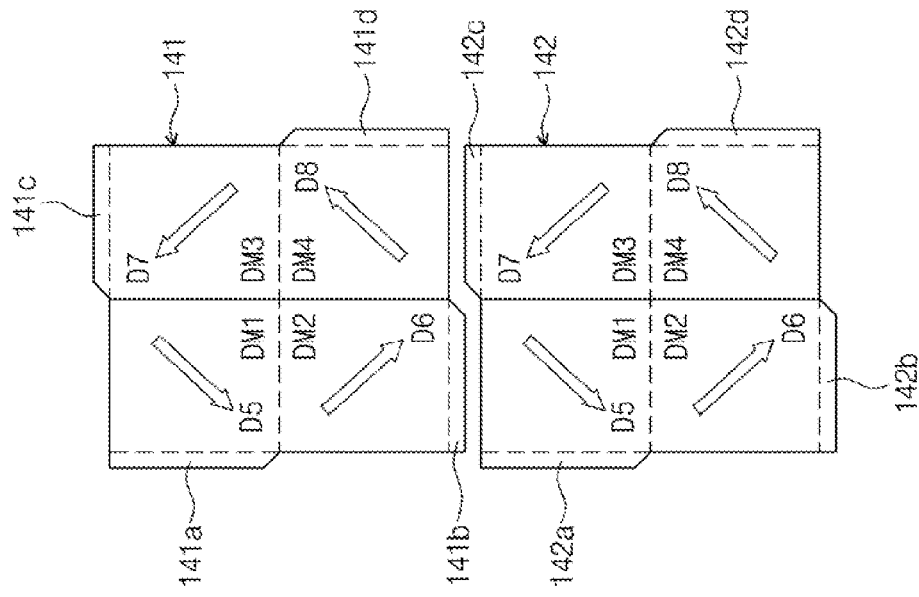
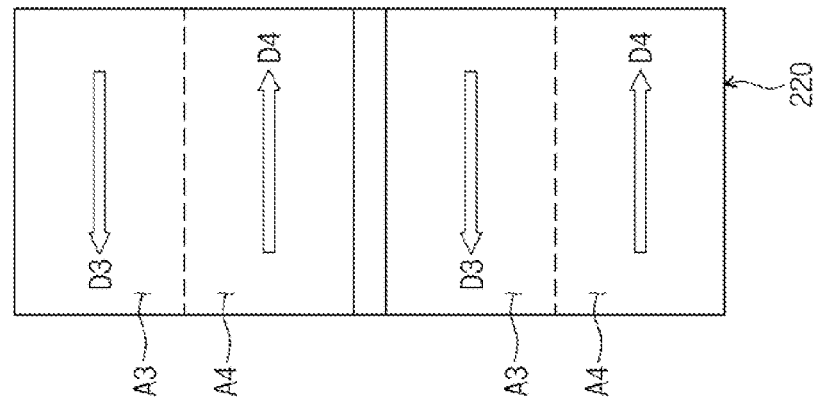
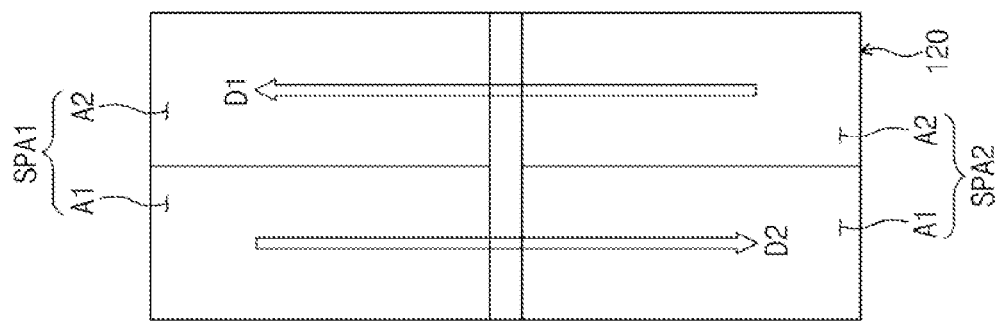

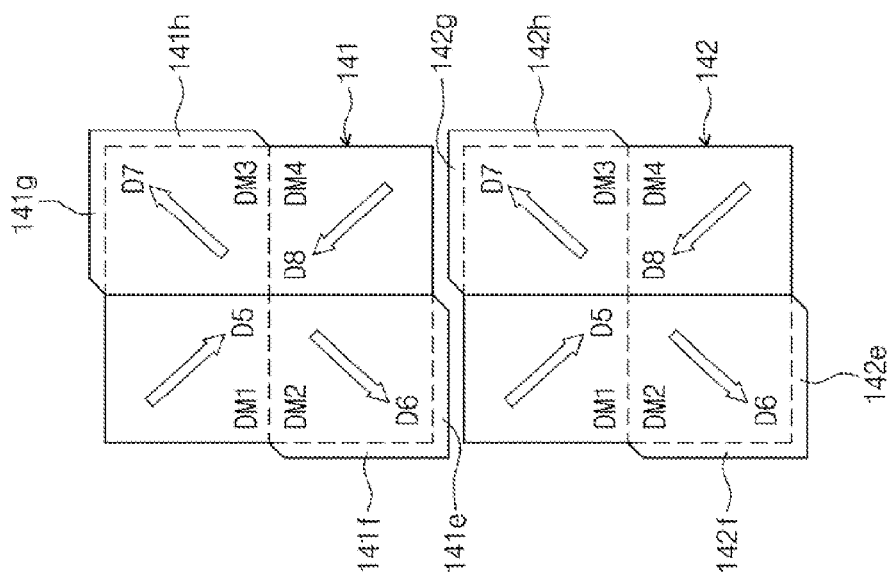
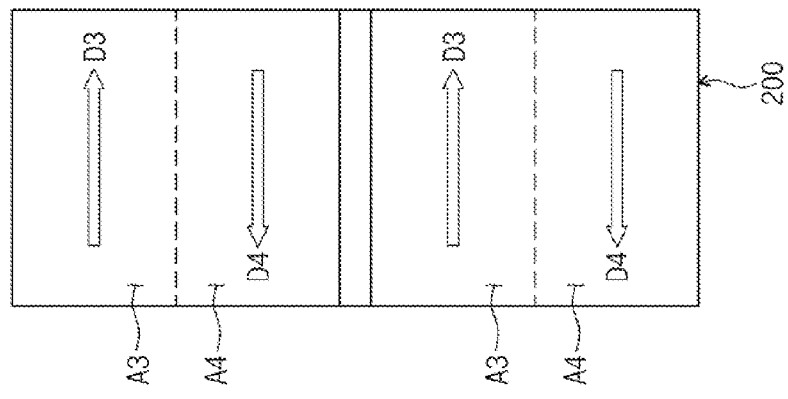
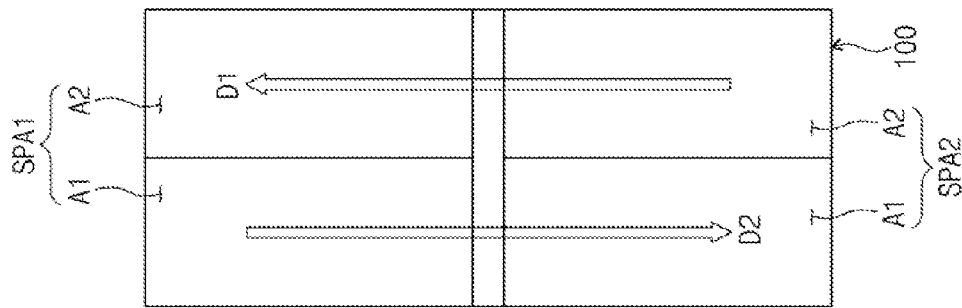

Fig. 32
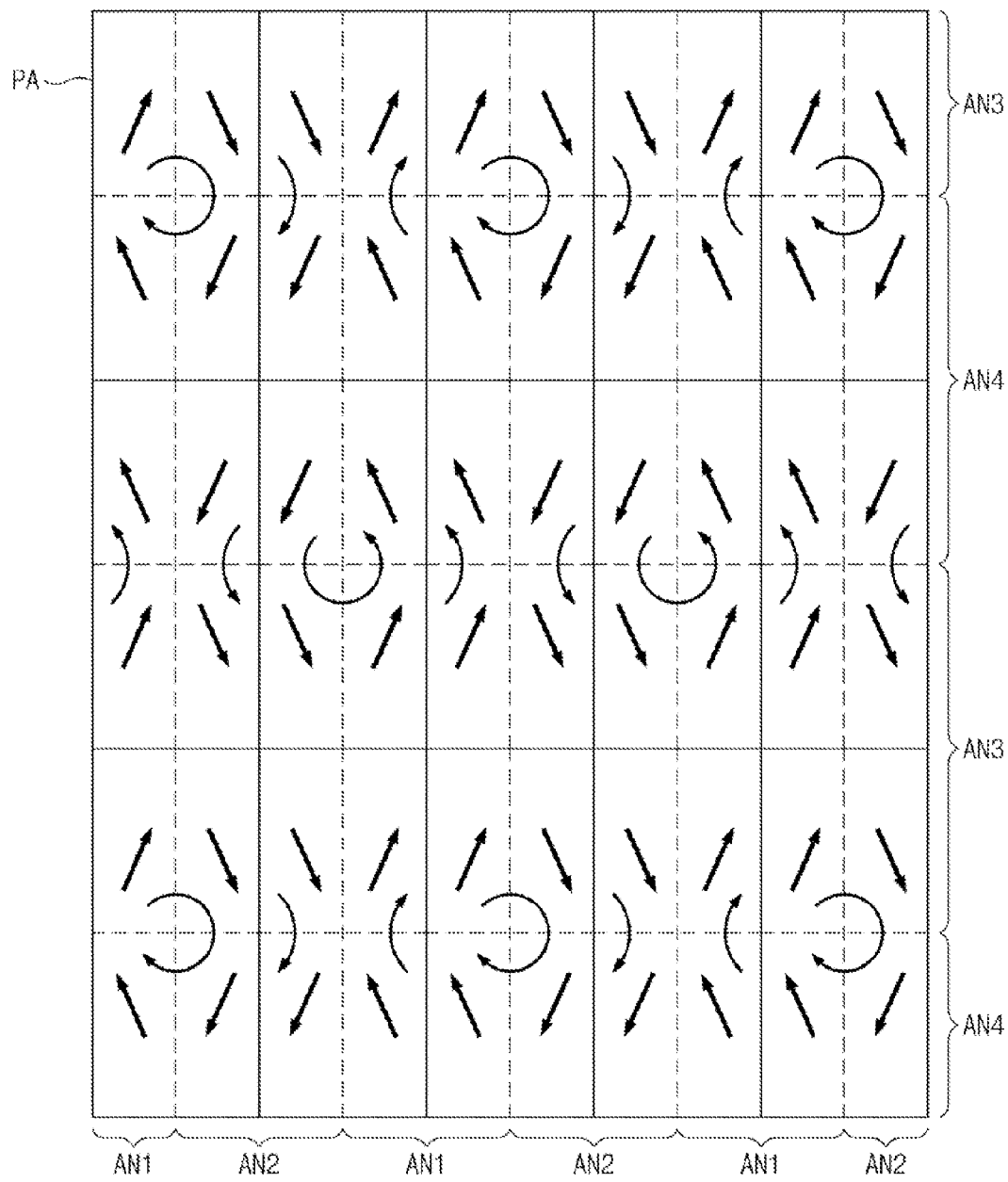
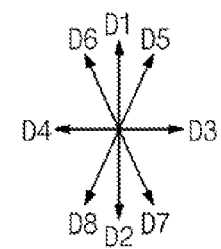

LIQUID CRYSTAL DISPLAY

CROSS-REFERENCE TO RELATED APPLICATION

This application relies for priority upon Korean Patent Application Nos. 10-2010-0115819, 10-2010-0043073 and 10-2010-0037539 filed, respectively, on Nov. 19, 2010, May 7, 2010 and Apr. 22, 2010, the contents of which are herein incorporated by reference in their entirety.

BACKGROUND OF THE INVENTION

1. Field of the Invention

The present invention relates to a liquid crystal display. More particularly, the present invention relates to a liquid crystal display having improved display quality.

2. Description of the Related Art

In general, a liquid crystal display (LCD) displays an image by applying a voltage to a liquid crystal layer, which controls the transmittance of light passing through the liquid crystal layer. However, because light is transmitted in the alignment direction of the liquid crystal molecules, the LCD may have a relatively narrow viewing angle as compared with other display apparatuses.

In this regard, PVA LCDs (patterned vertical alignment mode LCD) and SPVA LCDs (super patterned vertical alignment mode LCD) have been developed. In PVA LCDs and SPVA LCDs each pixel is divided into a number of domains and the liquid crystal molecules in each domain are aligned in different directions. Vertical alignment liquid crystals are used in PVA and SPVA LCDs, and the multiple domains are formed in each pixel by forming slit opening patterns having a predetermined size in the pixel electrode and in the common electrode that faces the pixel electrode.

However, an additional process is necessary to form the slit opening patterns, and the aperture ratio may be reduced due to the slit opening patterns.

SUMMARY OF THE INVENTION

An LCD with improved display quality due to an increase in the aperture ratio and light transmittance is provided.

In one aspect, a liquid crystal display includes a first substrate, an alignment layer, a second substrate and a liquid crystal layer.

The first substrate includes a plurality of pixel electrodes, each pixel electrode corresponding to one of a plurality of pixel areas, and the second substrate includes a common electrode facing the pixel electrodes. The alignment layer is interposed between the first and second substrates and includes a first region aligned in a first direction, a second region aligned in a second direction different from the first direction, a third region aligned in a third direction different from the first direction, and a fourth region aligned in a fourth direction opposite to the third direction. The liquid crystal layer includes liquid crystal molecules interposed between the first and second substrates in such a manner that the liquid crystal molecules are aligned in different directions in each of a plurality of domains in the liquid crystal layer, the domains defined in each pixel area by the first to fourth regions.

In this case, each pixel electrode includes an extension part extending outward from the pixel electrode in at least one of the first to fourth directions at a portion of the pixel electrode corresponding to at least one of the domains.

In another aspect, a liquid crystal display includes a first substrate having a plurality of pixels, a second substrate facing the first substrate, and a liquid crystal layer interposed between the first and second substrates.

Each pixel includes a plurality of domains, within each domain the liquid crystal molecules are aligned in substantially the same direction, and the direction the liquid crystal molecules are aligned is different for each domain. At least one of the first and second substrates includes a light blocking layer positioned at a boundary between at least two of the domains. An end of the light blocking layer is chamfered in a direction parallel to one of alignment directions of the liquid crystal molecules in one of the at least two domains adjacent to each other about the light blocking layer.

In another aspect, a liquid crystal display includes a first base substrate, pixel electrodes formed on the first base substrate, a first alignment layer covering the pixel electrodes, a second base substrate facing the first base substrate, a common electrode formed on the second base substrate, a second alignment layer covering the common electrode, and a liquid crystal layer interposed between the first and second alignment layers.

The first base substrate includes a plurality of pixel areas having a plurality of columns and rows and the pixel electrodes are provided in the pixel areas.

The first alignment layer includes a plurality of first alignment regions extending along the columns and aligned in a first direction, and a plurality of second alignment regions extending along the columns and alternating with the first alignment regions, the second alignment regions aligned in a second direction opposite to the first direction.

The second alignment layer includes a plurality of third alignment regions extending along the rows and aligned in a third direction perpendicular to the first direction, and a plurality of fourth alignment regions extending along the rows and alternating with the third alignment regions, the fourth alignment regions aligned in a fourth direction opposite to the third direction.

When viewed in a plan view, the first and second alignment regions partially overlap with two pixel areas adjacent to each other in a same row, respectively, and the third and fourth alignment regions partially overlap with two pixel areas adjacent to each other in a same column.

The liquid crystal layer includes a first domain defined as an overlapping area of the first and third regions, a second domain defined as an overlapping area of the first and fourth regions, a third domain defined as an overlapping area of the second and third regions, and a fourth domain defined as an overlapping area of the second and fourth regions. The alignment directions of the liquid crystal layer are different from each other in the first to fourth domains.

Each pixel area includes the first to fourth domains, and an alignment sequence of the first to fourth domains in one pixel area is different from an alignment sequence of the first to fourth domains in other pixel areas adjacent to the one pixel area.

When pixel areas where the alignment directions of the liquid crystal molecules in the first to fourth domains are sequentially rotated clockwise or counterclockwise are referred to as rotation type pixel areas and pixel areas where the alignment direction of the liquid crystal molecules in the first domain is opposite to or faces the alignment direction of the liquid crystal molecules in the fourth domain or the alignment direction of the liquid crystal molecules in the second domain is opposite to or faces the alignment direction of the liquid crystal molecules in the third domain are referred to as convergent-divergent type pixel areas, the rotation type pixel areas and the convergent-divergent type pixel areas are alternately aligned in row and column directions.

In another aspect, when the first alignment layer is aligned in first and second directions and the second alignment layer is aligned in third and fourth directions, the extension part is provided in the pixel electrode in one of first to fourth directions. If a plurality of domains, in which liquid crystal molecules are aligned in different directions, are defined in the pixel area, the position of the extension part can be determined according to the alignment direction of the liquid crystal in each domain.

Therefore, the fringe field region formed at the boundary of domains, in which the alignment direction of the liquid crystal is directed to the adjacent pixel electrode, can be shifted into the light blocking region having the black matrix. Thus, the aperture ratio and the light transmittance of the LCD can be improved.

In addition, a high-quality LCD capable of reducing the line-afterimages caused by the migration of ionic impurities is provided.

BRIEF DESCRIPTION OF THE DRAWINGS

The above and other advantages will become readily apparent by reference to the following detailed description when considered in conjunction with the accompanying drawings wherein:

FIGS. 9A to 9C are plan views showing the alignment direction of first and second alignment layers and the shape of a pixel electrode according to another exemplary embodiment;

FIGS. 10A to 10C are plan views showing the alignment direction of first and second alignment layers and the shape of first and second pixel electrodes according to another exemplary embodiment;

FIGS. 14A to 14C are plan views showing the alignment direction of first and second alignment layers and the shape of first and second pixel electrodes according to another exemplary embodiment;

FIG. 32 is a plan view showing an LCD, in which pixel areas of FIG. 31C are repeatedly aligned in a 3×5 matrix pattern;

DESCRIPTION OF THE EMBODIMENTS

Figure 1:
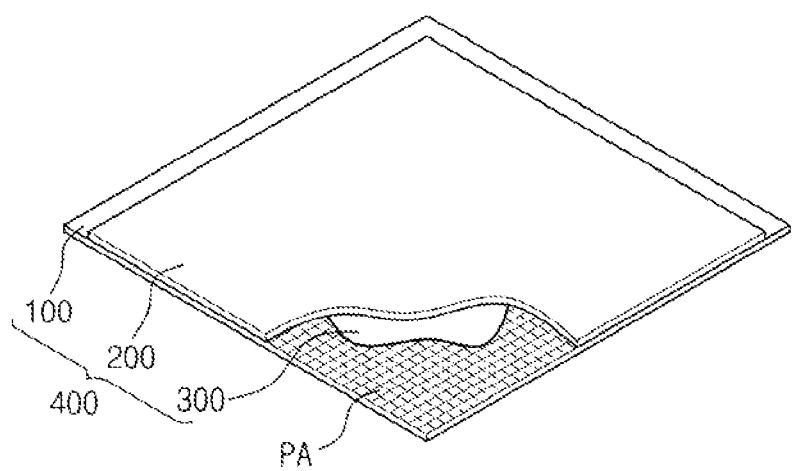
FIG. 1 is a partially-cut perspective view showing an LCD according to a first exemplary embodiment.

Hereinafter, exemplary embodiments will be described in detail with reference to accompanying drawings. However, the present invention is not limited to the following embodiments but includes various changes, substitutions and modifications.

In the drawings, the sizes of layers and regions may be magnified for the purpose of clear explanation. The terms "first", "second" and the like can be used to explain various elements, but the elements are not limited to such terms. The terms are used to distinguish one element to the other element. Thus, an element referred to as a first element in one embodiment may be referred to as a second element in another embodiment. Unless the context otherwise requires, the singular expression may not exclude the plural expression.

In the following description, the terms "include" or "comprises" are used to indicate the feature, number, step, operation, elements, parts or combination thereof without excluding other features, numbers, steps, operations, elements, parts or combination thereof. It will be understood that when an element, such as a layer, a film, a region, or a plate, is referred to as being 'on' or 'under' another element, the element can be directly on another element, or an intervening element or elements may also be present. In addition, when an element is referred to as being "directly on" the other element, there are no intervening elements present.

Figure 2:
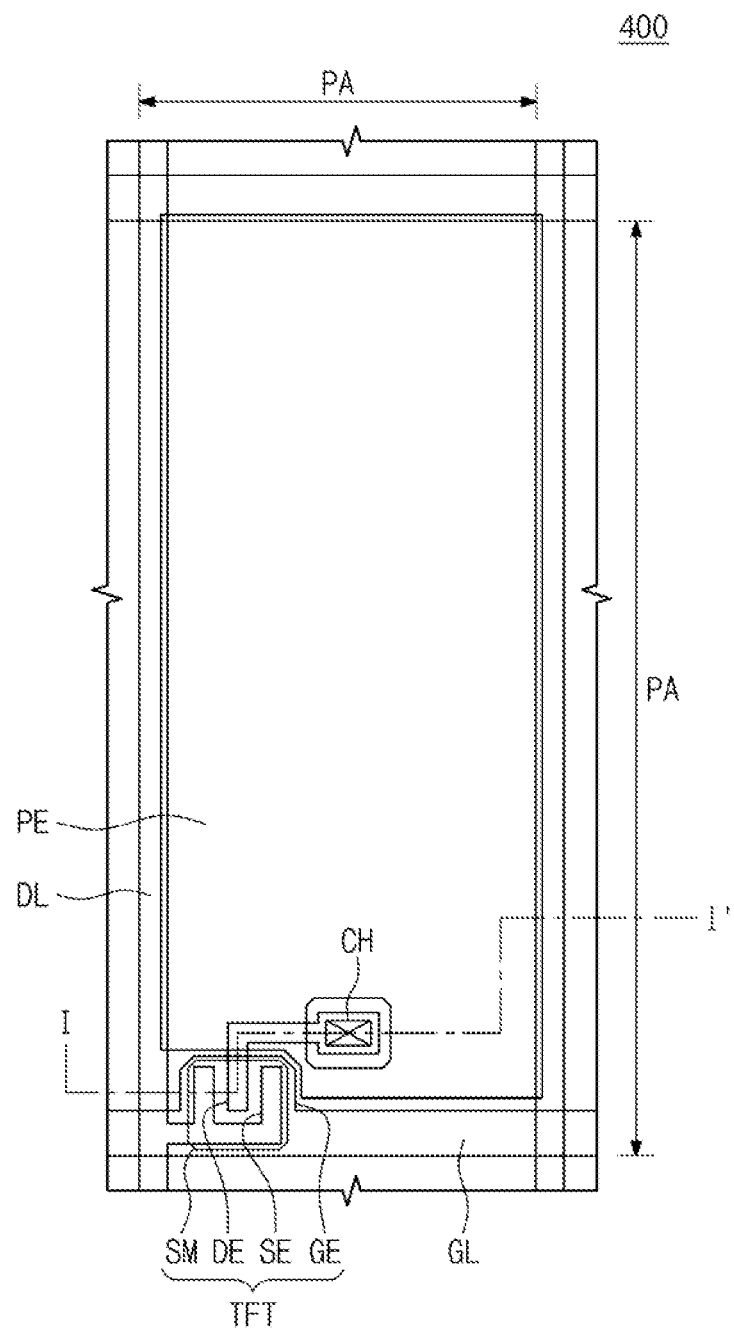
FIG. 2 is an enlarged sectional view showing a part of an LCD illustrated in FIG. 1.
Figure 3:
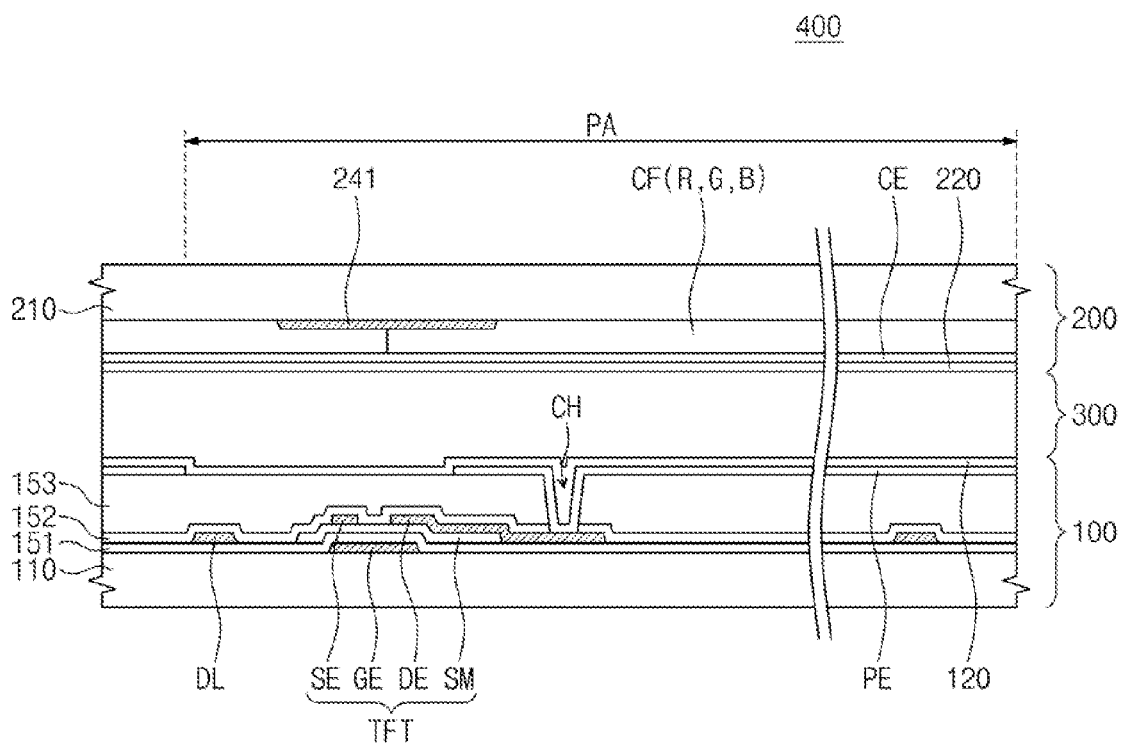
FIG. 3 is a sectional view taken along line I-I' of FIG. 2.

FIG. 1 is a partially-cut perspective view showing an LCD according to a first exemplary embodiment, FIG. 2 is an enlarged sectional view showing a part of the LCD illustrated in FIG. 1, and FIG. 3 is a sectional view taken along line I-I' of FIG. 2.

Referring to FIGS. 1 to 3, the LCD 400 includes a first substrate 100, a second substrate 200, and a liquid crystal layer 300 interposed between the first and second substrates 100 and 200.

The first substrate 100 includes a first base substrate 110, gate lines GL, data lines DL, thin film transistors TFT, pixel electrodes PE, and a first alignment layer 120.

The first base substrate 110 has a plurality of pixel areas PA. Although only one pixel area PA is shown in FIGS. 2 and 3 for the purpose of convenience of explanation, a plurality of pixel areas PA are arranged in the form of a matrix in LCD 400 (FIG. 1).

The pixel areas PA have the same structures, so the following description will be made based on one pixel area PA as an example. In addition, the pixel area PA has a long rectangular shape, but the present invention is not limited thereto. The pixel area PA may have various shapes, such as a V-shape or a Z-shape.

The pixel area PA includes the gate line GL, the data line DL, the thin film transistor TFT and the pixel electrode PE.

The gate line GL extends in one direction on the first base substrate 110.

The data line DL crosses the gate line GL on the base substrate 110 and is insulated from the gate line GL.

The thin film transistor TFT is provided adjacent to an intersection between the gate line GL and the data line DL. The thin film transistor TFT includes a gate electrode GE branching off from the gate line GL, a source electrode SE branching off from the data line DL, and a drain electrode DE spaced apart from the source electrode SE.

The pixel electrode PE is connected to the drain electrode DE.

Referring to FIG. 3, the gate line GL and the gate electrode GE are provided in the pixel area PA and are formed on the first base substrate 110.

A semiconductor pattern SM is formed on the gate line GL and a first insulting layer 151 is interposed therebetween. The first base substrate 110 having the semiconductor pattern SM is provided thereon with the data line DL, the source electrode SE, and the drain electrode DE. The semiconductor pattern SM forms a conductive channel between the source electrode SE and the drain electrode DE.

A second insulating layer 152 is formed on the first insulating layer 151 along with the source electrode SE and the drain electrode DE. An organic layer 153 is formed on the second insulating layer 152. The pixel electrode PE is formed on the organic layer 153 and is electrically connected to the drain electrode DE through a contact hole CH, which is formed through the second insulating layer 152 and the organic layer 153.

The first alignment layer 120 is formed on the pixel electrode PE to cover the pixel electrode PE.

The second substrate 200 is disposed so as to face the first substrate 100. The second substrate 200 includes a second base substrate 210, color filters CF, a black matrix 241, a common electrode CE and a second alignment layer 220.

The color filters CF and the black matrix 241 are provided on the second base substrate 210. The common electrode CE and the second alignment layer 220 are sequentially formed on the color filters CF and the black matrix 241.

The color filters CF are located in the pixel areas PA. Each of the color filters CF has one of red, green and blue colors. The black matrix 241 is formed between the color filters CF and blocks light passing through the liquid crystal layer 300. The common electrode CE is provided on the color filters CF and the black matrix 241. The second alignment layer 220 covers the common electrode CE.

The liquid crystal layer 300 is provided between the first and second alignment layers 120 and 220. The liquid crystal layer 300 includes vertical alignment liquid crystals, but the present invention is not limited thereto. The liquid crystal layer 300 may include, for example, twisted nematic liquid crystals.

When the thin film transistor TFT is turned on in response to a driving signal supplied through the gate line GL, an image signal supplied through the data line DL is supplied to the pixel electrode PE through the thin film transistor TFT, which has been turned on. A common voltage is applied to common electrode CE, and an electric field is generated between the pixel electrode PE and the common electrode CE. Accordingly, the liquid crystal molecules of the liquid crystal layer 300 are driven by the electric field, and as a result, an image is displayed based on the quantity of light passing through the liquid crystal layer 300.

The pre-tilt angle of the liquid crystal molecules is the angle at which the liquid crystal molecules are rotated, or tilted, before an electric field is applied to the liquid crystal layer. The pre-tilt angle of the liquid crystal molecules included in liquid crystal layer 300 may vary depending on the characteristics of the first and second alignment layers 120 and 220. If the liquid crystal layer 300 includes vertical alignment liquid crystals, the vertical alignment liquid crystal molecules have the pre-tilt angle of about 88° to about 89° with respect to the surface of the substrate.

In the exemplary embodiments, the first and second alignment layer 120 and 220 each include a number of regions and the alignment layer is aligned in different directions in each region. Hereinafter, the alignment direction of the first and second alignment layers 120 and 220 according to the present exemplary embodiments will be described after first describing the method used to align alignment layers in particular directions.

The method used to align the first and second alignment layers 120 and 220 in particular directions in each region uses light. The methods may include, for example, irradiating the alignment layer with ultraviolet rays that have various polarizing directions which are different from each other, and also irradiating the alignment layer with light rays that have an inclined angle with respect to the surface of the alignment layer.

Figure 4A:
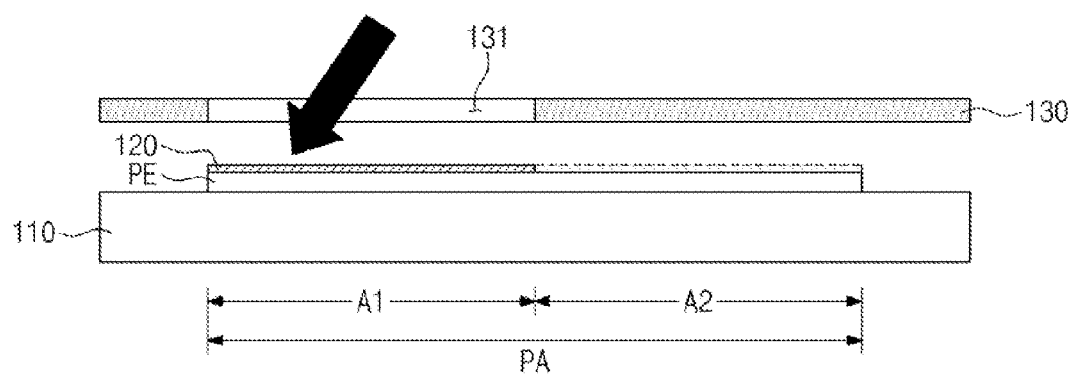
FIGS. 4A and 4B are sectional views showing the alignment procedure of a first alignment layer provided on an array substrate of a display panel.
Figure 4B:
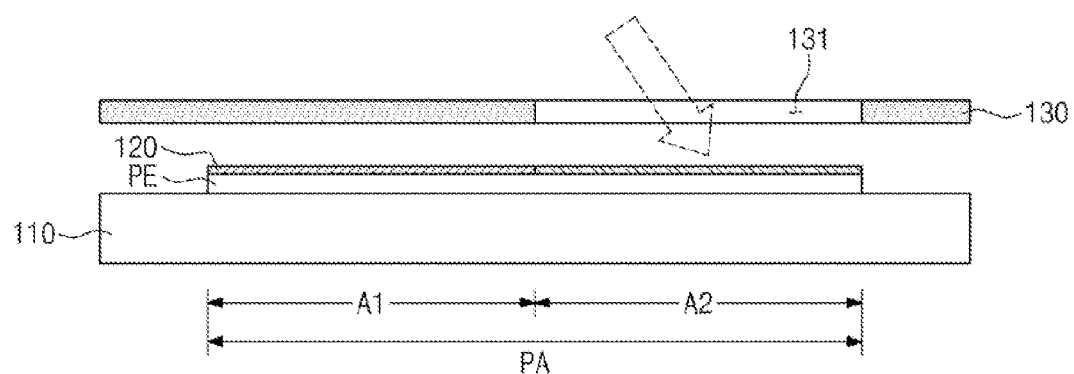
Figure 5:
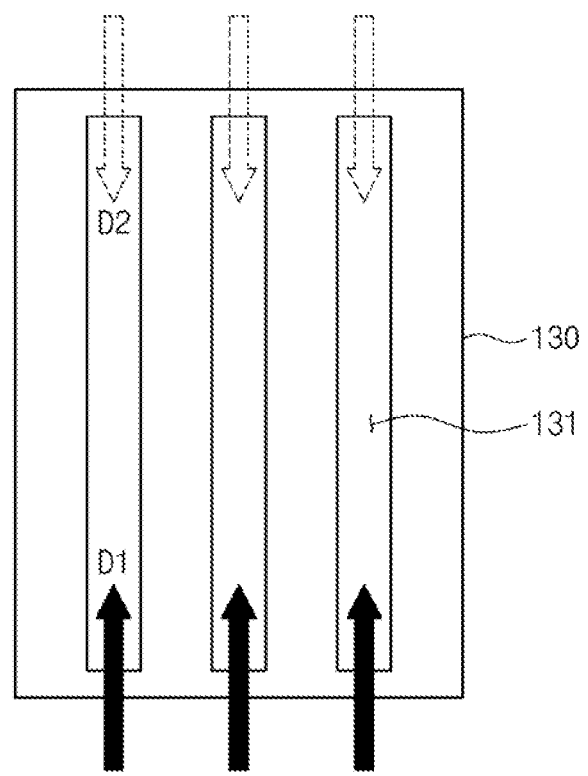
FIG. 5 is a plan view of a first mask shown in FIG. 4A.

FIGS. 4A and 4B are sectional views showing the alignment procedure for the first alignment layer provided on the first substrate of the display panel, and FIG. 5 is a plan view of a first mask shown in FIG. 4A.

Referring to FIGS. 4A and 4B, the first alignment layer 120 is formed on the first base substrate 110 to cover the pixel electrodes PE. As described above, at least one layer is interposed between the first base substrate 110 and the pixel electrode PE, but any interposed layers are omitted in FIGS. 4A and 4B for the purpose of convenience of explanation. The first alignment layer 120 may include polymer materials, such as, for example, a polyvinyl cinnamate (PVCN) material, a polysiloxane cinnamate (PSCN) material, or a cellulose cinnamate (CeICN) material, which may undergo decomposition, dimerization or isomerization reactions when irradiated with light (such as, for example, ultraviolet rays or laser light).

A first mask 130 having a plurality of first openings 131 is provided above the first alignment layer 120. As shown in FIG. 5, the first openings 131 extend in the first direction D1 and are parallel to each other.

The pixel area PA includes first and second areas A1 and A2 which are defined in the direction perpendicular to the first direction D1. In this case, the first openings 131 of the first mask 130 are positioned over the first area A1 of the pixel area PA. Then, the first alignment layer 120 is irradiated with light having a predetermined inclination angle θ with respect to the surface of the first alignment layer 120 to perform the primary exposure process of the first area A1 of the first alignment layer 120. The predetermined inclination angle θ at which the light strikes the first alignment layer 120 is in the range of about 40° to about 45° with respect to the surface of the first alignment layer 120. In the primary exposure process, the light source (not shown) irradiates light onto the first area A1 while moving along the first opening 131 in the first direction D1.

The light can be irradiated onto the surface of the first alignment layer 120 at the predetermined, slanted angle by leaning the first base substrate 110 or the light source against the surface of the first alignment layer 120.

After that, the first mask 130 is shifted such that the first openings 131 are positioned corresponding to the second area A2 of the pixel area PA. In this state, the second area A2 is irradiated by light at a predetermined inclination angle θ to perform a secondary exposure process with respect to the second area A2 of the first alignment layer 120. In the secondary exposure process, the light source irradiates light onto the second area A2 while moving along the first opening 131 in the second direction D2, which is opposite to the first direction D1.

After the exposure process has been completed, the first alignment layer 120 is tilted at a first angle in the first area A1 in the first direction D1, and is tilted at a second angle in the second area A2 of in the second direction D2. For instance, the angles at which the alignment layer 120 is tilted, also referred to herein pre-tilt angles for the alignment layer 120, is about 85° to about 89°. Thus, when no electric field is applied, the liquid crystal molecules of the liquid crystal layer (not shown) of the first alignment layer 120 are vertically aligned in the alignment direction and tilted to the pre-tilt angle of the particular region of first alignment layer 120.

According to the present exemplary embodiment, the direction the liquid crystal molecules are aligned can be precisely controlled. In addition, although the method for aligning the alignment layer using light has been described with respect to the first alignment layer 120, the present invention is not limited thereto. Various other method for aligning the alignment layer, such as by using a reactive mesogen or a rubbing method, can be employed.

Figure 6A:
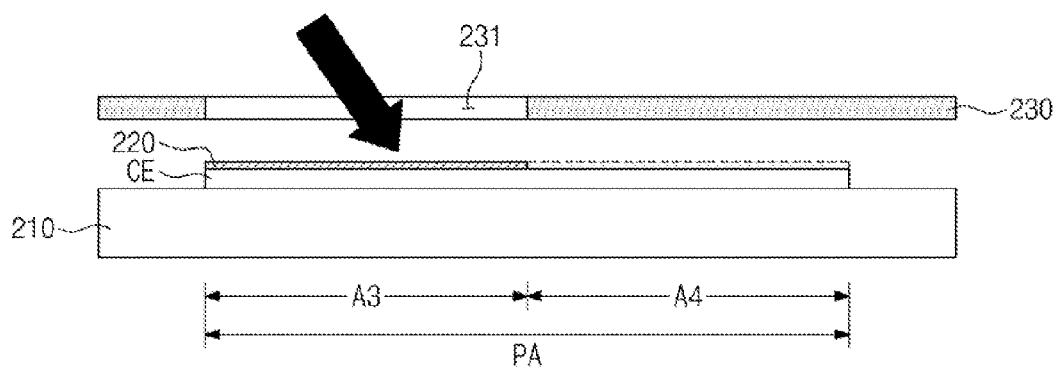
FIGS. 6A and 6B are sectional views showing the alignment procedure of a second alignment layer provided on an opposite substrate of a display panel.
Figure 6B:
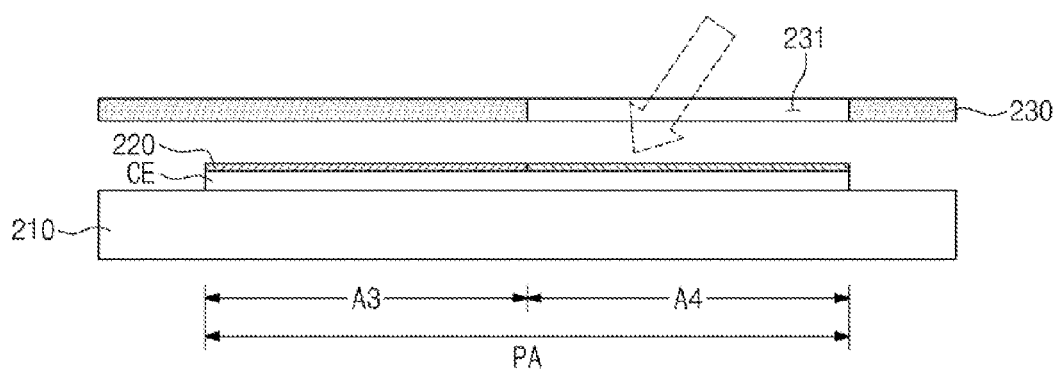
Figure 7:
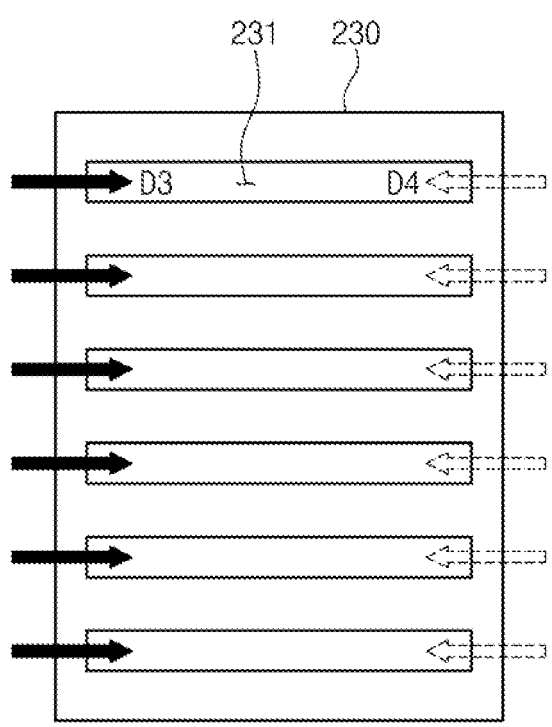
FIG. 7 is a plan view of a second mask shown in FIG. 6A.

FIGS. 6A and 6B are sectional views showing the alignment procedure for a second alignment layer provided on an opposite substrate of the display panel, and FIG. 7 is a plan view of a second mask shown in FIG. 6A.

Referring to FIGS. 6A and 6B, the second substrate 200 includes the second base substrate 210 and the common electrode CE formed on the second base substrate 210. For the purpose of convenience of explanation, the common electrode CE corresponding to one pixel area PA is shown in FIGS. 6A and 6B. However, the common electrode CE is formed on the entire surface of the second base substrate 210.

In addition, at least one layer is interposed between the second base substrate 210 and the common electrode CE, but any interposed layers are omitted in FIGS. 6A and 6B for the purpose of convenience of explanation.

The second alignment layer 220 is formed on the second base substrate 210 to cover the common electrodes CE. The second alignment layer 220 may include polymer materials, such as, for example, a polyvinyl cinnamate (PVCN) material, a polysiloxane cinnamate (PSCN) material, or a cellulose cinnamate (CeICN) material, which may undergo decomposition, dimerization or isomerization reactions when irradiated with light (such as, for example, ultraviolet ray or laser light).

A second mask 230 having a plurality of second openings 231 is provided above the second alignment layer 220. As shown in FIG. 7, the second openings 231 are parallel to each other and extend in a third direction D3, which is perpendicular to the first direction D1 (see, FIG. 5).

The pixel area PA includes third and fourth areas A3 and A4 which are defined in the first direction D1. In this case, the second openings 231 of the second mask 230 are positioned over the third area A3 of the pixel area PA. Then, the second alignment layer 220 is irradiated with light having a predetermined inclination angle θ with respect to the surface of the second alignment layer 220 to perform a tertiary exposure process of the third area A3 of the second alignment layer 220. In the tertiary exposure process, the exposure device irradiates light onto the third area A3 while moving along the second opening 231 in the third direction D3.

The light can be irradiated onto the surface of the second alignment layer 220 at the predetermined inclination angle θ by leaning the second base substrate 210 or the light source against the surface of the second alignment layer 220.

After that, the second mask 230 is shifted such that the second openings 231 are positioned corresponding to the fourth area A4 of the pixel area PA. In this state, the fourth area A4 is irradiated by light at a predetermined inclination angle θ with respect to the surface of the second alignment layer 220 to perform a quaternary exposure process of the fourth area A4 of the second alignment layer 220. In the quaternary exposure process, the light source irradiates light onto the fourth area A4 while moving along the second opening 231 in a fourth direction D4, which is opposite to the third direction D3.

After the exposure process has been completed, the second alignment layer 220 is tilted at a third angle in the third area A3 in the third direction D3, and is tilted at a fourth angle in the fourth area A4 in the fourth direction D4. For instance, the pre-tilt angles of the second alignment layer 220 are about 85° to about 89°. Thus, when no electric field is applied, the liquid crystal molecules of the liquid crystal layer (not shown) of the second alignment layer 220 are vertically aligned in the alignment direction and tilted to the pre-tilt angle of the particular region of second alignment layer 220.

Figure 8A:
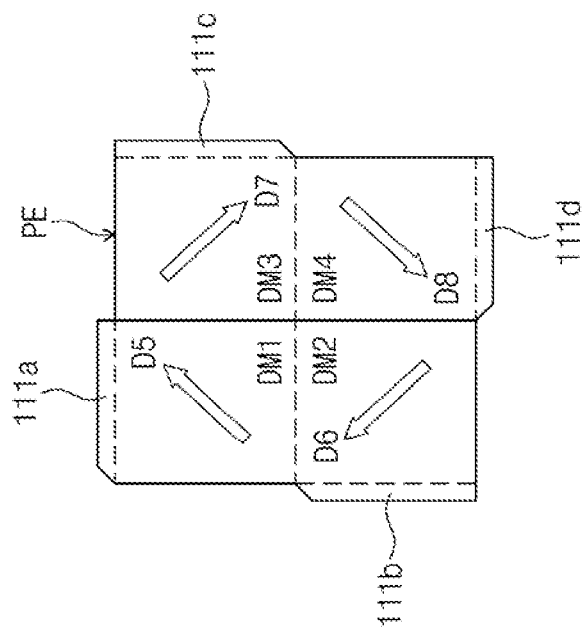
FIG. 8A to 8C are plan views showing the alignment direction of first and second alignment layers and the shape of a pixel electrode.
Figure 8B:
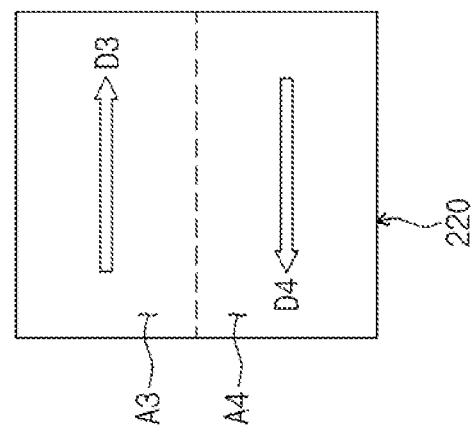
Figure 8C:
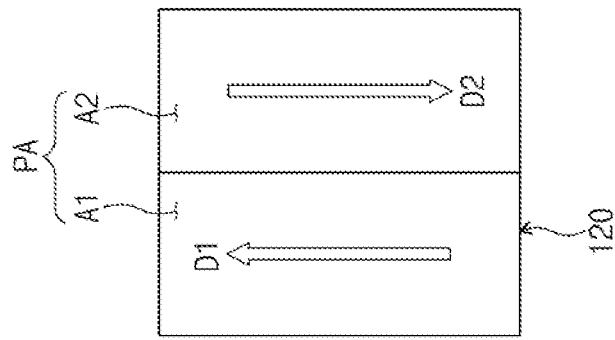

FIGS. 8A to 8C are a plan views showing the alignment direction of first and second alignment layers and the shape of the pixel electrode. FIG. 8A shows the alignment direction of the first alignment layer of FIG. 4B. FIG. 8B shows the alignment direction of the second alignment layer of FIG. 6B. FIG. 8C shows the pixel electrode.

Referring to FIGS. 8A to 8C, the pixel area PA is divided into first and second areas A1 and A2 in the first substrate 100, and the first alignment layer 120 is aligned in the first direction D1 in the first area A1 and aligned in the second direction D2 in the second area A2.

The pixel area PA is divided into third and fourth areas A3 and A4 in the second substrate 200, and the second alignment layer 220 is aligned in the third direction D3 in the third area A3 and aligned in the fourth direction D4 in the fourth area A4.

FIG. 8C shows the first and second substrates 100 and 200 of FIGS. 8A and 8B combined while facing each other. When the first and second substrates are combined, a first domain DM1, a second domain DM2, a third domain DM3 and a fourth domain DM4 are formed between the first and second substrates 100 and 200. The first domain DM1 corresponds to a region in which the first and third areas A1 and A3 overlap, the second domain DM2 corresponds to a region in which the first and fourth areas A1 and A4 overlap, the third domain DM3 corresponds to a region in which the second and third areas A2 and A3 overlap, and the fourth domain DM4 corresponds to a region in which the second and fourth areas A2 and A4 overlap.

In the liquid crystal layer 300 interposed between the first and second alignment layer 120 and 220, the liquid crystal molecule are aligned in different directions in each domain. In the first to fourth domains DM1 to DM4, the liquid crystal molecules are aligned in four different directions. In detail, in the first domain DM1, the liquid crystal molecules are aligned in a fifth direction D5 defined as a vector addition of first and third directions D1 and D3 in which the alignment layers are aligned, in the second domain DM2, the liquid crystal molecules are aligned in a sixth direction D6 defined as a vector addition of first and fourth directions D1 and D4 in which the alignment layers are aligned, in the third domain DM3, the liquid crystal molecules are aligned in a seventh direction D7 defined as a vector addition of second and third directions D2 and D3 in which the alignment layers are aligned, and in the fourth domain, the liquid crystal molecules are aligned in an eighth direction D8 defined as a vector addition of second and fourth directions D2 and D4 in which the alignment layers are aligned.

Therefore, as shown in FIG. 8C, in the first to fourth domains DM1 to DM4, the liquid crystal molecules of the liquid crystal layer have alignment directions that sequentially rotate clockwise in the first to fourth domains DM1 to DM4. Because a plurality of domains DM1 to DM4, in which the liquid crystal molecules are aligned in various directions, are formed in the pixel area, the LCD 400 may have a wide viewing angle.

In addition, the pixel electrode PE provided on the first substrate 100 includes at least one extension part, which extends in one of the first to fourth directions D1 to D4 at a portion of the pixel electrode PE that corresponds to at least one of the first to fourth domains DM1 to DM4.

In detail, if the alignment directions of the liquid crystal layer 300 are sequentially rotated clockwise in the first to fourth domains DM1 to DM4 as shown in FIG. 8C, the extension parts of the pixel electrode PE may include a first extension part 111a, a second extension part 111b, a third extension part 111c and a fourth extension part 111d positioned along the edges of the pixel electrode PE in regions of the pixel electrode corresponding to the first to fourth domains DM1 to DM4, respectively.

The first extension part 111a extends outward in the first direction D1 at the region of pixel electrode PE corresponding to the first domain DM1. That is, the extension part 111a is positioned along an outer edge of the pixel electrode PE in the region of the pixel electrode PE that corresponds to the first domain DM1, and protrudes out in the first directions D1. The second extension part 111b extends outward from pixel electrode PE in the fourth direction D4 at the region of pixel electrode PE corresponding to the second domain DM2. In addition, the third extension part 111c extends outward from pixel electrode PE in the third direction D3 at the region of pixel electrode PE corresponding to the third domain DM3, and the fourth extension part 111d extends outward from pixel electrode PE in the second direction D2 at the region of pixel electrode PE corresponding to the fourth domain DM4.

An abnormal alignment (misalignment) of the liquid crystal molecules may occur at the boundary between two adjacent pixel electrodes PE due to the fringe field formed between the two adjacent pixel electrodes PE. The position of the fringe field that occurs between two adjacent pixel electrodes PE may be determined by the direction that the liquid crystal molecules are aligned in each adjacent pixel. That is, the fringe field is generated between the pixel electrode PE and the adjacent pixel electrode (not shown in FIG. 8C) in a region where the alignment direction of the liquid crystal molecules is directed or aimed toward the adjacent pixel electrode.

According to one exemplary embodiment, the first to fourth extension parts 111a to 111d are provided in the region where the fringe field is generated between the pixel electrode PE and the adjacent pixel electrode. If the first to fourth extension parts 111a to 111d are provided in such regions, the boundary region between the pixel electrode PE and the adjacent pixel electrode may be shifted to a region, referred to herein as a light blocking region, where the black matrix 241. The black matrix 241 blocks light and prevents light leakage. In this manner, if the boundary region where the fringe field is generated is shifted to such a light blocking region, the region in which misalignment occurs due to the fringe field is located in the light blocking region, and any light that may be leaked due to misalignment of the liquid crystal molecules is blocked. As a result, reduction of the aperture ratio and light transmittance of the LCD 400 that may be caused by the misalignment of liquid crystal molecules at the boundary between pixels can be prevented.

FIGS. 9A to 9C are plan views showing the alignment direction of the first and second alignment layers and the shape of the pixel electrode according to another exemplary embodiment of the present invention. FIG. 9A shows the alignment direction of the first alignment layer. FIG. 9B shows the alignment direction of the second alignment layer. FIG. 9C shows the pixel electrode.

Referring to FIGS. 9A to 9C, the pixel area PA is divided into first and second areas A1 and A2 in the first substrate 100, and the first alignment layer 120 is aligned in the first direction D1 in the first area A1 and aligned in the second direction D2 in the second area A2.

The pixel area PA is divided into third and fourth areas A3 and A4 in the second substrate 200, and the second alignment layer 220 is aligned in the third direction D3 in the third area A3 and aligned in the fourth direction D4 in the fourth area A4 (which is opposite to the alignment directions in FIG. 8B).

As shown in FIG. 9C, when the first and second substrates 100 and 200 are combined while facing each other, the first to fourth domains DM1 to DM4 are formed between the first and second substrates 100 and 200. The first domain DM1 corresponds to a region in which the first and third areas A1 and A3 overlap, the second domain DM2 corresponds to a region in which the first and fourth areas A1 and A4 overlap, the third domain DM3 corresponds to a region in which the second and third areas A2 and A3 overlap, and the fourth domain DM4 corresponds to a region in which the second and fourth areas A2 and A4 overlap.

In this case, in the first domain DM1, the liquid crystal molecules are aligned in the fifth direction D5 defined as a vector addition of first and third directions D1 and D3, in the second domain DM2, the liquid crystal molecules are aligned in the sixth direction D6 defined as a vector addition of first and fourth directions D1 and D4, in the third domain DM3, the liquid crystal molecules are aligned in the seventh direction D7 defined as a vector addition of second and third directions D2 and D3, and in the fourth domain DM4, the liquid crystal molecules are aligned in the eighth direction D8 defined as a vector addition of second and fourth directions D2 and D4.

Therefore, as shown in FIG. 9C, the alignment direction of the liquid crystal 300 in the second domain DM2 faces the alignment direction of the liquid crystal 300 in the third domain DM3, and the alignment direction of the liquid crystal 300 in the first domain DM1 is opposite to the alignment direction of the liquid crystal 300 in the fourth domain DM4.

In addition, the pixel electrode PE provided in the first substrate 100 includes at least one extension part, which extends in one of the first to fourth directions D1 to D4 corresponding to at least one of the first to fourth domains DM1 to DM4. In detail, if the alignment direction of the liquid crystal molecules in the second domain DM2 faces the alignment direction of the liquid crystal molecules in the third domain DM3, the extension part of the pixel electrode PE may include first and second extension parts 111e and 111f positioned along the first domain DM1, and third and fourth extension parts 111g and 111h positioned along the fourth domain DM4.

The first extension part 111e extends outward from the pixel electrode PE in the first direction D1 at the first domain DM1 and the second extension part 111f extends outward from the pixel electrode PE in the third direction D3 at the first domain DM1. In addition, the third extension part 111g extends outward from the pixel electrode PE in the second direction D2 at the fourth domain DM4, and the fourth extension part 111h extends outward from the pixel electrode PE in the fourth direction D4 at the fourth domain DM4.

The fringe field is not generated between adjacent pixel electrodes in the second and third domains DM2 and DM3 where the alignment directions of the liquid crystal molecules within the pixel electrode PE face each other. However, the fringe field is generated between adjacent pixel electrodes in the first and fourth domains DM1 and DM4 where the alignment directions of the liquid crystal molecules are opposite to each other. Thus, if the first to fourth extension parts 111e to 111h are formed in the pixel electrode PE at regions corresponding to the first and fourth domains DM1 to DM4, the region in which the liquid crystal molecules are misaligned may be shifted into the light blocking region under the black matrix 241. As a result, the aperture ratio and light transmittance of the LCD can be improved.

FIGS. 10A to 10C are plan views showing the alignment direction of the first and second alignment layers and the shape of the first and second pixel electrodes according to still another exemplary embodiment. FIG. 10A shows the alignment direction of the first alignment layer according to still another exemplary embodiment. FIG. 10B shows the alignment direction of the second alignment layer according to still exemplary another embodiment. FIG. 10C shows the pixel electrode provided in the pixel region.

Referring to FIGS. 10A to 10C, the pixel area PA is divided into first and second sub-pixel areas SPA1 and SPA2 in the first substrate 100, and each of the first and second sub-pixel areas SPA1 and SPA2 is divided into the first and second areas A1 and A2. The liquid crystal molecules are aligned in the second direction D1 in the first area A1 and aligned in the first direction D2 in the second area A2.

In the second substrate 200, each of the first and second sub-pixel areas SPA1 and SPA2 is divided into third and fourth areas A3 and A4. The liquid crystal molecules are aligned in the third direction D3 in the third areas A3 and aligned in the fourth direction D4 in the fourth areas A4.

As shown in FIG. 10C, when the first and second substrates 100 and 200 are combined while facing each other, the first to fourth domains DM1 to DM4 are formed between the first and second substrates 100 and 200 in both the first sub-pixel area SPA1 and the second sub-pixel area SPA2. The first domain DM1 corresponds to a region in which the first and third areas A1 and A3 overlap, the second domain DM2 corresponds to a region in which the first and fourth areas A1 and A4 overlap, the third domain DM3 corresponds to a region in which the second and third areas A2 and A3 overlap, and the fourth domain DM4 corresponds to a region in which the second and fourth areas A2 and A4 overlap.

The liquid crystal molecules of the liquid crystal layer 300 are aligned in various directions that are different from each other in the first to fourth domains DM1 to DM4. In detail, in the first domain DM1, the liquid crystal molecules are aligned in the fifth direction D5 defined as a vector addition of second and third directions D2 and D3, in the second domain DM2, the liquid crystal molecules are aligned in the sixth direction D6 defined as a vector addition of second and fourth directions D2 and D4, in the third domain DM3, the liquid crystal molecules are aligned in the seventh direction D7 defined as a vector addition of first and third directions D1 and D3, and in the fourth domain, the liquid crystal molecules are aligned in the eighth direction D8 defined as a vector addition of first and fourth directions D1 and D4.

Therefore, the alignment directions of the liquid crystal layer 300 are sequentially rotated counterclockwise in the first to fourth domains DM1 to DM4 in each sub-pixel area SPA1 and SPA2. Because a plurality of domains DM1 to DM4, in which the liquid crystal molecules are aligned in various directions, are formed in the sub-pixel areas SPA1 and SPA2, the LCD 400 may have a wide viewing angle.

In addition, the first pixel electrode 141 is provided in the first sub-pixel area SPA1 of the first substrate 100, and the second pixel electrode 142 is provided in the second sub-pixel area SPA2 of the first substrate 100. The first and second pixel electrodes 141 and 142 are aligned adjacent to each other in the first direction D1.

The first pixel electrode 141 includes at least one extension part, which extends in one of the first to fourth directions D1 to D4 corresponding to at least one of the first to fourth domains DM1 to DM4. In detail, if the alignment directions of the liquid crystal molecules are sequentially rotated counterclockwise in the first to fourth domains DM1 to DM4 as shown in FIG. 10C, the extension parts of the first pixel electrode 141 may include first to fourth extension parts 141a to 141d positioned along the first to fourth domains DM1 to DM4, respectively.

In particular, the first extension part 141a of pixel electrode 141 extends in the third direction D3 at the region corresponding to the first domain DM1 and the second extension part 141b extends in the second direction D2 at the region corresponding to the second domain DM2. In addition, the third extension part 141c extends in the first direction D1 at the region corresponding to the third domain DM3, and the fourth extension part 141d extends in the fourth direction D4 at the region corresponding to the fourth domain DM4.

The second pixel electrode 142 also includes at least on extension part, which extends in one of the first to fourth directions D1 to D4 corresponding to at least one of the first to fourth domains DM1 to DM4. In detail, if the alignment directions of the liquid crystal molecules are sequentially rotated counterclockwise in the first to fourth domains DM1 to DM4 as shown in FIG. 10C, the extension part of the second pixel electrode 142 may include fifth to eighth extension parts 142a to 142d positioned along the first to fourth domains DM1 to DM4, respectively.

The fifth extension part 142a extends in the third direction D3 and the sixth extension part 142b extends in the second direction D2. In addition, the seventh extension part 142c extends in the first direction D1, and the eighth extension part 142d extends in the fourth direction D4.

Hereinafter, the extension part provided in the pixel electrode will be described in detail with reference to FIGS. 11 to 13 based on the structure in which two sub-pixels are provided in each pixel.

Figure 11:
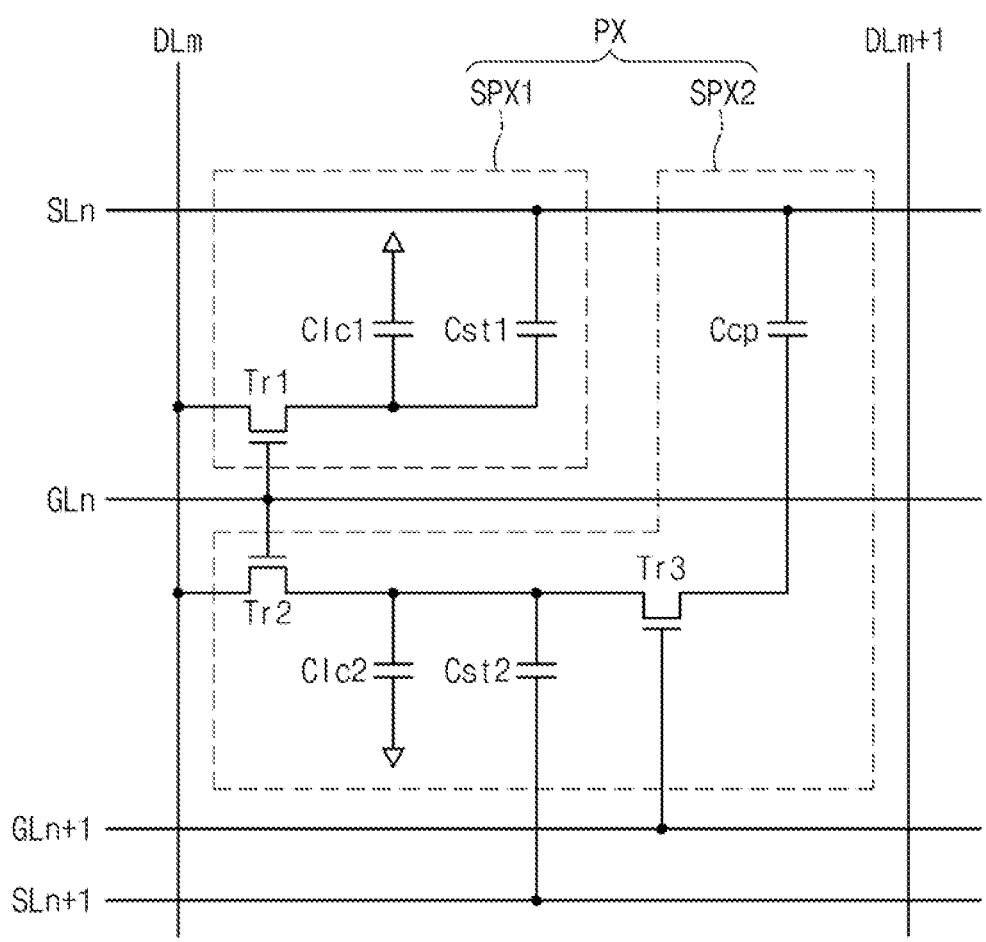
FIG. 11 is an equivalent circuit view of a pixel provided in an LCD according to a second exemplary embodiment.

FIG. 11 is an equivalent circuit view of the pixel provided in the LCD according to a second exemplary embodiment. The LCD according to a second exemplary embodiment includes a plurality of pixels. However, only one of the pixels is shown in FIG. 11 for the purpose of convenience of explanation, and the remaining pixels have the same structures.

Referring to FIG. 11, the pixel PX includes first and second sub-pixels SPX1 and SPX2. The first sub-pixel SPX1 includes a first thin film transistor Tr1, a first liquid crystal capacitor Clc1 and a first storage capacitor Cst1. The second sub-pixel SPX2 includes a second thin film transistor Tr2, a second liquid crystal capacitor Clc2, a second storage capacitor Cst2, a third thin film transistor Tr3, and a coupling capacitor Ccp. The first and second sub-pixels SPX1 and SPX2 are provided between two adjacent data lines (hereinafter, referred to as first and second data lines DLm and DLm+1).

The first thin film transistor Tr1 of the first sub-pixel SPX1 is connected to the first data line DLm and a first gate line GLn. The second thin film transistor Tr2 of the second sub-pixel SPX2 is connected to the first data line DLm and the first gate line GLn.

In detail, the first thin film transistor Tr1 includes a first source electrode connected to the first data line DLm, a first gate electrode connected to the first gate line GLn, and a first drain electrode connected to the first liquid crystal capacitor Clc1. The first storage capacitor Cst1 is provided between the first drain electrode and a first storage line SLn, and is connected in parallel to the first liquid crystal capacitor Clc1. The second thin film transistor Tr2 includes a second source electrode connected to the first data line DLm, a second gate electrode connected to the first gate line GLn, and a second drain electrode connected to the second liquid crystal capacitor Clc2. The second storage capacitor Cst2 is provided between the second drain electrode and a second storage line SLn+1, and is connected in parallel to the second liquid crystal capacitor Clc2.

When a first gate signal is applied to the first gate line GLn (the high interval of the first gate signal), the first and second thin film transistors Tr1 and Tr2 are simultaneously turned on. The data voltage applied to the first data line DLm is then applied to the first and second liquid crystal capacitors Clc1 and Clc2 through the first and second thin film transistors Tr1 and Tr2 which have been turned on. Thus, during the high interval of the first gate signal, the first and second liquid crystal capacitors Clc1 and Clc2 are charged with the same pixel voltage.

The third thin film transistor Tr3 includes a third source electrode connected to the second drain electrode of the second thin film transistor Tr2, a third gate electrode connected to a second gate line GLn+1, and a third drain electrode connected to the coupling capacitor Ccp. The second gate line GLn+1 receives a second gate signal, which is rising after the first gate signal is falling. When the third thin film transistor Tr3 is turned on in response to a second gate signal, voltage distribution may occur between the second liquid crystal capacitor Clc2 and the coupling capacitor Ccp. As a result, the pixel voltage charged in the second liquid crystal capacitor Clc2 is lowered. The lowered voltage level of the pixel voltage in the second liquid crystal capacitor Clc2 after such voltage distribution depends on the charge rate of the coupling capacitor Ccp.

Thus, the first liquid crystal capacitor Clc1 is charged with the first pixel voltage and the second liquid crystal capacitor Clc2 is charged with the second pixel voltage, which is lower than the first pixel voltage after the second gate signal is received.

Figure 12:
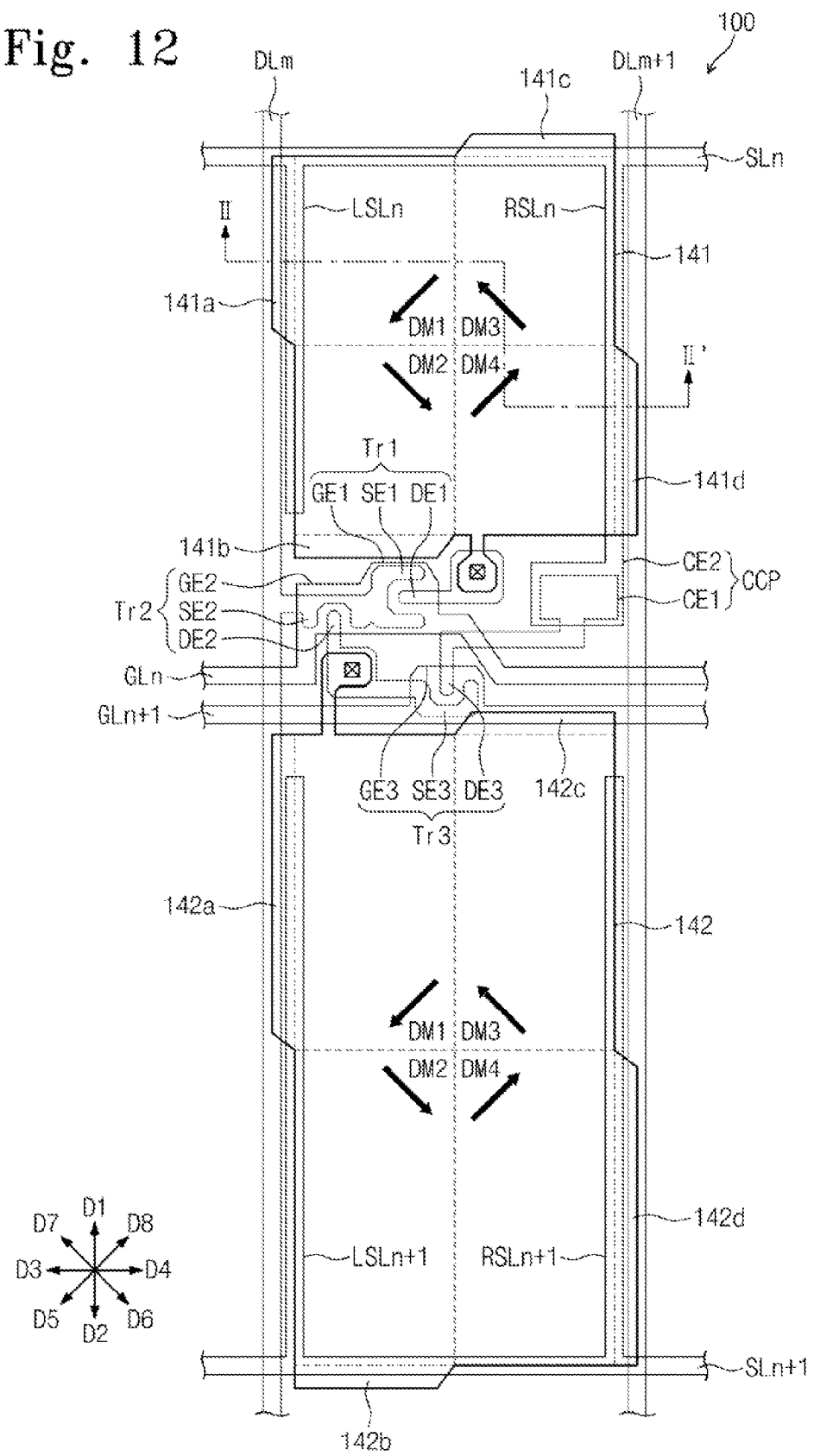
FIG. 12 is a layout view of a pixel shown in FIG. 11.
Figure 13:
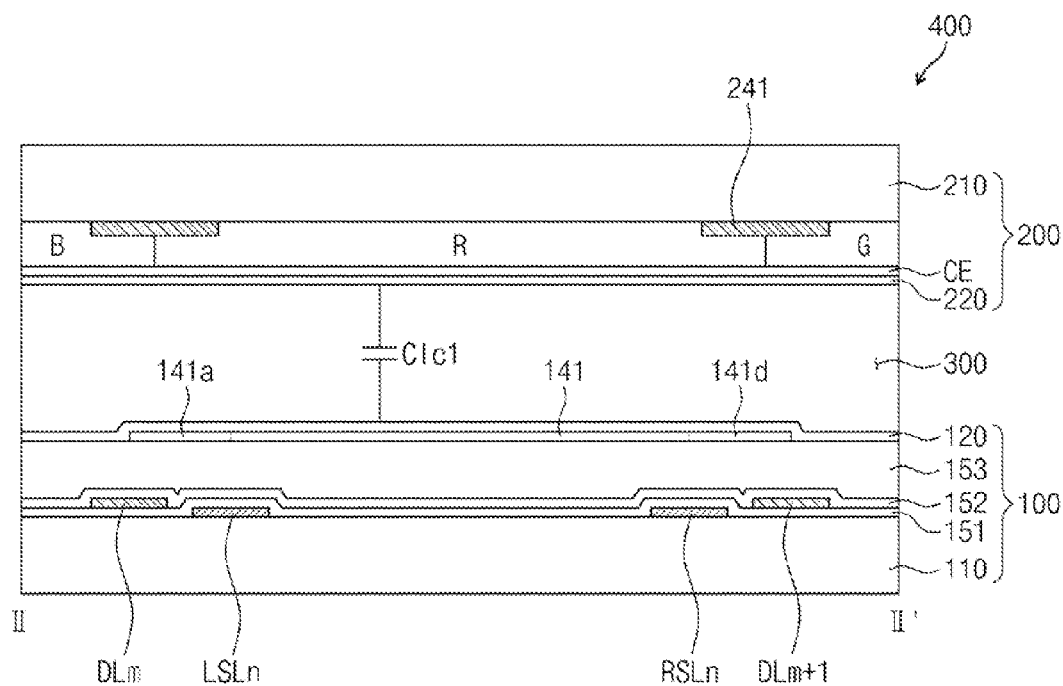
FIG. 13 is a sectional view taken along line II-II' of FIG. 12.

FIG. 12 is a layout view of the pixel shown in FIG. 11, and FIG. 13 is a sectional view taken along line II-II' of FIG. 12.

Referring to FIGS. 12 and 13, the LCD 400 includes the first substrate 100, the second substrate 200 coupled with the first substrate 100 and facing the first substrate 100, and the liquid crystal layer 300 interposed between the first and second substrates 100 and 200.

The first substrate 100 includes the first base substrate 110, first and second data lines DLm and DLm+1 extending in the second direction D2 and in parallel to each other on the first base substrate 110, and first and second gate lines GLn and GLn+1 extending in the third direction D3 on the first base substrate 110.

In addition, the first substrate 100 further includes the first storage line SLn extending in the third direction D3, and first and second branch electrodes LSLn and RSLn branching off from the first storage line SLn and extending in the second direction D2. The first substrate 100 may further include the second storage line SLn+1 extending in the third direction D3, and third and fourth branch electrodes LSLn+1 and RSLn+1 branching off from the second storage line SLn+1 and extending in the first direction D1.

The first thin film transistor Tr1 includes a first gate electrode GE1 branched off from the first gate line GLn, a first source electrode SE1 branched off from the first data line DLm, and a first drain electrode DE1 electrically connected to the first pixel electrode 141.

The first pixel electrode 141 partially overlaps the first storage line SLn and first and second branch electrodes LSLn and RSLn to form the first storage capacitor Cst1 (see, FIG. 11).

The first pixel electrode 141 is divided into the first to fourth domains DM1 to DM4, in which liquid crystal molecules are aligned in various directions different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4 as shown in FIG. 12, the first extension part 141a of the first pixel electrode 141 extends in the third direction D3 at the region corresponding to the first domain DM1 and overlaps the first data line DLm. In addition, the second extension part 141b of the first pixel electrode 141 extends in the second direction D2 at the region corresponding to the second domain DM2. Further, the third extension part 141c of the first pixel electrode 141 extends in the first direction D1 at the region corresponding to the third domain DM3, and the fourth extension part 141d of the first pixel electrode 141 extends in the fourth direction D4 at the region corresponding to the fourth domain DM4 and overlaps the second data line DLm+1.

The second thin film transistor Tr2 includes a second gate electrode GE2 branched off from the first gate line GLn, a second source electrode SE2 branched off from the first data line DLm, and a second drain electrode DE2 electrically connected to the second pixel electrode 142.

The second pixel electrode 142 partially overlaps the second storage line SLn+1 and third and fourth branch electrodes LSLn+1 and RSLn+1 to form the second storage capacitor Cst2 (see, FIG. 11).

The second pixel electrode 142 is divided into the first to fourth domains DM1 to DM4, in which liquid crystal molecules are aligned in various directions that are different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4 as shown in FIG. 12, the fifth extension part 142a of the second pixel electrode 142 extends in the third direction D3 at the region corresponding to the first domain DM1 and overlaps the first data line DLm. In addition, the sixth extension part 142b of the second pixel electrode 142 extends in the second direction D2 at the region corresponding to the second domain DM2. Further, the seventh extension part 142c of the second pixel electrode 142 extends in the first direction D1 at the region corresponding to the third domain DM3, and the eighth extension part 142d of the second pixel electrode 142 extends in the fourth direction D4 at the region corresponding to the fourth domain DM4 and overlaps the second data line DLm+1.

The first substrate 100 further includes the third thin film transistor Tr3 and the coupling capacitor Ccp. The third thin film transistor Tr3 includes a third gate electrode GE3 branched off from the second gate line GLn+1, a third source electrode SE3 extended from the second drain electrode DE2, and a third drain electrode DE3 connected to the coupling capacitor Ccp. The coupling capacitor Ccp includes a first electrode CE1 extending from the third drain electrode DE3 and a second electrode CE2 facing the first electrode CE2, but the present invention is not limited thereto.

Referring to FIG. 13, the first substrate 100 further includes first and second insulating layers 151 and 152 and the organic layer 153.

The second substrate 200 includes the second base substrate 210, the black matrix 241, the color filter layers R, G, and B, the common electrode CE and the second alignment layer 220. The black matrix 241 is formed in an area that corresponds to the light blocking region of the first substrate 100. The light blocking region can be defined as an area where the first and second data lines DLm and DLm+1, first to third thin film transistors Tr1 to Tr3, the coupling capacitor Ccp and the first and second gate lines GLn and GLn+1 are formed. Because the first and second pixel electrodes 141 and 142 are not formed in the light blocking region, the liquid crystal molecules are not aligned in the light blocking region, so that the light leakage may occur through the liquid crystal layer the light blocking region. In this regard, the black matrix 241 is provided in the light blocking region to block such light leakage.

According to one exemplary embodiment, the black matrix 241 may partially overlap the first to fourth extension parts 141a to 141d of the first pixel electrode 141. Although not shown in the drawings, the black matrix 241 may partially overlap the second and third extension parts 141b and 141c of the first pixel electrode 141 and the fifth to eighth extension parts 142a to 142d of the second pixel electrode 142.

If the first to eighth extension parts 141a to 141d and 142a to 142d are overlapped with the black matrix 241, the region of the liquid crystal molecules that are misaligned or not aligned, which misalignment may be generated due to the fringe field, can be shifted into the light blocking region under the black matrix 241. As a result, reduction of the aperture ratio and light transmittance of the LCD that may be caused by misalignment of the liquid crystal molecules can be prevented.

The common electrode CE faces the first pixel electrode 141 to form the first liquid crystal capacitor Clc1. Although not shown in the drawings, the common electrode 211 faces the second pixel electrode 142 to form the second liquid crystal capacitor Clc2.

FIGS. 14A to 14C are plan views showing the alignment direction of the first and second alignment layers and the shape of the first and second pixel electrodes according to still another exemplary embodiment. FIG. 14A shows the alignment direction of the first alignment layer according to still another exemplary embodiment. FIG. 14B shows the alignment direction of the second alignment layer according to still another exemplary embodiment. FIG. 14C shows the first and second pixel electrodes provided in the pixel region.

Referring to FIGS. 14A to 14C, the pixel area PA is divided into first and second sub-pixel areas SPA1 and SPA2 in the first substrate 100, and each of the first and second sub-pixel areas SPA1 and SPA2 is divided into first and second areas A1 and A2. The liquid crystal molecules are aligned in the second direction D2 in the first area A1 and aligned in the first direction D1 in the second area A2.

In the second substrate 200, each of the first and second sub-pixel areas SPA1 and SPA2 is divided into third and fourth areas A3 and A4. The liquid crystal molecules are aligned in the third direction D3 in the third areas A3 and aligned in the fourth direction D4 in the fourth areas A4.

As shown in FIG. 14C, when the first and second substrates 100 and 200 are combined while facing each other, the first to fourth domains DM1 to DM4 are formed between the first and second substrates 100 and 200 in both the first and second sub-pixel areas SPA1 and SPA2. The first domain DM1 corresponds to a region in which the first and third areas A1 and A3 overlap, the second domain DM2 corresponds to a region in which the first and fourth areas A1 and A4 overlap, the third domain DM3 corresponds to a region in which the second and third areas A2 and A3 overlap, and the fourth domain DM4 corresponds to a region in which the second and fourth areas A2 and A4 overlap.

The liquid crystal molecules of the liquid crystal layer 300 are aligned in various directions that are different from each other in the first to fourth domains DM1 to DM4. In detail, in the first domain DM1, the liquid crystal molecules are aligned in the fifth direction D5 defined as a vector addition of second and third directions D2 and D3, in the second domain DM2, the liquid crystal molecules are aligned in the sixth direction D6 defined as a vector addition of second and fourth directions D2 and D4, in the third domain DM3, the liquid crystal molecules are aligned in the seventh direction D7 defined as a vector addition of first and third directions D1 and D3, and in the fourth domain DM4, the liquid crystal molecules are aligned in the eighth direction D8 defined as a vector addition of first and fourth directions D1 and D4.

Therefore, the alignment direction of the liquid crystal layer 300 in the second domain DM2 is opposite to the alignment direction of the liquid crystal layer 300 in the third domain DM3. In addition, the alignment direction of the liquid crystal layer 300 in the first domain DM1 faces the alignment direction of the liquid crystal layer 300 in the fourth domain DM4. In this manner, because a plurality of domains DM1 to DM4, in which the liquid crystal molecules are aligned in various directions, are formed in the sub-pixel areas SPA1 and SPA2, the LCD 400 may have a wide viewing angle.

In addition, the first pixel electrode 141 is provided in the first sub-pixel area SPA1 of the first substrate 100, and the second pixel electrode 142 is provided in the second sub-pixel area SPA2 of the first substrate 100. The first and second pixel electrodes 141 and 142 are aligned adjacent to each other in the first direction D1.

When the alignment direction of the liquid crystal layer 300 in the second domain DM2 is opposite to the alignment direction of the liquid crystal layer 300 in the third domain DM3, the extension part of the first pixel electrode 141 may include first and second extension parts 141e and 141f positioned along the second domain DM2, and third and fourth extension parts 141g and 141h positioned along the third domain DM3.

The first extension part 141e extends in the second direction D2 and the second extension part 141f extends in the fourth direction D4. In addition, the third extension part 141g extends in the first direction D1, and the fourth extension part 141h extends in the third direction D3.

When the alignment direction of the liquid crystal layer 300 in the first domain DM1 faces the alignment direction of the liquid crystal layer 300 in the fourth domain DM4, the second pixel electrode 142 may include fifth and sixth extension parts 142e to 142f positioned along the second domain DM2, and seventh and eighth extension parts 142g and 142h positioned along the third domain DM3.

The fifth extension part 142e extends in the second direction D2 and the sixth extension part 142f extends in the fourth direction D4. In addition, the seventh extension part 142g extends in the first direction D1, and the eighth extension part 142h extends in the third direction D3.

Figure 15:
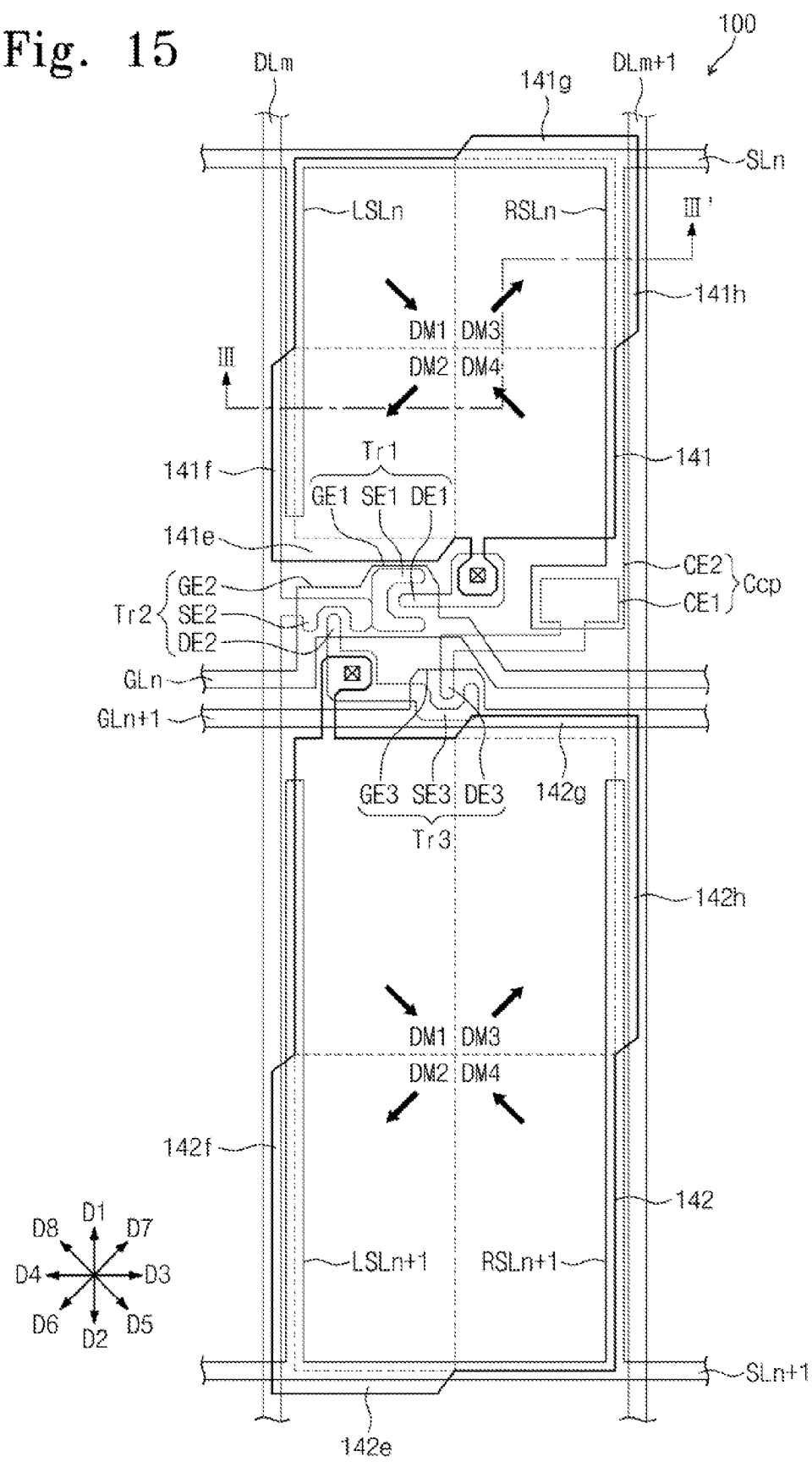
FIG. 15 is a plan view showing an array substrate provided with first and second pixel electrodes illustrated in FIG. 14C.
Figure 16:
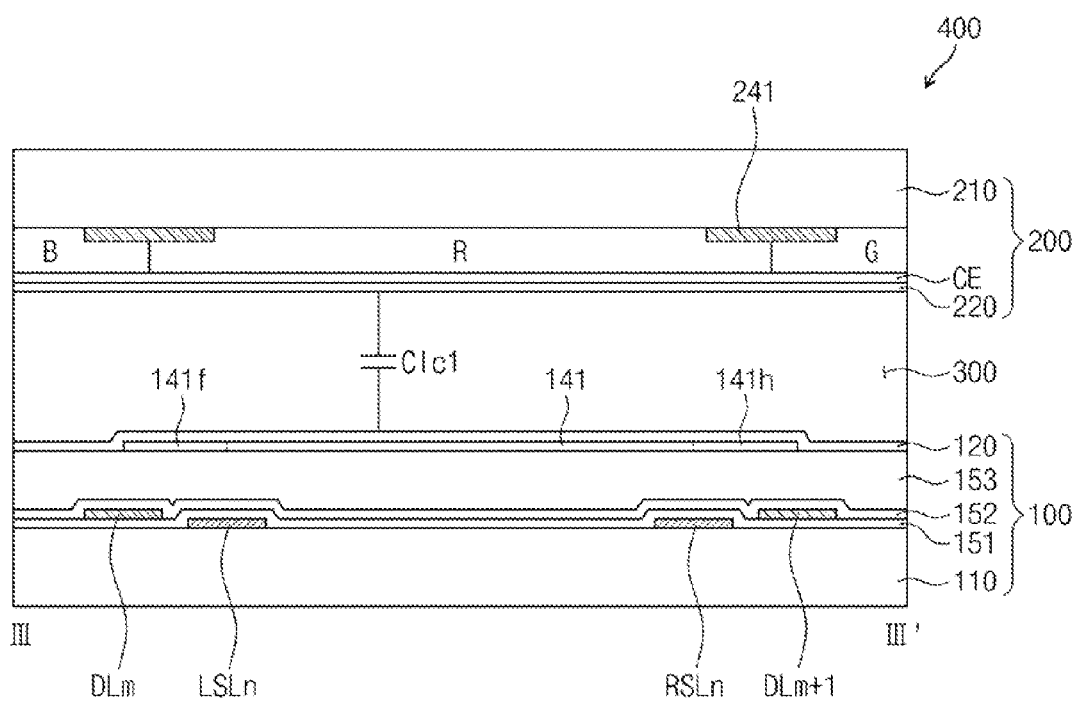
FIG. 16 is a sectional view taken along line III-III' of FIG. 15.

FIG. 15 is a plan view showing an array substrate provided with first and second pixel electrodes illustrated in FIG. 14C, and FIG. 16 is a sectional view taken along line III-III' of FIG. 15. In the following description, details of the elements that have been described with reference to FIG. 12 will be omitted and the same reference numerals will be assigned to the same elements.

Referring to FIG. 15, the first pixel electrode 141 is divided into the first to fourth domains DM1 to DM4, in which liquid crystal molecules are aligned in various directions that are different from each other. The alignment direction of the liquid crystal layer 300 in the second domain DM2 is opposite to the alignment direction of the liquid crystal layer 300 in the third domain DM3.

When the alignment direction of the liquid crystal layer 300 in the second domain DM2 is opposite to the alignment direction of the liquid crystal layer 300 in the third domain DM3, the first extension part 141e of the first pixel electrode 141 extends in the second direction D2 at the region corresponding to the second domain DM2, and the second extension part 141f of the first pixel electrode 141 extends in the fourth direction D4 at the region corresponding to the second domain DM2 while partially overlapping with the first data line DLm. Further, the third extension part 141g of the first pixel electrode 141 extends in the first direction D1 at the region corresponding to the third domain DM3, and the fourth extension part 141h of the first pixel electrode 141 extends in the third direction D3 at the region corresponding to the third domain DM3 while partially overlapping with the second data line DLm+1.

In addition, the second pixel electrode 142 is divided into the first to fourth domains DM1 to DM4, in which liquid crystal molecules are aligned in various directions that are different from each other. The alignment direction of the liquid crystal layer 300 in the second domain DM2 is opposite to the alignment direction of the liquid crystal layer 300 in the third domain DM3.

When the alignment direction of the liquid crystal layer 300 in the second domain DM2 is opposite to the alignment direction of the liquid crystal layer 300 in the third domain DM3, the fifth extension part 142e of the second pixel electrode 142 extends in the second direction D2 at the region corresponding to the second domain DM2, and the sixth extension part 142f of the second pixel electrode 142 extends in the fourth direction D4 at the region corresponding to the second domain DM2 while partially overlapping with the first data line DLm. Further, the seventh extension part 142g of the second pixel electrode 142 extends in the first direction D1 at the region corresponding to the third domain DM3, and the eighth extension part 142h of the second pixel electrode 142 extends in the third direction D3 at the region corresponding to the third domain DM3 while partially overlapping with the second data line DLm+1.

As shown in FIG. 16, the first to fourth extension parts 141e to 141h of the first pixel electrode 141 may partially overlap with the black matrix 241. In addition, the fifth to eighth extension parts 142e to 142h of the second pixel electrode 142 may partially overlap with the black matrix 241.

If the first to eighth extension parts 141e to 141h and 142e to 142h are overlapped with the black matrix 241, the region of the liquid crystal molecules that are misaligned or not aligned, which misalignment may be generated due to the fringe field, can be shifted into the light blocking region under the black matrix 241. As a result, the aperture ratio and light transmittance of the LCD 400 can be improved.

Figure 17:
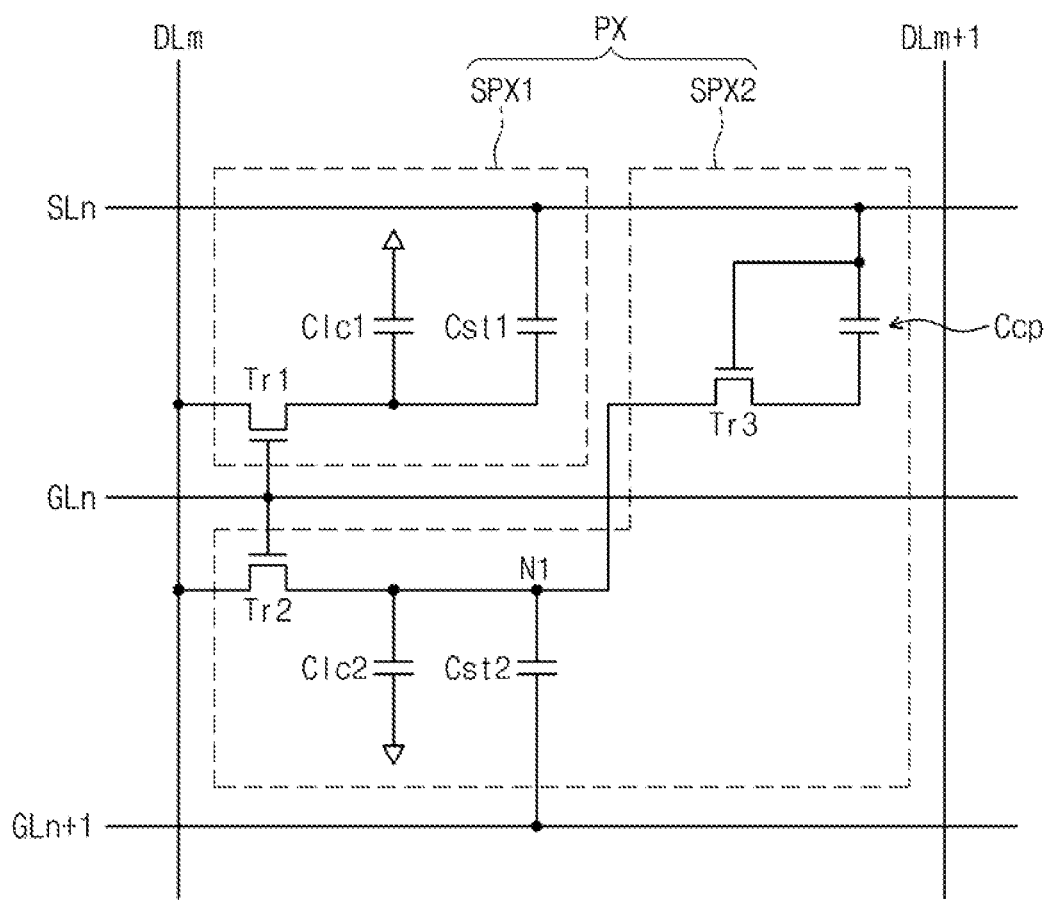
FIG. 17 is an equivalent circuit view of a pixel provided in an LCD according to a third exemplary embodiment.

FIG. 17 is an equivalent circuit view of a pixel provided in an LCD according to a third exemplary embodiment.

Referring to FIG. 17, the pixel PX includes first and second sub-pixels SPX1 and SPX2. The first sub-pixel SPX1 includes the first thin film transistor Tr1, the first liquid crystal capacitor Clc1 and the first storage capacitor Cst1. The second sub-pixel SPX2 includes the second thin film transistor Tr2, the second liquid crystal capacitor Clc2, the second storage capacitor Cst2, a third thin film transistor Tr3, and a coupling capacitor Ccp.

The first thin film transistor Tr1 includes the first source electrode connected to the first data line DLm, the first gate electrode connected to the first gate line GLn, and the first drain electrode connected to the first liquid crystal capacitor Clc1. The first storage capacitor Cst1 is provided between the first drain electrode and the first storage line SLn, and is connected in parallel to the first liquid crystal capacitor Clc1.

The second thin film transistor Tr2 includes the second source electrode connected to the first data line DLm, the second gate electrode connected to the first gate line GLn, and the second drain electrode connected to the second liquid crystal capacitor Clc2. The second storage capacitor Cst2 is provided between the second drain electrode and the second storage line SLn+1, and is connected in parallel to the second liquid crystal capacitor Clc2.

The third thin film transistor Tr3 includes a third source electrode connected to the second drain electrode of the second thin film transistor Tr2, a third gate electrode connected to the first storage line SLn, and a third drain electrode connected to the coupling capacitor Ccp. The coupling capacitor Ccp is provided between the third drain electrode and the first storage line SLn.

When a first gate signal is applied to the first gate line GLn, the first and second thin film transistors Tr1 and Tr2 are simultaneously turned on. The data voltage applied to the first data line DLm is then applied to the first and second liquid crystal capacitors Clc1 and Clc2 through the first and second thin film transistors Tr1 and Tr2 which have been turned on. Thus, the first and second liquid crystal capacitors Clc1 and Clc2 are charged with the same pixel voltage. According to the present exemplary embodiment, the data voltage may have a level of 0V to 15V.

The third thin film transistor Tr3 is turned on in response to the storage voltage applied to the first storage line SLn. For instance, the storage voltage applied to the first storage line SLn is about 7.5V. The third thin film transistor Tr3 may have a channel width sufficient for turning on the third thin film transistor Tr3 in response to the storage voltage.

According to one exemplary embodiment, because the third thin film transistor Tr3 has been turned on in response to the storage voltage, a voltage distribution occurs between the first liquid crystal capacitor Clc1 and the coupling capacitor Ccp which depends on the charge rate of the first liquid crystal capacitor Clc1 and the coupling capacitor Ccp. The electric potential of a first node N1 is changed according to the voltage distribution. In detail, when a data voltage having positive polarity is applied to the first node N1, the electric potential of the first node N1 is reduced due to the voltage distribution. In addition, when a data voltage having negative polarity is applied to the first node N1, the electric potential of the first node N1 is increased due to the voltage distribution. The variation of electric potential of the first node N1 can be adjusted according to the capacitance of the coupling capacitor Ccp.

As a result, when the first liquid crystal capacitor Clc1 is charged with the first pixel voltage, the second liquid crystal capacitor Clc2 is charged with the second pixel voltage, which is lower than the first pixel voltage, and it is the third thin film transistor Tr3 and the coupling capacitor Ccp that lower the second pixel voltage.

Figure 18:
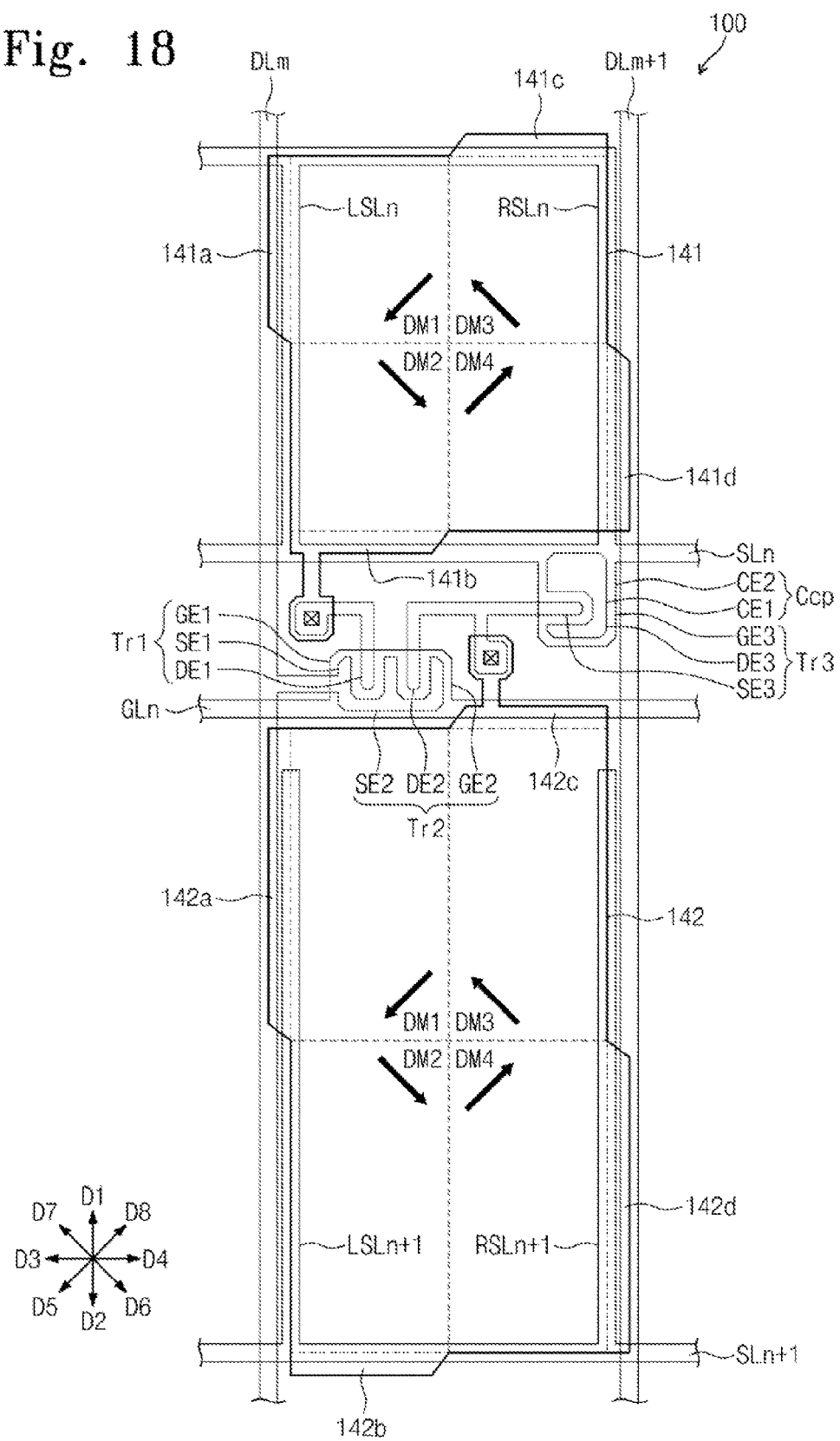
FIG. 18 is a plan view showing an array substrate provided with a pixel illustrated in FIG. 17.

FIG. 18 is a plan view showing the first substrate provided with the pixel illustrated in FIG. 17.

Referring to FIG. 18, the first substrate 100 includes the first and second data lines DLm and DLm+1 extending in the second direction D2 and in parallel to each other, the first gate line GLn extending in the third direction D3, and the first and second storage lines SLn and SLn+1 extending in the third direction D3. In addition, the first substrate 100 includes the first and second branch electrodes LSLn and RSLn branching off from the first storage line SLn and extending in the second direction D2.

The first gate electrode GE1 of the first thin film transistor Tr1 branches off from the first gate line GLn, and the first source electrode SE1 of the first thin film transistor Tr1 branches off from the first data line DLm. The first drain electrode DE1 of the first thin film transistor Tr1 is electrically connected to the first pixel electrode 141.

The first pixel electrode 141 partially overlaps the first storage line SLn, and first and second branch electrodes LSLn and RSLn to form the first storage capacitor Cst1 (see, FIG. 17).

The first pixel electrode 141 is divided into the first to fourth domains DM1 to DM4, in which liquid crystal molecules are aligned in various directions that are different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4, the first extension part 141a of the first pixel electrode 141 extends in the third direction D3 at the region corresponding to the first domain DM1 and overlaps the first data line DLm. In addition, the second extension part 141b of the first pixel electrode 141 extends in the second direction D2 at the region corresponding to the second domain DM2. Further, the third extension part 141c of the first pixel electrode 141 extends in the first direction D1 at the region corresponding to the third domain DM3, and the fourth extension part 141d of the first pixel electrode 141 extends in the fourth direction D4 at the region corresponding to the fourth domain DM4 and overlaps the second data line DLm+1.

The second gate electrode GE2 of the second thin film transistor Tr2 branches off from the first gate line GLn, and the second source electrode SE2 of the second thin film transistor Tr2 branches off from the first data line DLm. The second drain electrode DE2 of the second thin film transistor Tr2 is electrically connected to the second pixel electrode 142.

The second pixel electrode 142 is divided into the first to fourth domains DM1 to DM4, in which liquid crystal molecules are aligned in various directions that are different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4, the fifth extension part 142a of the second pixel electrode 142 extends in the third direction D3 at the region corresponding to the first domain DM1 and overlaps the first data line DLm. In addition, the sixth extension part 142b of the second pixel electrode 142 extends in the second direction D2 at the region corresponding to the second domain DM2. Further, the seventh extension part 142c of the second pixel electrode 142 extends in the first direction D1 at the region corresponding to the third domain DM3, and the eighth extension part 142d of the second pixel electrode 142 extends in the fourth direction D4 at the region corresponding to the fourth domain DM4 and overlaps the second data line DLm+1.

The first substrate 100 further includes the third thin film transistor Tr3 and the coupling capacitor Ccp. The third gate electrode GE3 of the third thin film transistor Tr3 branches off from the second gate line GLn+1, the third source electrode SE3 of the third thin film transistor Tr3 extends from the second drain electrode DE2, and the third drain electrode DE3 of the third thin film transistor Tr3 is connected to the coupling capacitor Ccp. The coupling capacitor Ccp includes the first electrode CE1 extending from the third drain electrode DE3 and the second electrode CE2 facing the first electrode CE2, but the present invention is not limited thereto.

Figure 19:
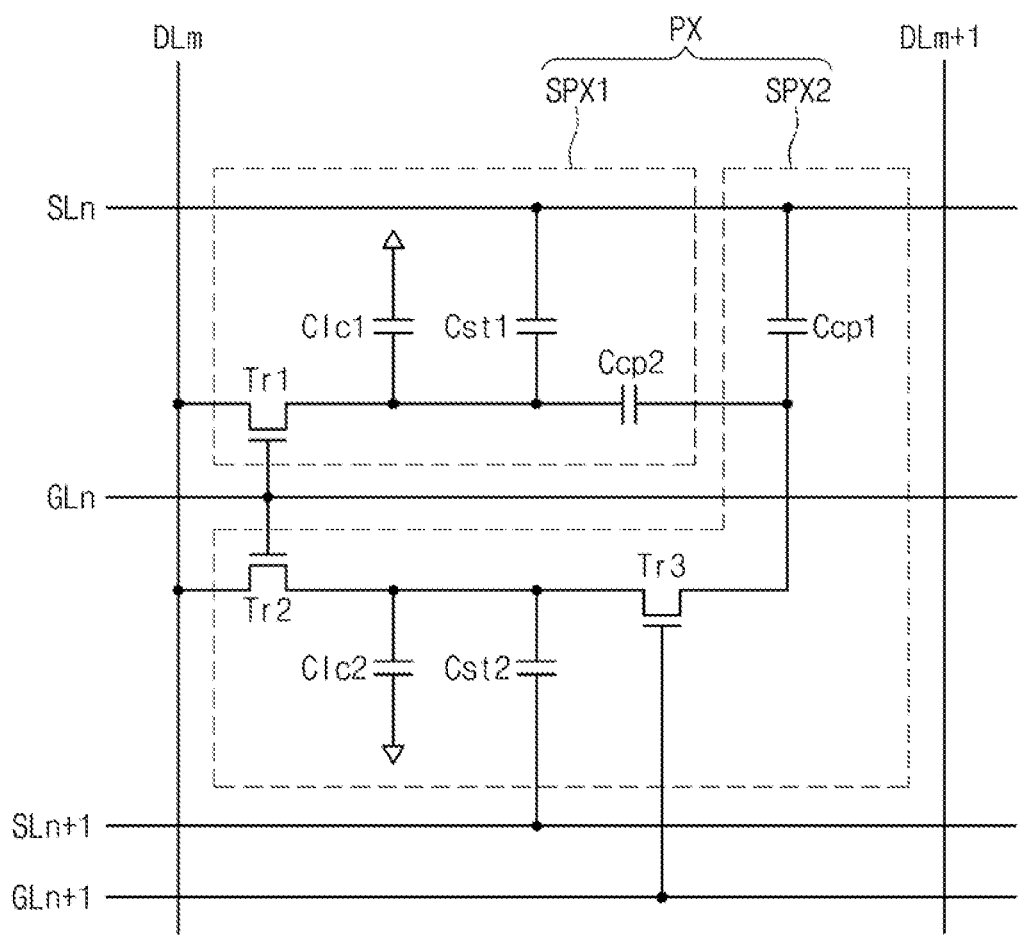
FIG. 19 is an equivalent circuit view of a pixel provided in an LCD according to a fourth exemplary embodiment.
Figure 20:
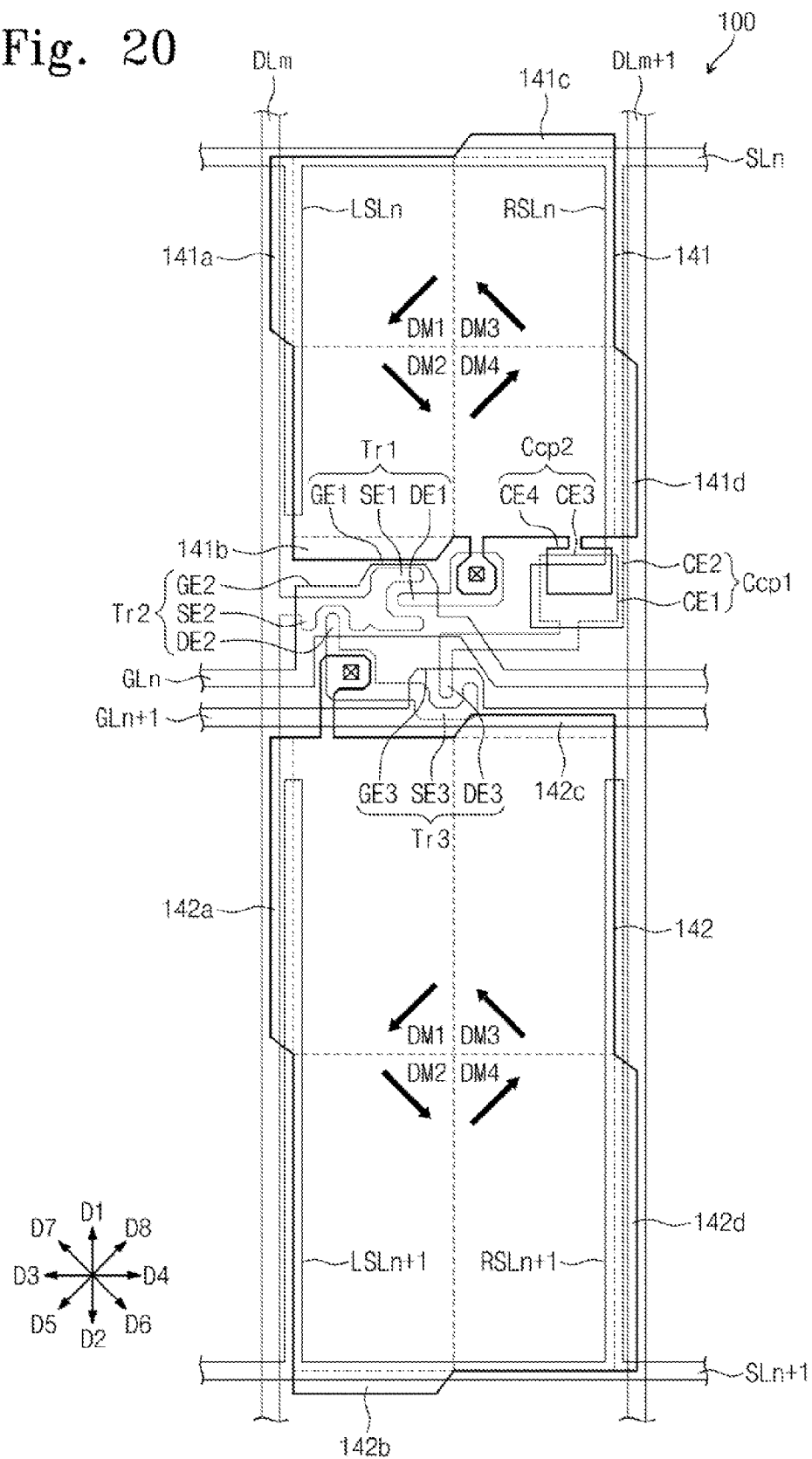
FIG. 20 is a plan view showing an array substrate provided with a pixel illustrated in FIG. 18.

FIG. 19 is an equivalent circuit view of a pixel provided in an LCD according to a fourth exemplary embodiment, and FIG. 20 is a plan view showing the first substrate provided with the pixel illustrated in FIG. 19.

The pixel shown in FIGS. 19 and 20 is identical to the pixel shown in FIGS. 11 and 12 except for the second coupling capacitor Ccp2.

Referring to FIGS. 19 and 20, the first coupling capacitor Ccp1 is provided between the third drain electrode DE3 of the third thin film transistor Tr3 and the first storage line SLn. The first coupling capacitor Ccp1 includes the first electrode CE1 extending from the third drain electrode DE3 and the second electrode CE2 extending from the first storage line SLn while facing the first electrode CE1.

The second coupling capacitor Ccp2 is provided between the third drain electrode DE3 of the third thin film transistor Tr3 and the first pixel electrode 141 of the first liquid crystal capacitor act The second coupling capacitor Ccp2 includes a third electrode CE3 extending from the first electrode CE1 and a fourth electrode CE4 extending from the first pixel electrode 141 while facing the third electrode CE3.

When the third thin film transistor Tr3 is turned on in response to a second gate signal supplied to the second gate line GLn+1, voltage distribution may occur between the first coupling capacitor Ccp1 and the second liquid crystal capacitor Clc2. As a result, the first coupling capacitor Ccp1 and the second liquid crystal capacitor Clc2 are charged with the same voltage, but the second pixel voltage charged in the second liquid crystal capacitor Clc2 is lower than the first pixel voltage charged in the first liquid crystal capacitor Clc1.

When the first liquid crystal capacitor Clc1 is connected to the first coupling capacitor Ccp1 through the second coupling capacitor Ccp2, the first pixel voltage charged in the first coupling capacitor Ccp1 may be increased due to the coupling of the first coupling capacitor Ccp1.

Referring to FIG. 20, the first pixel electrode 141 is divided into the first to fourth domains DM1 to DM4, in which liquid crystal molecules are aligned in various directions that are different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4, the first extension part 141a of the first pixel electrode 141 extends in the third direction D3 at the region corresponding to the first domain DM1 and overlaps the first data line DLm. In addition, the second extension part 141b of the first pixel electrode 141 extends in the second direction D2 at the region corresponding to the second domain DM2. Further, the third extension part 141c of the first pixel electrode 141 extends in the first direction D1 at the region corresponding to the third domain DM3, and the fourth extension part 141d of the first pixel electrode 141 extends in the fourth direction D4 at the region corresponding to the fourth domain DM4 and overlaps the second data line DLm+1.

The second gate electrode GE2 of the second thin film transistor Tr2 branches off from the first gate line GLn, and the second source electrode SE2 of the second thin film transistor Tr2 branches off from the first data line DLm. The second drain electrode DE2 of the second thin film transistor Tr2 is electrically connected to the second pixel electrode 142.

The second pixel electrode 142 is divided into the first to fourth domains DM1 to DM4, in which liquid crystal molecules are aligned in various directions that are different from each other. The alignment directions of the liquid crystal molecules are sequentially rotated counterclockwise in the first to fourth domains DM1 to DM4.

If the alignment directions of the liquid crystal molecules are sequentially rotated counterclockwise in the first to fourth domains DM1 to DM4, the fifth extension part 142a of the second pixel electrode 142 extends in the third direction D3 at the region corresponding to the first domain DM1 and overlaps the first data line DLm. In addition, the sixth extension part 142b of the second pixel electrode 142 extends in the second direction D2 at the region corresponding to the second domain DM2. Further, the seventh extension part 142c of the second pixel electrode 142 extends in the first direction D1 at the region corresponding to the third domain DM3, and the eighth extension part 142d of the second pixel electrode 142 extends in the fourth direction D4 at the region corresponding to the fourth domain DM4 and overlaps the second data line DLm+1.

In this manner, the aperture ratio and light transmittance of the LCD 400 can be improved when the extension part is formed in the first and second pixel electrodes 141 and 142.

Figure 21:
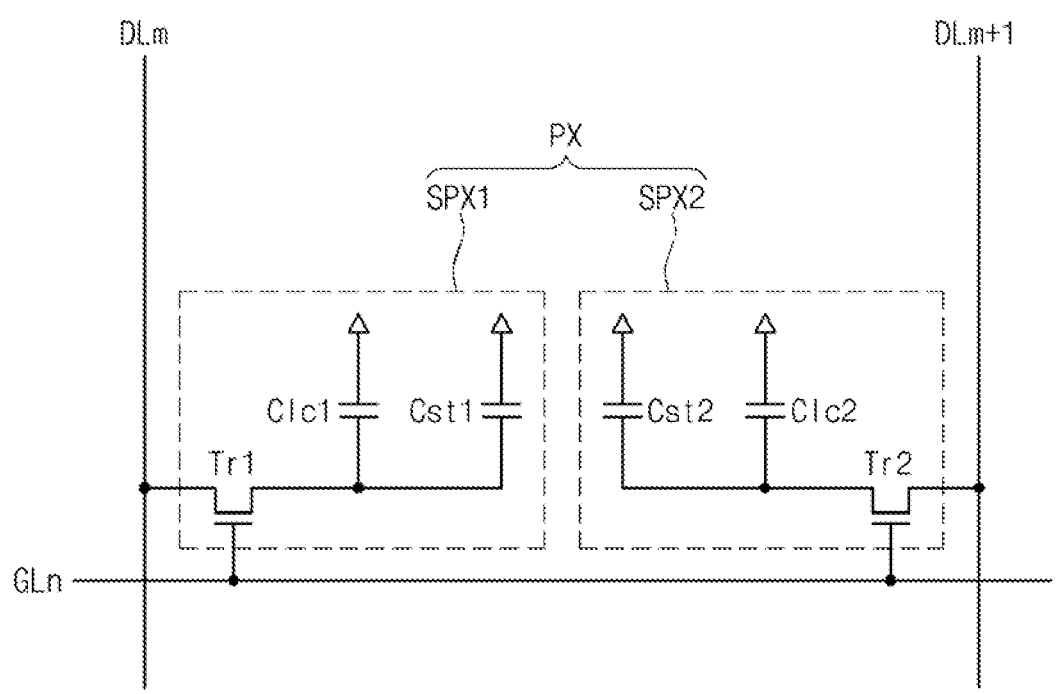
FIG. 21 is an equivalent circuit view of a pixel provided in an LCD according to a fifth exemplary embodiment.

FIG. 21 is an equivalent circuit view of a pixel provided in an LCD according to a fifth exemplary embodiment.

The LCD according to a fifth exemplary embodiment includes a plurality of pixels. However, only one of the pixels is shown in FIG. 21 for the purpose of convenience of explanation, and remaining pixels have the same structures.

Referring to FIG. 21, the pixel PX includes first and second sub-pixels SPX1 and SPX2. The first sub-pixel SPX1 includes a first thin film transistor Tr1, a first liquid crystal capacitor Clc1 and a first storage capacitor Cst1. The second sub-pixel SPX2 includes a second thin film transistor Tr2, a second liquid crystal capacitor Clc2, and a second storage capacitor Cst2. The first and second sub-pixels SPX1 and SPX2 are provided between two adjacent data lines (hereinafter, referred to as first and second data lines DLm and DLm+1).

The first thin film transistor Tr1 of the first sub-pixel SPX1 is connected to the first data line DLm and the first gate line GLn, and the second thin film transistor Tr2 of the second sub-pixel SPX2 is connected to the second data line DLm+1 and the first gate line GLn.

The first liquid crystal capacitor Clc1 is connected in parallel to the first storage capacitor Cst1, and the second liquid crystal capacitor Clc2 is connected in parallel to the second storage capacitor Cst2.

When a gate signal is applied to the gate line GLn, the first and second thin film transistors Tr1 and Tr2 are simultaneously turned on. The first data voltage applied to the first data line DLm is then transferred to the first liquid crystal capacitor Clc1 though the first thin film transistor Tr1 that has been turned on, and the second data voltage applied to the second data line DLm+1 is transferred to the second liquid crystal capacitor Clc2 though the second thin film transistor Tr2 that has been turned on. The voltage level of the first data voltage is different from that of the second data voltage. Thus, the voltage charged in the first liquid crystal capacitor Clc1 is different from the voltage charged in the second liquid crystal capacitor Clc2. According to one exemplary embodiment, if the first liquid crystal capacitor Clc1 is charged with a first pixel voltage, the second liquid crystal capacitor Clc2 is charged with a second pixel voltage that is lower than the first pixel voltage.

Figure 22:
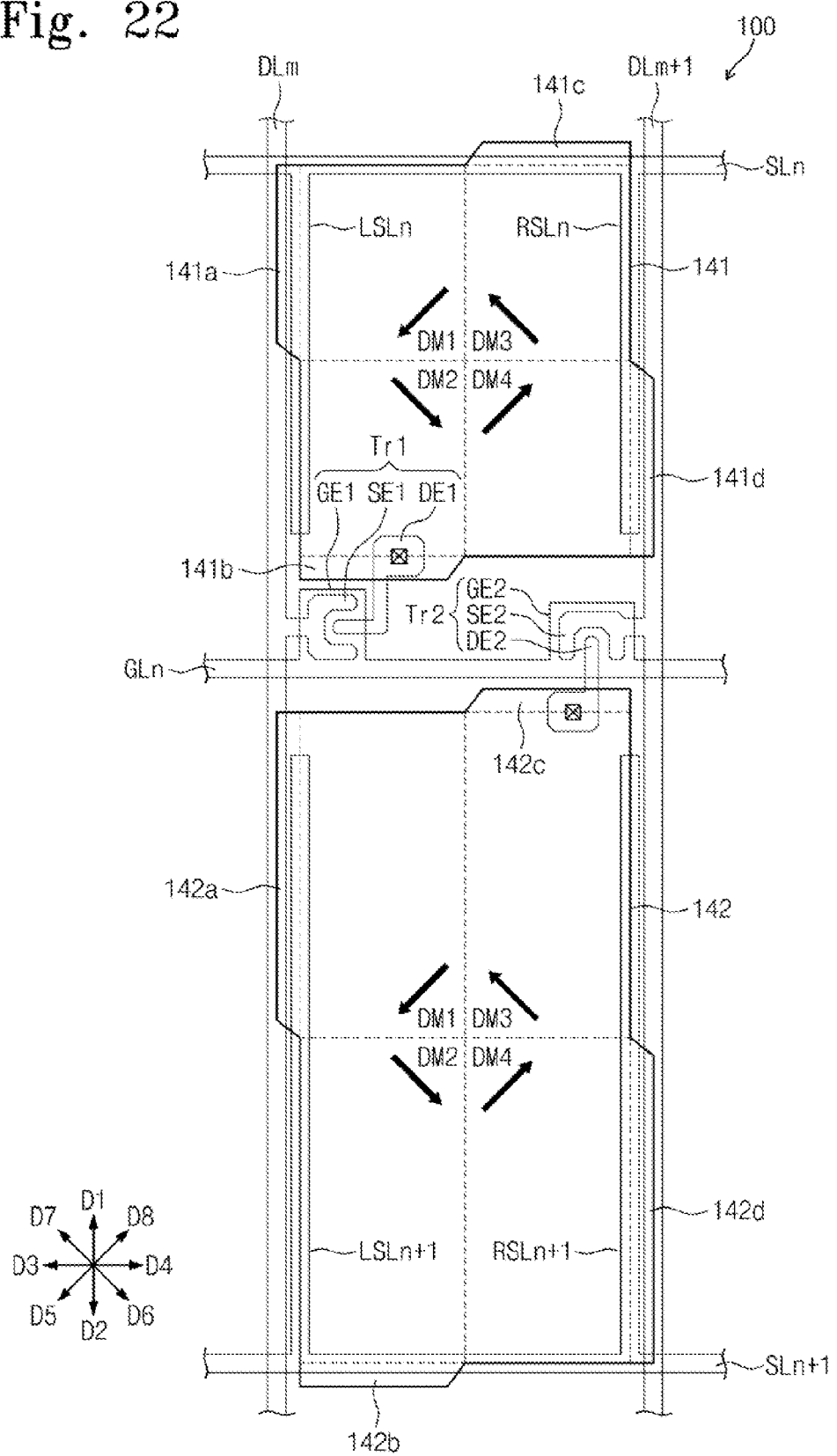
FIG. 22 is a plan view showing an array substrate provided with a pixel illustrated in FIG. 21.

FIG. 22 is a plan view showing the first substrate provided with the pixel illustrated in FIG. 21.

Referring to FIG. 22, the first substrate 100 includes first and second data lines DLm and DLm+1 extending in the second direction D2 and in parallel to each other, and the gate lines GLn extending in the third direction D3.

The first gate electrode GE1 of the first thin film transistor Tr1 branches off from the gate line GLn, and the first source electrode SE1 of the first thin film transistor Tr1 branches off from the first data line DLm. The first drain electrode DE1 of the first thin film transistor Tr1 is electrically connected to the first pixel electrode 141.

The first pixel electrode 141 partially overlaps the first storage line SLn and first and second branch electrodes LSLn and RSLn to form the first storage capacitor Cst1 (see, FIG. 21).

The first pixel electrode 141 is divided into the first to fourth domains DM1 to DM4, in which liquid crystal molecules are aligned in various directions that are different from each other. If the alignment directions of the liquid crystal molecules are sequentially rotated counterclockwise in the first to fourth domains DM1 to DM4, the first extension part 141*a* of the first pixel electrode 141 extends in the third direction D3 at the region corresponding to the first domain DM1 and overlaps the first data line DLm. In addition, the second extension part 141*b* of the first pixel electrode 141 extends in the second direction D2 at the region corresponding to the second domain DM2. Further, the third extension part 141*c* of the first pixel electrode 141 extends in the first direction D1 at the region corresponding to the third domain DM3, and the fourth extension part 141*d* of the first pixel electrode 141 extends in the fourth direction D4 at the region corresponding to the fourth domain DM4 and overlaps the second data line DLm+1.

The second gate electrode GE2 of the second thin film transistor Tr2 branches off from the gate line GLn, and the second source electrode SE2 of the second thin film transistor Tr2 branches off from the second data line DLm+1. The second drain electrode DE2 of the second thin film transistor Tr2 is electrically connected to the second pixel electrode 142.

The second pixel electrode 142 partially overlaps the second storage line SLn+1 and third and fourth branch electrodes LSLn+1 and RSLn+1 to form the second storage capacitor Cst2 (see, FIG. 21).

The second pixel electrode 142 is divided into the first to fourth domains DM1 to DM4, in which liquid crystal molecules are aligned in various directions that are different from each other. If the alignment directions of the liquid crystal molecules are sequentially rotated counterclockwise in the first to fourth domains DM1 to DM4, the fifth extension part 142*a* of the second pixel electrode 142 extends in the third direction D3 at the region corresponding to the first domain DM1 and overlaps the first data line DLm. In addition, the sixth extension part 142*b* of the second pixel electrode 142 extends in the second direction D2 at the region corresponding to the second domain DM2. Further, the seventh extension part 142*c* of the second pixel electrode 142 extends in the first direction D1 at the region corresponding to the third domain DM3, and the eighth extension part 142*d* of the second pixel electrode 142 extends in the fourth direction D4 at the region corresponding to the fourth domain DM4 and overlaps the second data line DLm+1.

Thus, the first to fourth extension parts 141*a* to 141*d* of the first pixel electrode 141 may partially overlap the black matrix 241 (see, FIG. 13). In addition, the fifth to eighth extension parts 142*a* to 142*d* of the second pixel electrode 142 may partially overlap the black matrix 241.

If the first to eighth extension parts 141*a* to 141*d* and 142*a* to 142*d* are overlapped with the black matrix 241, the region in which the liquid crystal molecules are misaligned or not aligned, which misalignment may be generated due to the fringe field, can be shifted into a light blocking region under black matrix 241. As a result, reduction of the aperture ratio and light transmittance of the LCD 400 that may be caused by the misalignment of liquid crystal molecules can be improved.

Figure 23:
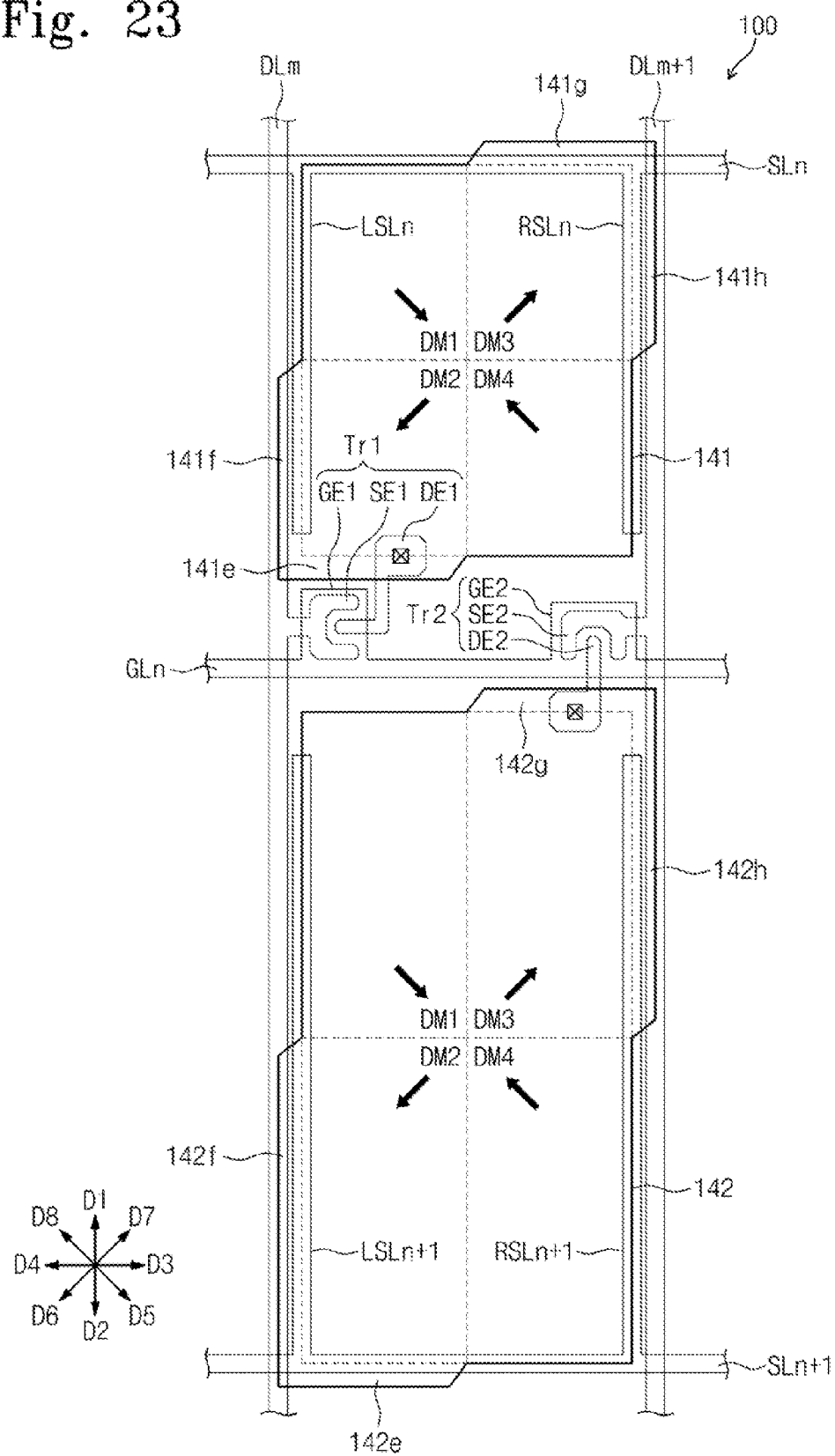
FIG. 23 is a plan view showing an array substrate provided with a pixel illustrated in FIG. 21 according to another exemplary.

FIG. 23 is a plan view showing the first substrate provided with the pixel illustrated in FIG. 21 according to another embodiment of the present invention. In the following description, details of the elements that have been described with reference to FIG. 22 will be omitted and the same reference numerals will be assigned to the same elements.

Referring to FIG. 23, each of the first and second pixel electrodes 141 and 142 is divided into the first to fourth domains DM1 to DM4, in which the liquid crystal molecules are aligned in various directions different from each other.

If the alignment direction of the liquid crystal layer 300 in the second domain DM2 is opposite to the alignment direction of the liquid crystal layer 300 in the third domain DM3, the first extension part 141*e* of the first pixel electrode 141 extends in the second direction D2 at the region corresponding to the second domain DM2, and the second extension part 141*f* of the first pixel electrode 141 extends in the fourth direction D4 at the region corresponding to the second domain DM2 while partially overlapping with the first data line DLm. Further, the third extension part 141*g* of the first pixel electrode 141 extends in the first direction D1 at the region corresponding to the third domain DM3, and the fourth extension part 141*h* of the first pixel electrode 141 extends in the third direction D3 at the region corresponding to the third domain DM3 while partially overlapping with the second data line DLm+1.

If the alignment direction of the liquid crystal layer 300 in the second domain DM2 is opposite to the alignment direction of the liquid crystal layer 300 in the third domain DM3, the fifth extension part 142*e* of the second pixel electrode 142 extends in the second direction D2 at the region corresponding to the second domain DM2, and the sixth extension part 142*f* of the second pixel electrode 142 extends in the fourth direction D4 at the region corresponding to the second domain DM2 while partially overlapping with the first data line DLm. Further, the seventh extension part 142*g* of the second pixel electrode 142 extends in the first direction D1 at the region corresponding to the third domain DM3, and the eighth extension part 142*h* of the second pixel electrode 142 extends in the third direction D3 at the region corresponding to the third domain DM3 while partially overlapping with the second data line DLm+1.

Thus, the first to fourth extension parts 141*e* to 141*h* of the first pixel electrode 141 may partially overlap the black matrix 241 (see, FIG. 16). In addition, the fifth to eighth extension parts 142*e* to 142*h* of the second pixel electrode 142 may partially overlap the black matrix 241.

If the first to eighth extension parts 141*e* to 141*h* and 142*e* to 142*h* are overlapped with the black matrix 241, the misalignment region of the liquid crystal molecules, which may be generated due to the fringe field, can be shifted into the light blocking region. As a result, reduction of the aperture ratio and light transmittance of the LCD 400 that may be caused by the misalignment of liquid crystal molecules can be improved.

Figure 24C:
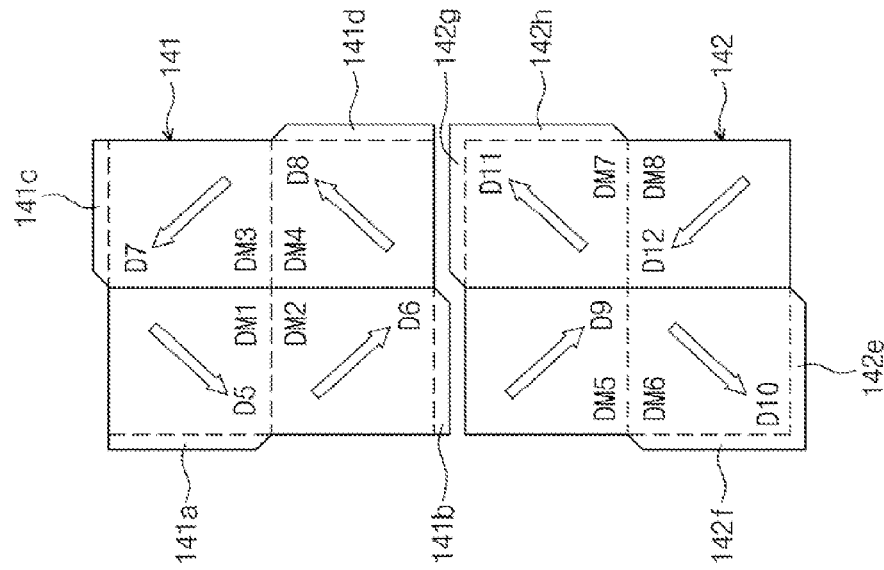
FIGS. 24A to 24C are plan views showing the alignment direction of first and second alignment layers and the shape of first and second pixel electrodes according to another exemplary embodiment.
Figure 24B:
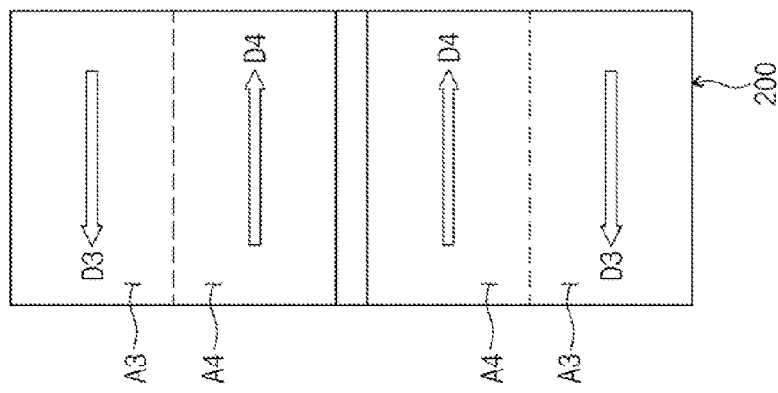
Figure 24A:
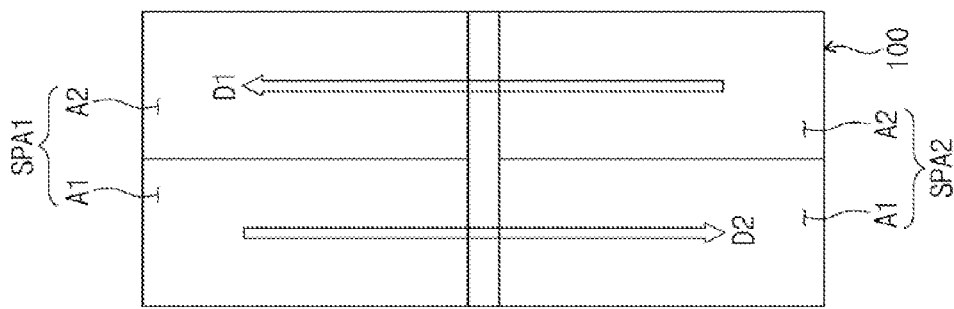

FIGS. 24A to 24C are plan views showing the alignment direction of first and second alignment layers and the shape of first and second pixel electrodes according to still another exemplary embodiment. FIG. 24A shows the alignment direction of the first alignment layer. FIG. 24B shows the alignment direction of the second alignment layer. FIG. 24C shows the first and second pixel electrodes provided in the pixel region.

Referring to FIGS. 24A to 24C, the pixel area PA is divided into first and second sub-pixel areas SPA1 and SPA2 in the first substrate 100, and each of the first and second sub-pixel areas SPA1 and SPA2 is divided into first and second areas A1 and A2. The liquid crystal molecules are aligned in the second direction D2 in the first area A1 and aligned in the first direction D1 in the second area A2.

In the second substrate 200, each of the first and second sub-pixel areas SPA1 and SPA2 is divided into third and fourth areas A3 and. The liquid crystal molecules are aligned in the third direction D3 in the third areas A3 and aligned in the fourth direction D4 in the fourth areas A4. The fourth area A4 of the first sub-pixel areas SPA1 is adjacent to the fourth area A4 of the second sub-pixel areas SPA2. In another exemplary embodiment, the third area A3 of the first sub-pixel areas SPA1 may be adjacent to the third area A3 of the second sub-pixel areas SPA2.

The first to fourth domains DM1 to DM4 are formed between the first and second substrates 100 and 200 in the first sub-pixel area SPA1. The first domain DM1 corresponds to a region in which the first and third areas A1 and A3 overlap, the second domain DM2 corresponds to a region in which the first and fourth areas A1 and A4 overlap, the third domain DM3 corresponds to a region in which the second and third areas A2 and A3 overlap, and the fourth domain DM4 corresponds to a region in which the second and fourth areas A2 and A4 overlap.

The liquid crystal molecules of the liquid crystal layer 300 are aligned in various directions that are different from each other in the first to fourth domains DM1 to DM4. In detail, in the first domain DM1, the liquid crystal molecules are aligned in the fifth direction D5 defined as a vector addition of second and third directions D2 and D3, in the second domain DM2, the liquid crystal molecules are aligned in the sixth direction D6 defined as a vector addition of second and fourth directions D2 and D4, in the third domain DM3, the liquid crystal molecules are aligned in the seventh direction D7 defined as a vector addition of first and third directions D1 and D3, and in the fourth domain DM4, the liquid crystal molecules are aligned in the eighth direction D8 defined as a vector addition of first and fourth directions D1 and D4 in the fourth domain DM4.

Therefore, the alignment directions of the liquid crystal layer 300 are sequentially rotated counterclockwise in the first to fourth domains DM1 to DM4 in each sub-pixel area SPA1 and SPA2.

Fifth to eighth domains DM5 to DM8 are formed between the first and second substrates 100 and 200 in the second sub-pixel area SPA2, in which the first and fourth areas A1 and A4 are overlapped in the fifth domain DM5, the first and third areas A1 and A3 are overlapped in the sixth domain DM6, the second and fourth areas A2 and A4 are overlapped in the seventh domain DM7, and the second and third areas A2 and A3 are overlapped in the eighth domain DM8.

The liquid crystal molecules of the liquid crystal layer 300 are aligned in various directions different from each other in the fifth to eighth domains DM5 to DM8. In detail, in the fifth domain DM5, the liquid crystal molecules are aligned in the ninth direction D9 defined as a vector addition of second and fourth directions D2 and D4, in the sixth domain DM6, the liquid crystal molecules are aligned in the tenth direction D10 defined as a vector addition of second and third directions D2 and D3, in the seventh domain DM7, the liquid crystal molecules are aligned in the eleventh direction D11 defined as a vector addition of first and fourth directions D1 and D4, and in the eighth domain DM8, the liquid crystal molecules are aligned in the twelfth direction D12 defined as a vector addition of first and third directions D1 and D3.

The liquid crystal molecules of the liquid crystal layer 300 of the fifth domain DM5 face the liquid crystal molecules of the liquid crystal layer 300 of the eighth domain DM8. In addition, the liquid crystal molecules of the liquid crystal layer 300 of the sixth domain DM6 are aligned in opposition to the liquid crystal molecules of the liquid crystal layer 300 of the seventh domain DM7.

In this manner, because a plurality of domains DM1 to DM8, in which the liquid crystal molecules are aligned in various directions, are formed in the first and second sub-pixel areas SPA1 and SPA2, the LCD 400 may have a wide viewing angle.

When the alignment directions of the liquid crystal molecules are sequentially rotated counterclockwise in the first to fourth domains DM1 to DM4, the first pixel electrode 141 may include the first extension part 141a extending in the third direction D3 at the region corresponding to the first domain DM1, the second extension part 141b extending in the second direction D2 at the region corresponding to the second domain DM2, the third extension part 141c extending in the first direction D1 at the region corresponding to the third domain DM3, and the fourth extension part 141d extending in the fourth direction D4 at the region corresponding to the fourth domain DM4.

In addition, when the alignment direction of the liquid crystal molecules in the fifth domain DM5 faces the alignment direction of the liquid crystal molecules in the eighth domain DM8, the second pixel electrode 142 may include the fifth and sixth extension parts 142e and 142f extending in the second and third directions D2 and D3 at the region corresponding to the sixth domain DM6, respectively, and the seventh and eighth extension parts 142g and 142h extending in the first and fourth directions D1 and D4 at the region corresponding to the seventh domain DM7, respectively.

Referring to FIG. 24C, the alignment directions of the liquid crystal molecules are rotated counterclockwise in the first sub-pixel area SPA1, and the alignment direction of the liquid crystal molecules in the fifth domain DM5 faces the alignment direction of the liquid crystal molecules in the eighth domain DM8 in the second sub-pixel area SPA2. However, according to another exemplary embodiment, the alignment directions of the liquid crystal molecules may rotate clockwise in the first sub-pixel area SPA1, and the alignment direction of the liquid crystal molecules in the sixth domain DM6 may face the alignment direction of the liquid crystal molecules in the seventh domain DM7 in the second sub-pixel area SPA2.

Figure 25:
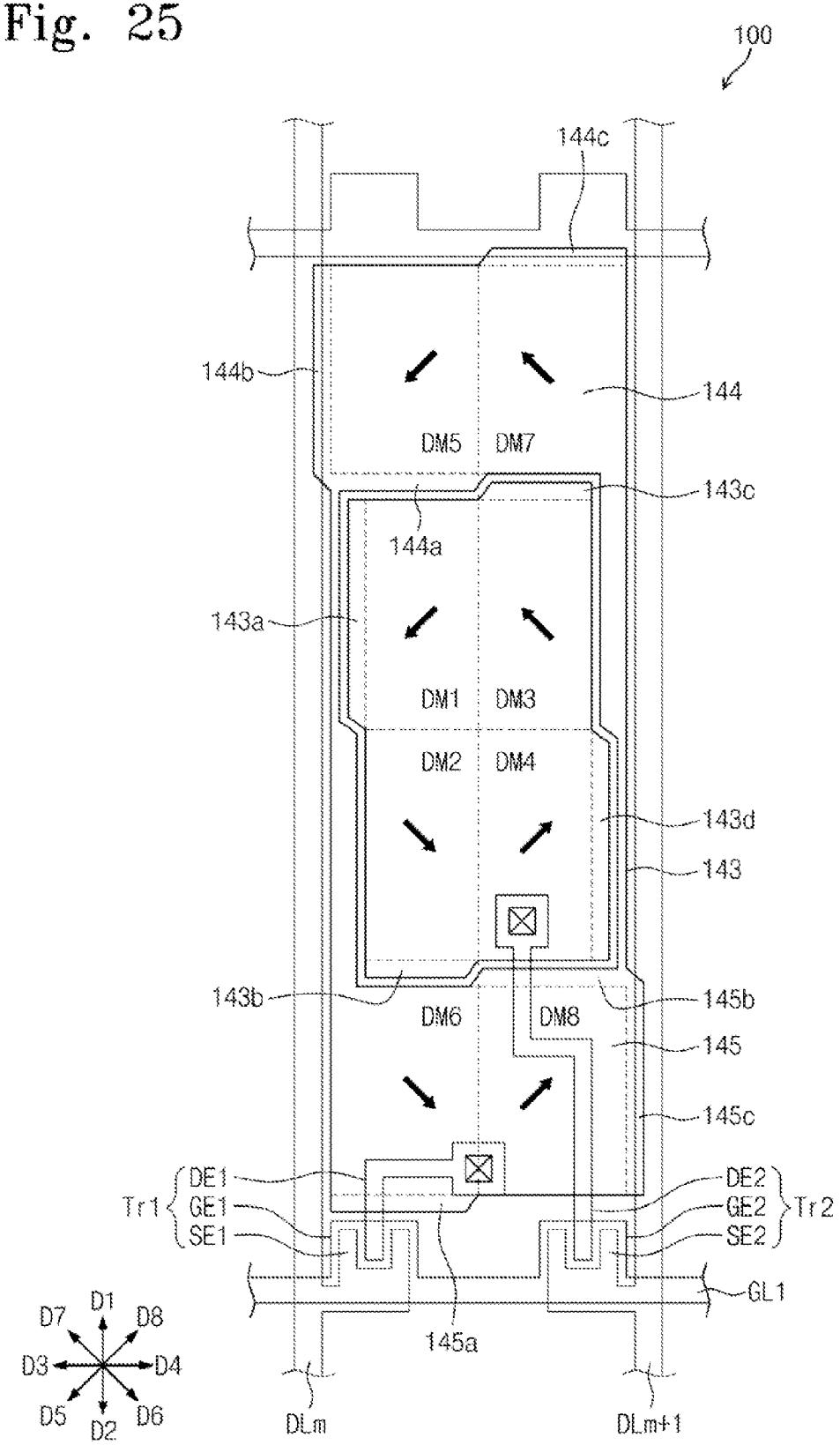
FIG. 25 is a plan view showing an array substrate according to another exemplary embodiment.

FIG. 25 is a plan view showing the first substrate according to another exemplary embodiment. In FIG. 25, only one of the pixels provided in the first substrate 100 is illustrated for the purpose of explanation.

Referring to FIG. 25, the first substrate 100 includes first and second data lines DLm and DLm+1 extending in the second direction D2 and in parallel to each other, and the gate lines GLn extending in the third direction D3. Each pixel of the first substrate 100 includes the first thin film transistor Tr1, the third pixel electrode 143, the second thin film transistor Tr2, and the fourth pixel electrode. The fourth pixel electrode is divided into a first electrode part 144 and a second electrode part 145.

The first thin film transistor Tr1 is connected to the first data line DLm and the gate line GLn, and the second thin film transistor Tr2 is connected to the second data line DLm+1 and the gate line GLn.

The first gate electrode GE1 of the first thin film transistor Tr1 branches off from the gate line GLn, and the first source electrode SE1 of the first thin film transistor Tr1 branches off from the first data line DLm. The first drain electrode DE1 of the first thin film transistor Tr1 is electrically connected to the third pixel electrode 143. The second gate electrode GE2 of the second thin film transistor Tr2 branches off from the gate line GLn, and the second source electrode SE2 of the second thin film transistor Tr2 branches off from the second data line DLm+1. The second drain electrode DE2 of the second thin film transistor Tr2 is electrically connected to the fourth pixel electrode.

The first and second electrode parts 144 and 145 are electrically connected to each other while being spaced apart from each other in the second direction D2. The first pixel electrode 143 is interposed between the first and second electrode parts 144 and 145 while being electrically insulated from the first and second electrode parts 144 and 145.

As shown in FIG. 25, the third pixel electrode 143 is divided into the first to fourth domains DM1 to DM4, in which liquid crystal molecules are aligned in various directions that are different from each other. When the alignment directions of the liquid crystal molecules are sequentially rotated counterclockwise in the first to fourth domains DM1 to DM4, the third pixel electrode 143 includes the first extension part 143a extending in the third direction D3 at the region corresponding to the first domain DM1 and overlapping the first data line DLm, and the second extension part 143b extending in the second direction D2 at the region corresponding to the second domain DM2. Further, the first pixel electrode 143 includes the third extension part 143c extending in the first direction D1 at the region corresponding to the third domain DM3, and the fourth extension part 143d extending in the fourth direction D4 at the region corresponding to the fourth domain DM4 and overlapping the second data line DLm+1.

In addition, the first and second electrode parts 144 and 145 are each divided into two domains to make the fifth to eighth domains DM5 to DM8, in which liquid crystal molecules are aligned in various directions that are different from each other. When the alignment directions of the liquid crystal molecules are sequentially rotated counterclockwise in the fifth to eighth domains DM5 to DM8, the first electrode part 144 includes the fifth extension part 144a extending in the second direction D2 at the region corresponding to the fifth domain DM5, the sixth extension part 144b extending in the third direction D3 at the region corresponding to the fifth domain DM5 and overlapping the first data line DLm, and the seventh extension part 144c extending in the first direction D1 at the region corresponding to the seventh domain DM7.

In addition, the second electrode part 145 includes the eighth extension part 145a extending in the second direction D2 at the region corresponding to the sixth domain DM6, the ninth extension part 145b extending in the first direction D1 at the region corresponding to the eighth domain DM8, and the tenth extension part 145c extending in the fourth direction D4 at the region corresponding to the eighth domain DM8.

Although not shown in the drawings, the first to fourth extension parts 143a to 143d of the third pixel electrode 143 may partially overlap the black matrix 241 (see, FIG. 13). In addition, the fifth to seventh extension parts 144a to 144c of the first electrode part 144 and the eight to tenth extension 145a to 145c of the second electrode part 145 may partially overlap with the black matrix 241.

When the first to tenth extension parts 143a to 143d, 144a to 144c and 145a to 145c are overlapped with the black matrix 241, the misalignment region of the liquid crystal molecules, which may be generated due to the fringe field, can be shifted into the light blocking region. As a result, reduction of the aperture ratio and light transmittance of the LCD 400 that may be caused by misalignment of liquid crystal molecules can be improved.

Figure 26:
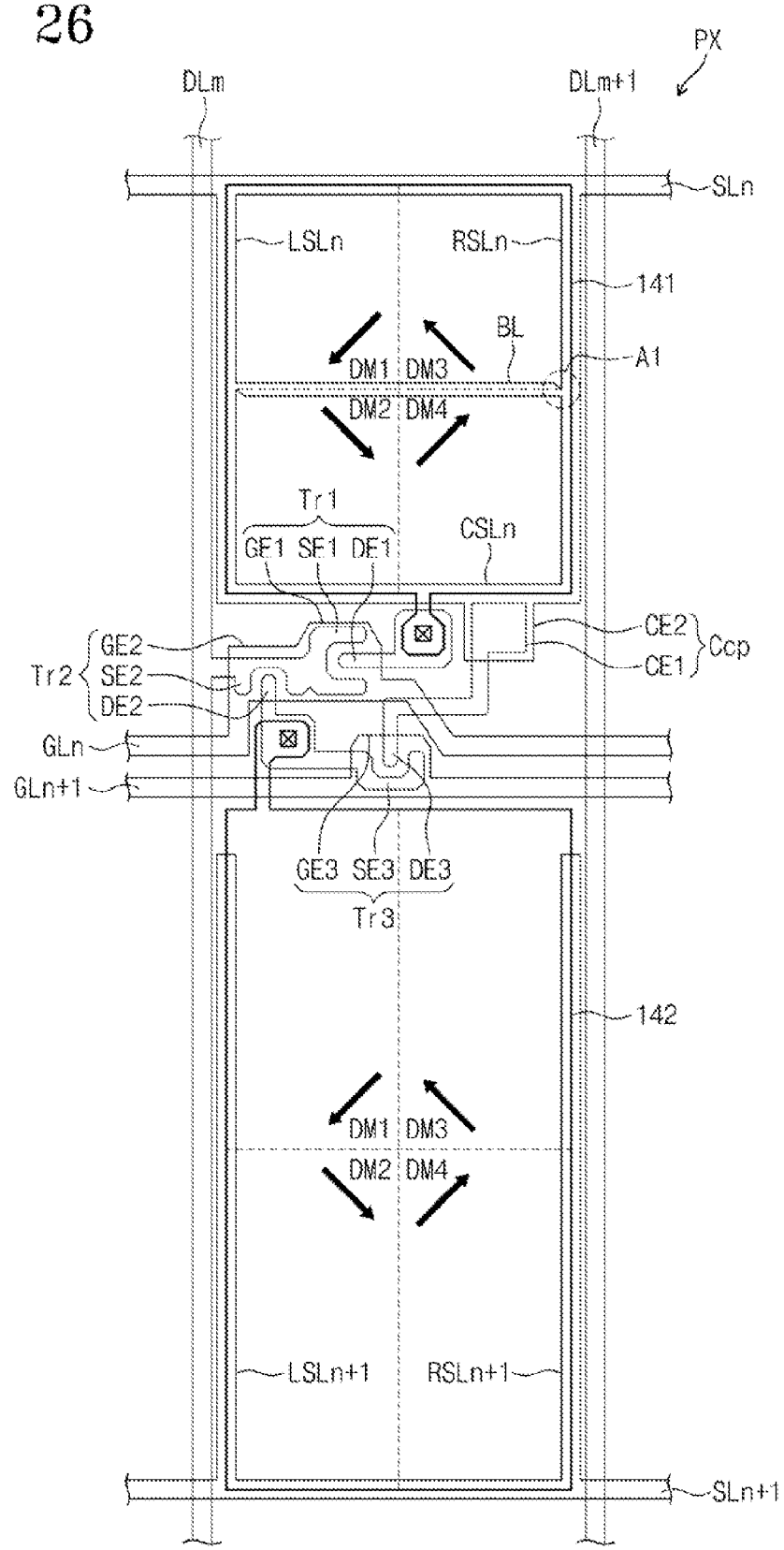
FIG. 26 is a plan view showing an LCD according to a sixth exemplary embodiment.

FIG. 26 is a plan view showing an LCD according to a sixth exemplary embodiment. In the following description, details of the elements that have been described with reference to FIG. 12 will be omitted and the same reference numerals will be assigned to the same elements.

Referring to FIG. 26, the pixel PX further includes a light blocking layer BL corresponding to the first pixel electrode 141. In particular, the light blocking layer BL may be provided at a boundary region among the first to fourth domains DM1 to DM4. According to one exemplary embodiment, the light blocking layer BL has a stripe shape extending in parallel to the first storage line SLn and is provided at the boundary region between the first and second domains DM1 and DM2 and between the third and fourth domains DM3 and DM4.

In addition, both ends of the light blocking layer BL are connected to the first and second branch electrodes LSLn and RSLn branched off from the first storage line SLn, respectively. Both ends of the light blocking layer BL may be chamfered in the direction parallel to the alignment direction of the liquid crystal molecules in at least one of two domains adjacent to each other on either side of the light blocking layer BL.

For instance, a first end of the light blocking layer BL connected to the first branch electrode LSLn may be chamfered in the direction parallel to the alignment direction of the liquid crystal molecules in at least one of the first and second domains DM1 and DM2. According to one exemplary embodiment, the first end of the light blocking layer BL is chamfered in the direction parallel to the alignment direction of the liquid crystal molecules in the second domain DM2.

In addition, a second end of the light blocking layer BL connected to the second branch electrode RSLn may be chamfered in the direction parallel to the alignment direction of the liquid crystal molecules in at least one of the third and fourth domains DM3 and DM4. According to one exemplary embodiment, the second end of the light blocking layer BL is chamfered in the direction parallel to the alignment direction of the liquid crystal molecules in the third domain DM3.

Although FIG. 26 shows the light blocking layer BL having the stripe shape, the present invention is not limited thereto. According to another exemplary embodiment, the light blocking layer BL may have a cross shape extending to the boundary region between the first and third domains DM1 and DM3 and the boundary region between the second and fourth domains DM2 and DM4. In this case, four edges of the light blocking layer BL may be chamfered in the direction parallel to the alignment direction of the liquid crystal molecules in corresponding domains.

In addition, although FIG. 26 shows the light blocking layer BL provided at the boundary region among the first to fourth domains DM1 to DM4 of the first pixel electrode 141, the present invention is not limited thereto. According to another exemplary embodiment, the light blocking layer BL may be provided at the boundary region among the first to fourth domains DM1 to DM4 of the second pixel electrode 142.

If the light blocking layer BL is provided at the boundary region among the first to fourth domains DM1 to DM4, a texture detect in the display caused by the misalignment of the liquid crystal molecules at the boundary region among the first to fourth domains DM1 to DM4 may not be visible.

In addition, if the first and second ends of the light blocking layer BL are chamfered, the aperture ratio and the light transmittance of the pixel PX can be improved.

Figure 27A:
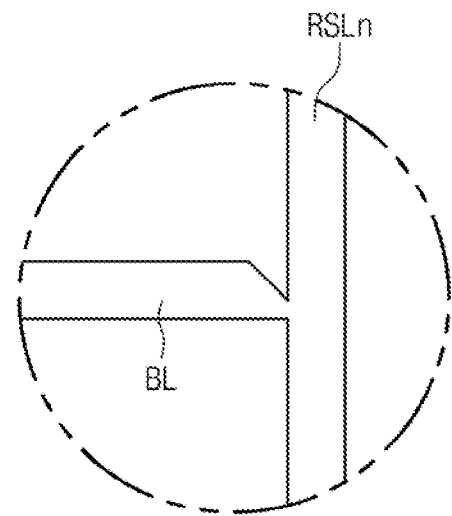
FIG. 27A is an enlarged view of A1 shown in FIG. 26.

FIG. 27A is an enlarged view of A1 shown in FIG. 26.

Referring to FIG. 27A, the light blocking layer BL branches off from the second branch electrode RLSn. The second end of the light blocking layer BL connected to the second branch electrode RSLn may be chamfered in the direction parallel to the alignment direction of the liquid crystal molecules in the third domain DM3 (see, FIG. 26).

If the light blocking layer BL is connected to the first storage line SLn (see, FIG. 26) through the second branch electrode RSLn, the light blocking layer BL receives the storage voltage from the first storage line SLn. Therefore, the light blocking layer BL may increase the capacitance of the first storage capacitor Cst1 provided between the light blocking layer BL and the first pixel electrode 141.

Although only the second end of the light blocking layer BL is shown in FIG. 27A, the first end of the light blocking layer BL may branch off from the first branch electrode LSLn.

Figure 27B:
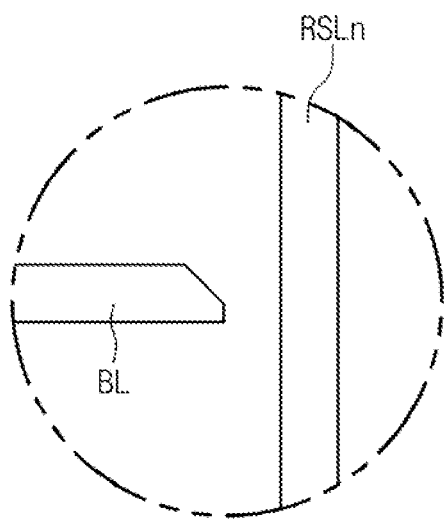
FIG. 27B is a plan view of A1 shown in FIG. 26 according to another exemplary embodiment.

FIG. 27B is a plan view of A1 shown in FIG. 26 according to another exemplary embodiment.

Referring to FIG. 27B, the light blocking layer BL is spaced apart from the second branch electrode RSLn. If the second end of the light blocking layer BL is electrically insulated from the second branch electrode RSLn, the light blocking layer BL does not receive the storage voltage from the storage line SLn. Thus, the light blocking layer BL does not perform the function of improving the capacitance of the first storage capacitor Cst1.

However, if the light blocking layer BL is spaced apart from the second branch electrode RSLn, the aperture ratio and the light transmittance of the pixel may be improved corresponding to the gap between the light blocking layer BL and the second branch electrode RSLn.

Although not shown in the drawings, the first end of the light blocking layer BL can be electrically connected to or insulated from the first branch electrode LSLn. If the first end of the light blocking layer BL is electrically connected to the first branch electrode LSLn, the light blocking layer BL receives the storage voltage through the first branch electrode LSLn even if the second end of the light blocking layer BL is electrically insulated from the second branch electrode RSLn, so the light blocking layer BL can improve the capacitance of the first storage capacitor Cst1.

However, if the first end of the light blocking layer BL is electrically insulated from the first branch electrode LSLn, the light blocking layer BL is in a floating state. Thus, the light blocking layer BL may not perform the function of improving the capacitance of the first storage capacitor Cst1. However, the aperture ratio and the light transmittance of the pixel may be improved corresponding to the gap between the first end of the light blocking layer BL and the first branch electrode LSLn.

Figure 28:
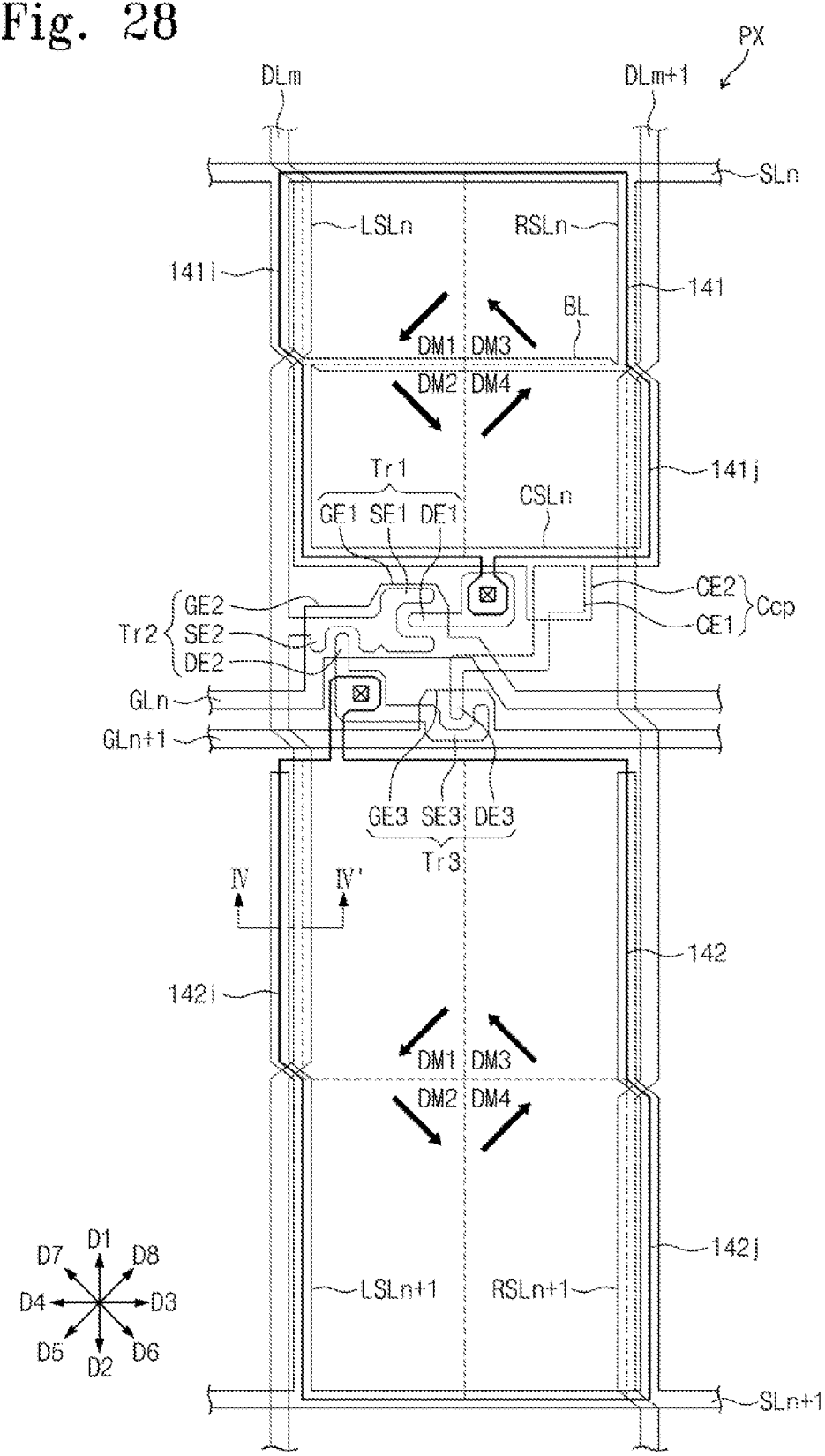
FIG. 28 is a plan view showing a pixel of an LCD according to a seventh exemplary embodiment.
Figure 29:
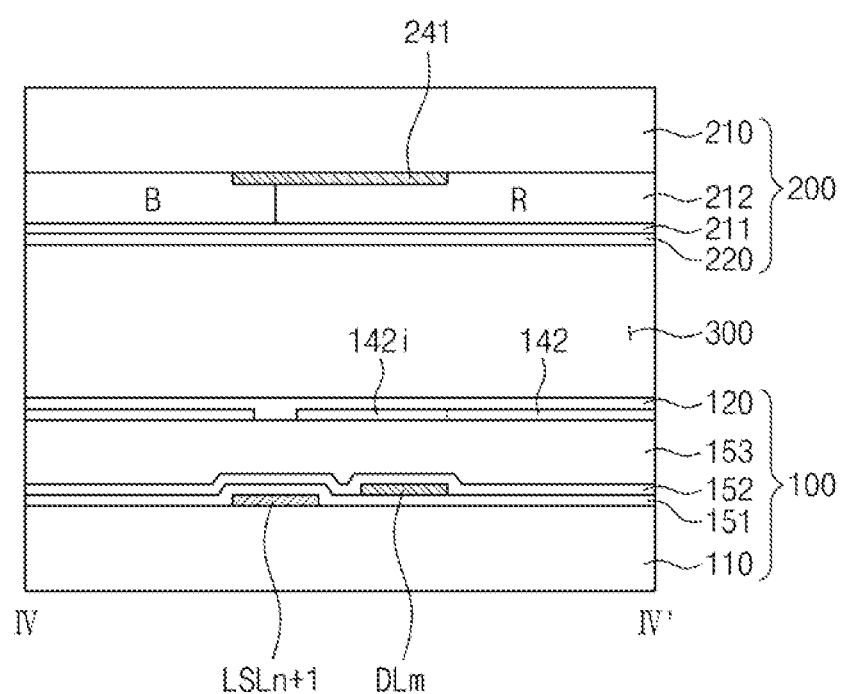
FIG. 29 is a sectional view taken along line IV-IV' of FIG. 28.

FIG. 28 is a plan view showing a pixel of an LCD according to a seventh exemplary embodiment, and FIG. 29 is a sectional view taken along line IV-IV' of FIG. 28.

Referring to FIG. 28. each of the first and second pixel electrodes 141 and 142 is divided into the first to fourth domains DM1 to DM4, in which the alignment directions of the liquid crystal molecules are sequentially rotated counterclockwise in the first to fourth domains DM1 to DM4. In detail, in the first domain DM1, the liquid crystal molecules are aligned in the fifth direction D5 defined as a vector addition of second and fourth directions D2 and D4, in the second domain DM2, the liquid crystal molecules are aligned in the sixth direction D6 defined as a vector addition of second and third directions D2 and D3, in the third domain DM3, the liquid crystal molecules are aligned in the seventh direction D7 defined as a vector addition of first and fourth directions D1 and D4, and in the fourth domain, the liquid crystal molecules are aligned in the eighth direction D8 defined as a vector addition of first and third directions D1 and D3.

The first pixel electrode 141 may include a first extension part 141i extending in the fourth direction D4 at the region corresponding to the first domain DM1, and a second extension part 141j extending in the third direction D3 at the region corresponding to the second domain DM2. In addition, the first pixel electrode 141 may include a third extension part 142i extending in the fourth direction D4 at the region corresponding to the first domain DM1, and a fourth extension part 142j extending in the third direction D3 at the region corresponding to the fourth domain DM4.

The first data line DLm is bent inward of the first extension part 141i at the region corresponding to the first extension part 141i, and then bent outward at the region adjacent to the second domain DM2 of the first pixel electrode 141. In addition, the first data line DLm is bent inward of the third extension part 142i at the region corresponding to the third extension part 142i, and then bent outward at the region adjacent to the second domain DM2 of the second pixel electrode 142. Thus, the first data line DLm is bent four times for each pixel.

The second data line DLm+1 is bent inward of the second extension part 141j at the region corresponding to the second extension part 141j, and then bent outward at the region adjacent to the third domain DM3 of the second pixel electrode 142. In addition, the second data line DLm+1 is bent inward of the fourth extension part 142j at the region corresponding to the fourth extension part 142j, and then bent outward at the region where the fourth extension part 142j ends. Thus, the second data line DLm+1 is bent four times for each pixel.

A fringe field is generated at the edges of the first and second pixel electrodes 141 and 142 corresponding to the alignment direction of the liquid crystal molecules of each domain. In particular, the fringe field is generated at the left lateral side of the first domain DM1 and the right lateral side of the fourth domain DM4. When the fringe field is generated, the liquid crystal molecules are abnormally aligned in the region where the fringe field is generated.

The first to fourth extension parts 141i, 141j, 142i, and 142j are formed corresponding to the regions where the fringe field is generated, so that the edge parts of the first and second pixel electrodes 141 and 142 are shifted into the black matrix region. Thus, if the first to fourth extension parts 141i, 141j, 142i, and 142j are formed, a texture defect caused by the misalignment of the liquid crystal molecules may not be visible.

Referring to FIG. 29, the third extension part 142i of the second pixel electrode 142 is formed on the second substrate 200 where the black matrix 241 is formed. In addition, the first data line DLm is located inward of the first branch electrode LSLn while overlapping with the third extension part 142i. Thus, a texture defect caused by the misalignment of the liquid crystal molecules may not be visible.

Figure 30:
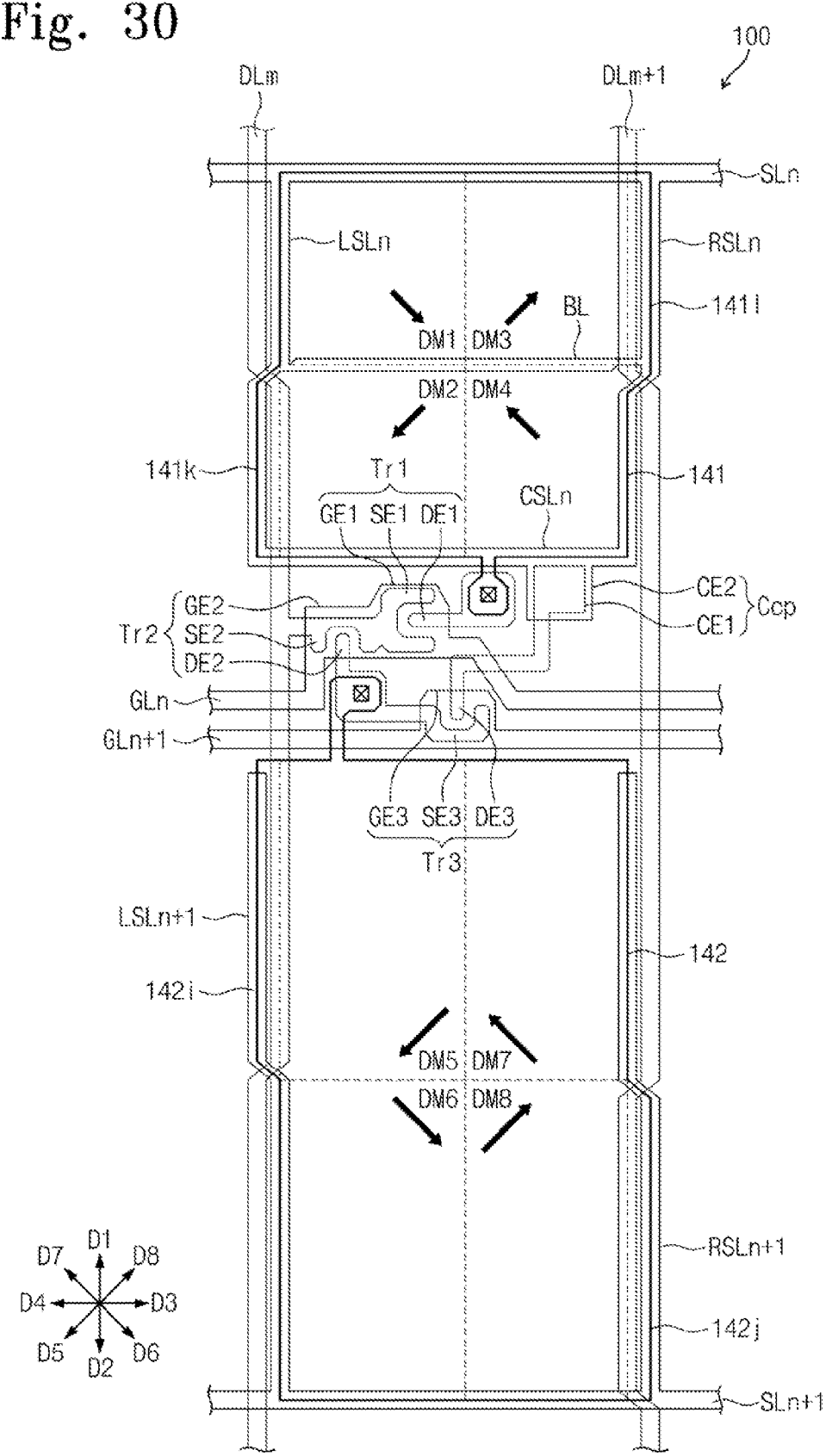
FIG. 30 is a plan view showing a pixel of an LCD according to an eighth exemplary embodiment.

FIG. 30 is a plan view showing a pixel of an LCD according to an eighth exemplary embodiment.

Referring to FIG. 30, the first pixel electrode 141 is divided into the first to fourth domains DM1 to DM4, in which the alignment direction of the liquid crystal molecules in the first domain DM1 faces the alignment direction of the liquid crystal molecules in the forth domain DM4, and the alignment direction of the liquid crystal molecules in the second domain DM2 is opposite to the alignment direction of the liquid crystal molecules in the third domain DM3. That is, the alignment directions of the liquid crystal molecules in the first to fourth domains can be defined as a convergent and divergent type.

In detail, in the first domain DM1, the liquid crystal molecules are aligned in the sixth direction D6 defined as a vector addition of second and third directions D2 and D3, in the second domain DM2, the liquid crystal molecules are aligned in the fifth direction D5 defined as a vector addition of second and fourth directions D2 and D4, in the third domain DM3, the liquid crystal molecules are aligned in the eighth direction D8 defined as a vector addition of first and third directions D1 and D3, and in the fourth domain DM4, the liquid crystal molecules are aligned in the seventh direction D7 defined as a vector addition of first and fourth directions D1 and D4.

The first pixel electrode 141 may include a fifth extension part 141k extending in the fourth direction D4 in the second domain DM2, and a sixth extension part 141l extending in the third direction D3 in the third domain DM3.

The second pixel electrode 142 is divided into the fifth to eighth domains DM5 to DM8, in which the alignment directions of the liquid crystal molecules are sequentially rotated counterclockwise in the fifth to eight domains DM5 to DM8. In detail, in the fifth domain DM5, the liquid crystal molecules are aligned in the fifth direction D5 defined as a vector addition of second and fourth directions D2 and D4, in the sixth domain DM6, the liquid crystal molecules are aligned in the sixth direction D6 defined as a vector addition of second and third directions D2 and D3, in the seventh domain DM7, the liquid crystal molecules are aligned in the seventh direction D7 defined as a vector addition of first and fourth directions D1 and D4, and in the eighth domain DM8, the liquid crystal molecules are aligned in the eighth direction D8 defined as a vector addition of first and third directions D1 and D3.

The second pixel electrode 142 may include a third extension part 142i extending in the fourth direction D4 in the fifth domain DM5, and a fourth extension part 142j extending in the third direction D3 in the eighth domain DM8.

The first data line DLm is bent inward of the fifth extension part 141k at the region corresponding to the fifth extension part 141k, and then extends to the inside of the third extension part 142i of the second pixel electrode 142 without being bent. Then, the first data line DLm is bent outward at the region where the third extension part 142i of the second pixel electrode 142 ends and positioned outside the sixth domain DM6 of the second pixel electrode 142. Thus, the first data line DLm is bent at least two times for each pixel.

In addition, the second data line DLm+1 is positioned inward of the sixth extension part 141l and then bent outward at the region where the sixth extension part 141l ends. Then, the second data line DLm+1 extends without being bent and until the region where the fourth extension part 142j of the second pixel electrode 142 starts, and is bent inward of the fourth extension part 142j. Thus, the second data line DLm+1 is bent two times for each pixel.

As a result, the number of times the first and second data lines DLm and DLm+1 are bent as shown in FIG. 30 is smaller than the number of times the first and second data lines DLm and DLm+1 are bent as shown in FIG. 28. Therefore, if the alignment direction of the liquid crystal molecules in the first to fourth domains DM1 to DM4 of the first pixel electrode 141 is configured as the convergent and divergent type and the alignment directions of the fifth and eighth domains DM5 to DM8 of the second pixel electrode 142 are sequentially rotated counterclockwise, the number of times the first and second data lines DLm and DLm+1 are bent can be reduced.

If the number of times the first and second data lines DLm and DLm+1 are bent is reduced, interconnection resistance can be reduced and the product yield of the LCD can be improved.

Figure 31A:
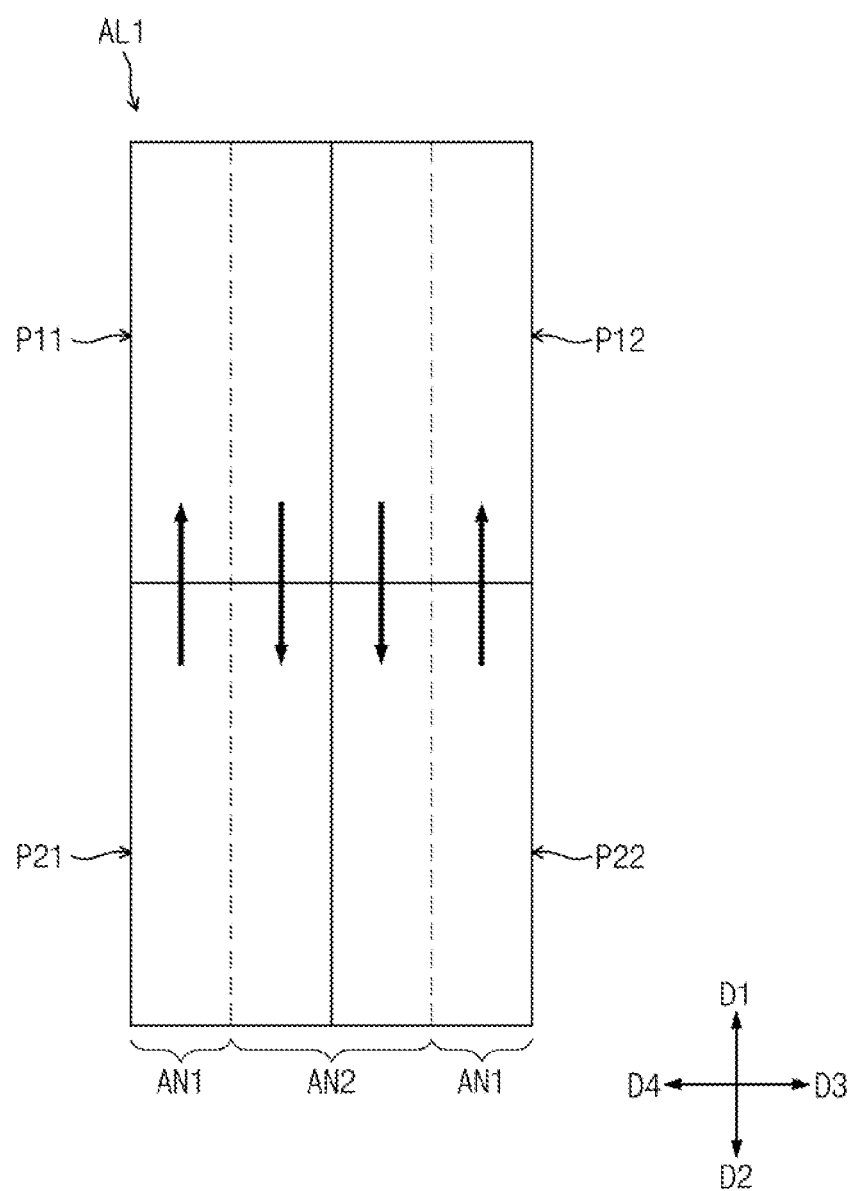
FIG. 31A is a plan view showing the alignment direction of a first substrate in an LCD according to a ninth exemplary embodiment.
Figure 31B:
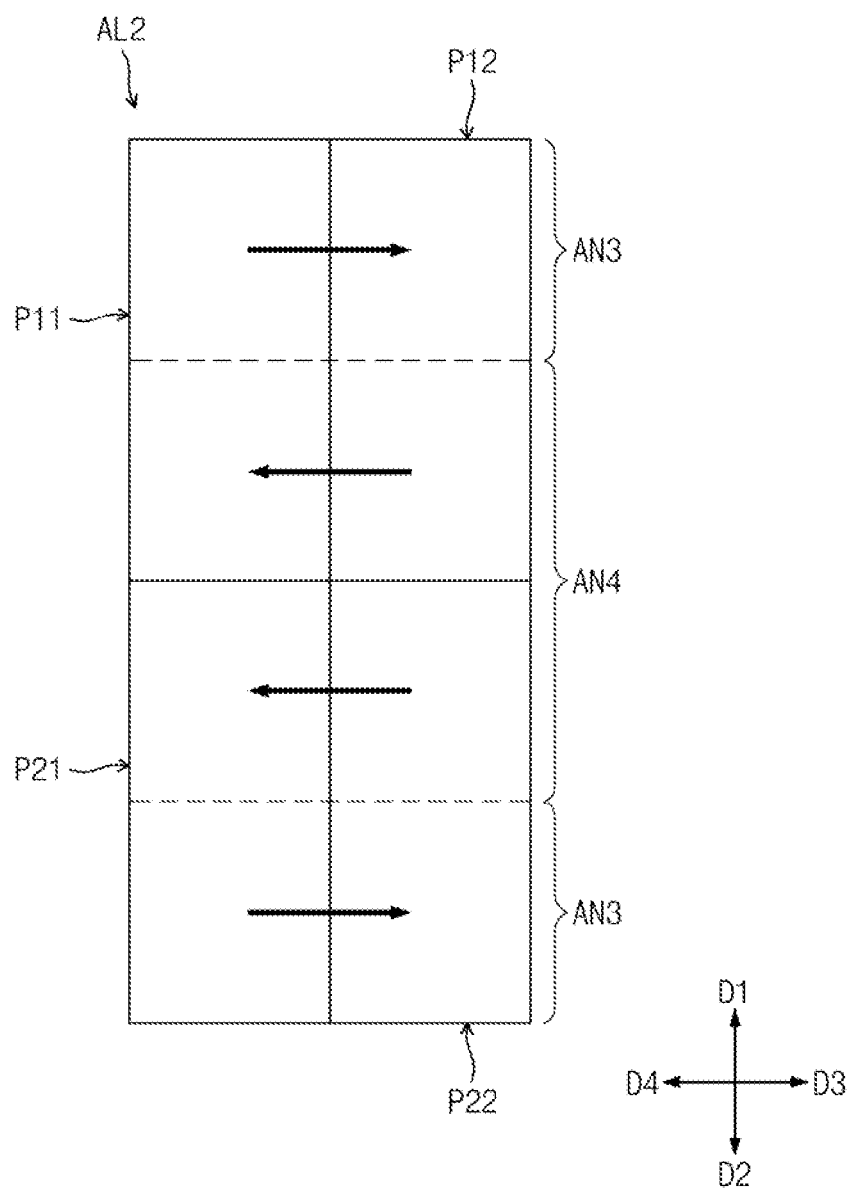
FIG. 31B is a plan view showing the alignment direction of a second substrate in an LCD according to a ninth exemplary embodiment.
Figure 31C:
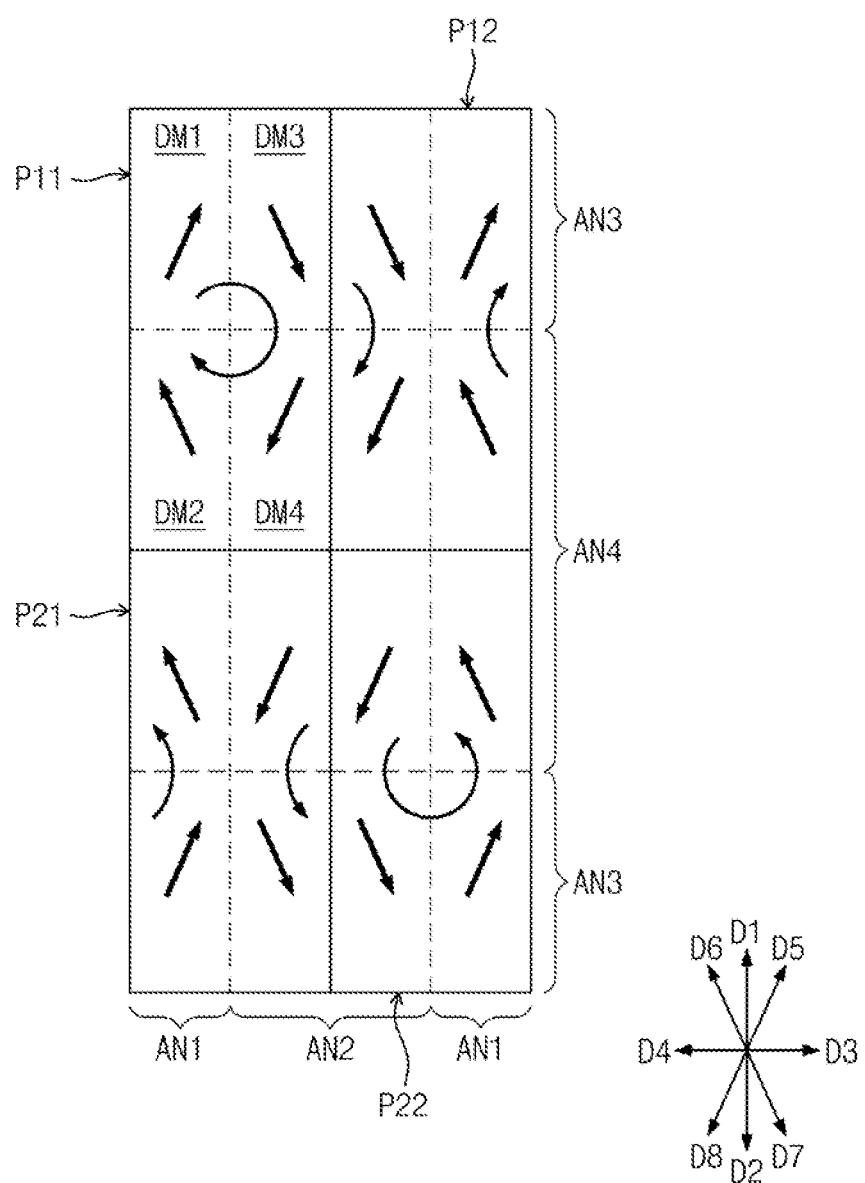
FIG. 31C is a sectional view showing the alignment of a liquid crystal layer when a first substrate of FIG. 31A is coupled with a second substrate of FIG. 31B.

Hereinafter, the alignment direction of the liquid crystal molecules in the LCD according to one exemplary embodiment will be described with reference to FIGS. 31A to 31C. FIGS. 31A and 31B are plan views showing the alignment direction of pixel areas in, respectively, the first substrate 100 and the second substrate 200 of an LCD according to a ninth exemplary embodiment, in which the liquid crystal molecules are aligned, using the alignment methods described above, as indicated by arrows. FIG. 31C is a sectional view showing the alignment directions of the liquid crystal layer 300 when the first substrate 100 of FIG. 31A is coupled with the second substrate 200 of FIG. 31B, in which the alignment directions are the sum of the alignment directions of the first and second substrates 100 and 200. The alignment directions shown in FIG. 31C correspond to the vector addition of the alignment directions of the first substrate 100 and the alignment directions of the second substrate 200.

In FIGS. 31A to 31C, four pixel areas P11, P12, P21 and P22 selected from the plurality of pixel areas PA and aligned in the form of 2×2 matrix are shown to illustrate the alignment directions of the liquid crystal molecules in each pixel area PA and adjacent pixel areas PA. The solid line indicates the boundary of the pixel areas PA, and the dotted line indicates the boundary of the alignment regions.

In addition, the four pixel areas P11, P12, P21 and P22 aligned in the form of 2×2 matrix may be referred to as the four sub-pixel areas. In FIGS. 31A-31C, the four sub-pixel areas are aligned in the form of 2×2 matrix to constitute one pixel area. In addition, in the case in which each of the pixel areas PA is referred to as a sub-pixel area, the alignment directions of each pixel area may be identical to the alignment directions shown in FIGS. 31A to 31C.

Further, although the pixel area PA illustrated in FIGS. 31A to 31C has a rectangular shape, which is long in the longitudinal direction and short in the transverse direction, the present invention is not limited thereto. The pixel area PA may, for example, have a rectangular shape, which is long in the transverse direction and short in the longitudinal direction.

Referring to FIG. 31A, the first substrate 100 is provided with pixel areas aligned in the form of 2×2 matrix pattern. That is, the first substrate 100 includes a first pixel area P11 positioned at the first row and first column, a second pixel area P12 positioned at the first row and second column, a third pixel area P21 positioned at the second row and first column, and a fourth pixel area P22 positioned at the second row and second column.

The first alignment layer 120 includes first and second alignment regions AN1 and AN2. The alignment direction of the liquid crystal 300 in the first alignment region AN1 is opposite to the alignment direction of the liquid crystal 300 in the second alignment region AN2. The liquid crystal layer 300 is aligned in the first direction D1 in the first alignment region AN1 and the liquid crystal layer 300 is aligned in the second direction D2 opposite to the first direction D1 in the second alignment region AN2. The first and second directions D1 and D2 are the column direction of the matrix. Third and fourth directions D3 and D4 are the row direction of the matrix.

In one exemplary embodiment, the first alignment layer 120 includes two first alignment regions AN1, the second alignment region AN2 is disposed between the two first alignment regions AN1.

The second alignment region AN2 may partially overlap two adjacent pixel areas which are provided in the same row. In detail, the second alignment region AN2 may partially cover the first and second pixel areas P11 and P12 adjacent to each other in the first row. In addition, the second alignment region AN2 may partially cover the third and fourth pixel areas P21 and P22 adjacent to each other in the second row.

According to the present exemplary embodiment, the overlapping area of the second alignment region AN2 with respect to one of the two adjacent pixel areas, which are provided in the same row, is substantially identical to the overlapping area of the second alignment region AN2 with respect to the other of the two adjacent pixel areas, but the present invention is not limited thereto. For instance, the overlapping area of the second alignment region AN2 with respect to the first pixel area P11 may be larger or smaller than the overlapping area of the second alignment region AN2 with respect to the second pixel area P12. In this manner, the amount area of covered by the alignment region in each pixel area can be variously adjusted.

The second substrate 200 having the pixel areas aligned in the form of 2×2 matrix corresponding to the pixel areas of the first substrate 100 is shown in FIG. 31B. Referring to FIG. 31B, the second alignment layer 220 includes third and fourth alignment regions AN3 and AN4. The alignment direction of the liquid crystal 300 in the third alignment region AN3 is opposite to the alignment direction of the liquid crystal 300 in the fourth alignment region AN4. The liquid crystal layer 300 is aligned in the third direction D3 in the third alignment region AN3, and the liquid crystal layer 300 is aligned in the fourth direction D4 opposite to the third direction D3 in the fourth alignment region AN4. The third and fourth directions D3 and D4 are the row direction of the matrix and substantially perpendicular to the first and second directions D1 and D2.

In one exemplary embodiment, the second alignment layer 220 includes two third alignment regions AN3, the fourth alignment region AN4 is disposed between the two third alignment regions AN3.

The fourth alignment region AN4 may partially overlap two adjacent pixel areas which are provided in the same column. In detail, the fourth alignment region AN4 may partially cover the first and third pixel areas P11 and P21 adjacent to each other in the first column. In addition, the fourth alignment region AN4 may partially cover the second and fourth pixel areas P12 and P22 adjacent to each other in the second column.

According to the present exemplary embodiment, the overlapping area of the fourth alignment region AN4 with respect to one of the two adjacent pixel areas, which are provided in the same column, is substantially identical to the overlapping area of the fourth alignment region AN4 with respect to the other of the two adjacent pixel areas, but the present invention is not limited thereto. For instance, the overlapping area of the fourth alignment region AN4 with respect to the first pixel area P11 may be larger or smaller than the overlapping area of the fourth alignment region AN4 with respect to the fourth pixel area P22.

Referring to FIG. 31C, when the first substrate 100 is combined with the second substrate 200, the liquid crystal layer 300 has alignment directions corresponding to the vector addition of the alignment directions of the first and second substrates 100 and 200. Thus, the liquid crystal layer 300 is divided into a plurality of domains in which the liquid crystal molecules are aligned corresponding to the vector addition of the alignment directions of the first and second alignment layer 120 and 200.

The domains may include a first domain DM1 where the first alignment region AN1 overlaps the third alignment region AN3, a second domain DM2 where the first alignment region AN1 overlaps the fourth alignment region AN4, a third domain DM3 where the second alignment region AN2 overlaps the third alignment region AN3, and a fourth domain DM4 where the second alignment region AN2 overlaps the fourth alignment region AN4.

In the first to fourth domains DM1 to DM4, the liquid crystal molecules are aligned in various directions that are different from each other. That is, the liquid crystal layer 300 has various directors that are different from each other in the first to fourth domains DM1 to DM4.

In detail, in the first domain DM1, the liquid crystal layer 300 is aligned in the fifth direction D5 defined as a vector addition of first and third directions D1 and D3, in the second domain DM2, the liquid crystal layer is aligned in the sixth direction D6 defined as a vector addition of first and fourth directions D1 and D4, in the third domain DM3, the liquid crystal layer is aligned in the seventh direction D7 defined as a vector addition of second and third directions D2 and D3, and in the fourth domain DM4, the liquid crystal layer is aligned in the eighth direction D8 defined as a vector addition of second and fourth directions D2 and D4. The fifth to eighth directions D5 to D8 are different from each other.

Each of the pixel areas P11, P12, P21 and P22 includes first to fourth domains DM1 to DM4. The first to fourth domains DM1 to DM4 are arranged as follows. In the first pixel area P11, the first to fourth domains DM1 to DM4 are aligned clockwise in the sequence of the first domain DM1, the third domain DM3, the fourth domain DM4 and the second domain DM2. In the second pixel area P12, the first to fourth domains DM1 to DM4 are aligned clockwise in the sequence of the third domain DM3, the first domain DM1, the second domain DM2 and the fourth domain DM4. In the third pixel area P21, the first to fourth domains DM1 to DM4 are aligned clockwise in the sequence of the second domain DM2, the fourth domain DM4, the third domain DM3 and the first domain DM1. In the fourth pixel area P22, the first to fourth domains DM1 to DM4 are aligned clockwise in the sequence of the fourth domain DM4, the second domain DM2, the first domain DM1 and the third domain DM3.

As mentioned above, the alignment direction of the first to fourth domains DM1 to DM4 are different from each other in the first to fourth pixel areas P11, P12, P21 and P22.

In the first and fourth pixel areas P11 and P22, the first to fourth domains DM1 to DM4 are sequentially rotated clockwise or counterclockwise. The pixel areas having the first to fourth domains DM1 to DM4 sequentially aligned clockwise or counterclockwise, such as the first and fourth pixel areas P11 and P22, will be referred to as rotation type pixel areas.

Different from the first and fourth pixel areas P11 and P22, the alignment direction of the first to fourth domains DM1 to DM4 of the second and third pixel areas P12 and P21 may not be sequentially rotated. In contrast, the alignment direction of the first domain DM1 faces the alignment direction of the fourth domain DM4 while being converged inward, or the alignment direction of the first domain DM1 is opposite to the alignment direction of the fourth domain DM4 while being diverged outward, in one pixel area. In addition, the alignment direction of the second domain DM2 and the alignment direction of the third domain DM3 face each other while being converged inward, or the alignment direction of the second domain DM2 and the alignment direction of the third domain DM3 are opposite to each other while being diverged outward, in one pixel area. Thus, the alignment direction of the liquid crystal molecules in the second and third pixel areas P12 and P21 is seen as being curved, but the alignment direction is directed to the first or second direction D1 or D2. The pixel areas having the first to fourth domains, in which alignment directions of the liquid crystal molecules are converged inward or diverged outward, such as the second and third pixel areas P12 and P21, will be referred to as convergent-divergent type pixel areas.

FIG. 32 is a plan view showing the LCD, in which the pixel areas of FIG. 31C are repeatedly aligned in the form of 3×5 matrix pattern.

Referring to FIG. 32, the first and second alignment regions AN1 and AN2 are aligned alternately with each other along the columns. In addition, the first and second alignment regions AN1 and AN2 may partially overlap two pixel areas adjacent to each other in the same row.

The third and fourth alignment regions AN3 and AN4 are aligned alternately with each other along the rows. In addition, the third and fourth alignment regions AN3 and AN4 may partially overlap two pixel areas adjacent to each other in the same column.

Thus, in the domains adjacent to each other in different pixel areas, the liquid crystal molecules are aligned in the same alignment direction.

Referring to FIG. 32, each of the pixel areas includes first to fourth domains DM1 to DM4, in which the alignment sequence of the first to fourth domains DM1 to DM4 in one pixel area is different from that of the adjacent pixel area.

In addition, the rotation type pixel areas and the convergent-divergent type pixel areas are alternately aligned with each other along the rows and the columns. Thus, if one pixel area is the rotation type pixel area, four pixel areas adjacent to each other in the row direction or the column direction are the convergent-divergent type pixel areas. In contrast, if one pixel area is the convergent-divergent type pixel area, four pixel areas adjacent to each other in the row direction or the column direction are the rotation type pixel areas.

Because an LCD having the above structure has a plurality of domains, which are aligned in various directions that are different from each other in one pixel area, a wide lateral visibility can be realized. In addition, a line-afterimage may be reduced in the LCD having the above structure.

The reason the line-afterimage may be reduced in the LCD having the structure shown in FIG. 32 is as follows.

In general, ionic impurities exist in the liquid crystal layer of the LCD. The ionic impurities may be from the process of manufacturing the LCD, or may be created after the LCD has been manufactured as a result of the electric field which is generated by electrodes provided at both ends of the liquid crystal layer. The latter cause of ionic impurities may be frequently found in pixel areas where the same gray scale is continuously displayed for a long time.

When voltage is applied to the electrodes of each pixel area, the ionic impurities migrate toward the electrodes due to the attractive force, so a leakage current is generated. Thus, the liquid crystal molecules positioned at the region where the leakage current is generated are misaligned as a result of the leakage current. The misalignment of the liquid crystal molecules lowers or increases the brightness of the region is as compared with other regions.

The migration of the ionic impurities may be influenced by the electric field, the shape of the liquid crystal molecules, and the alignment direction of the liquid crystal molecules. The ionic impurities can easily migrate at the edge of the electric field because the influence of the electric field may be minimized at the edge of the electric field. Thus, the ionic impurities can easily migrate at the edge of the electric field by the attractive force without being influenced by the electric field.

In addition, the ionic impurities can easily migrate in the long-axis direction of the liquid crystal molecules as compared with the short-axis direction of the liquid crystal molecules. In addition, if the liquid crystal molecules are aligned in the same direction at the adjacent regions, the ionic impurities can easily migrate between the adjacent pixel areas.

However, according to exemplary embodiment, the liquid crystal molecules are aligned in various directions that are different from each other in each domain of one pixel area. In addition, the alignment sequence of the liquid crystal molecules in the domains of one pixel area is different from that of other pixels adjacent to the one pixel area in such a manner that the alignment directions of the liquid crystal molecules may not match with each other or may not be symmetrical to each other. Thus, the migration of the ionic impurities can be reduced so that the line-afterimage caused by the ionic impurities can be reduced.

Table 1 shows test results for the line-afterimage in an LCD according to the related art and an LCD according to an exemplary embodiment.

The LCD according to the related art was provided with rotation type pixel areas, so adjacent pixel areas were also prepared as the rotation type pixel areas. In addition, the LCD according to the exemplary embodiment was prepared with rotation type pixel areas and convergent-divergent type pixel areas, which were aligned alternately with each other similar to the ninth exemplary embodiment described above.

In table 1, the "gray scale representing the afterimage" refers to the gray scale at which the afterimage occurs when the voltage is applied to the extent that the same gray scale is realized on the entire surface of the screen after the afterimage pattern is applied to the LCD for a predetermined period of time under the same conditions. The gray scale ranges from 0 G to 225 G, in which G represents the gray level. In addition, 0 G indicates black color, 255 G indicates white color and 1 G to 254 G indicate gray color. In table 1, the afterimage is reduced in the LCD as the gray scale representing the afterimage has a lower gray level.

TABLE 1

| Alignment layer (afterimage pattern application time) | Gray scale representing line-afterimage in LCD of related art | Gray scale representing line-afterimage in LCD of present invention |
|---|---|---|
| First alignment layer (504 hours) | 180 G | 160 G |
| Second alignment layer (24 hours) | 180 G | 92 G |
| Third alignment layer (96 hours) | 240 G | 220 G |

Referring to table 1, the LCD according to the ninth exemplary embodiment can reduce the afterimage as compared with the LCD according to the related art.

Table 2 shows test results for the length of time at which the line-afterimage is caused in the LCD according to the related art and the LCD according to an exemplary embodiment. In this test, the voltage is applied so that the same gray scale is realized on the entire surface of the screen under the same conditions of the Table 1.

TABLE 2

| Alignment layer | Time causing line-afterimage in LCD of related art | Time causing line-afterimage in LCD of present invention |
|---|---|---|
| First alignment layer | 268 hour | 336 hour |

Referring to table 2, the length of time before a line-afterimage is seen is delayed in the LCD according to the ninth exemplary embodiment as compared with the LCD according to the related art.

Hereinafter, the LCD according to a tenth exemplary embodiment will be described. The following description of a tenth exemplary embodiment will be focused on the differences with respect to the ninth exemplary embodiment in order to avoid redundancy. In addition, details of the elements that have been described in the ninth exemplary embodiment will be omitted and the same reference numerals will be assigned to the same elements.

Figure 33:
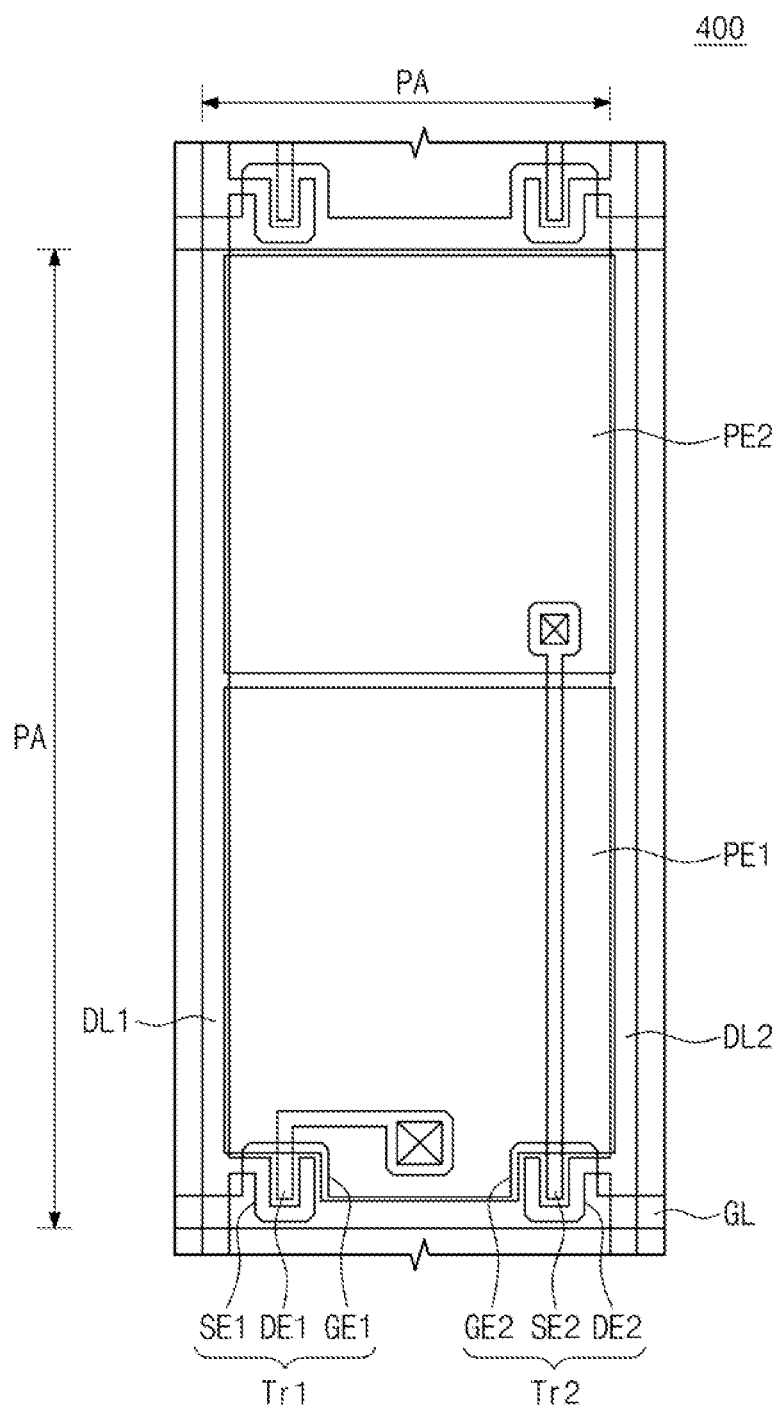
FIG. 33 is an enlarged plan view showing a part of an LCD according to a tenth exemplary embodiment.

FIG. 33 is an enlarged plan view showing a part of an LCD according to a tenth exemplary embodiment. LCD 400 is provided with a plurality of the pixel areas PA having the same structures in the form of matrix, however, only one pixel area PA is illustrated in FIG. 33 for the purpose of convenience of explanation.

Referring to FIG. 33, a tenth exemplary embodiment is similar to the ninth exemplary embodiment except that the pixel electrode of each pixel area PA is divided into first and second sub-pixel electrodes PE1 and PE2, and first and second thin film transistors Tr1 and Tr2 and first and second data lines DL1 and DL2 are provided corresponding to the first and second sub-pixel electrodes PE1 and PE2.

Each pixel area is provided with the gate line GL, the first data line DL1, a second data line DL2, the first and second thin film transistors Tr1 and Tr2, and the first and second sub-pixel electrodes PE1 and PE2.

The gate line GL extends in the first direction. The first and second data lines DL1 and DL2 extend in the other direction while crossing the gate line GL.

The first thin film transistor Tr1 is provided adjacent to an intersection between the gate line GL and the first data line DL1. The first thin film transistor Tr1 includes a first gate electrode GE1 branching off from the gate line GL, a first source electrode SE1 branching off from the first data line DL1, and a first drain electrode DE1 spaced apart from the first source electrode SE1.

The second thin film transistor Tr2 is provided adjacent to an intersection between the gate line GL and the second data line DL2. The second thin film transistor Tr2 includes a second gate electrode GE2 branching off from the gate line GL, a second source electrode SE2 branching off from the second data line DL2, and a second drain electrode DE2 spaced apart from the second source electrode SE2.

The first and second sub-pixel electrodes PE1 and PE2 are provided between the first and second data lines DL1 and DL2.

The first sub-pixel electrode PE1 is connected to the first drain electrode DE1 through a contact hole. The second sub-pixel electrode PE2 is also connected to the second drain electrode DE2 through a contact hole. The first and second sub-pixel electrodes PE1 and PE2 receive two voltages having different voltage level from each other for the same gray scale through the first and second thin film transistors Tr1 and Tr2, respectively.

Figure 34:
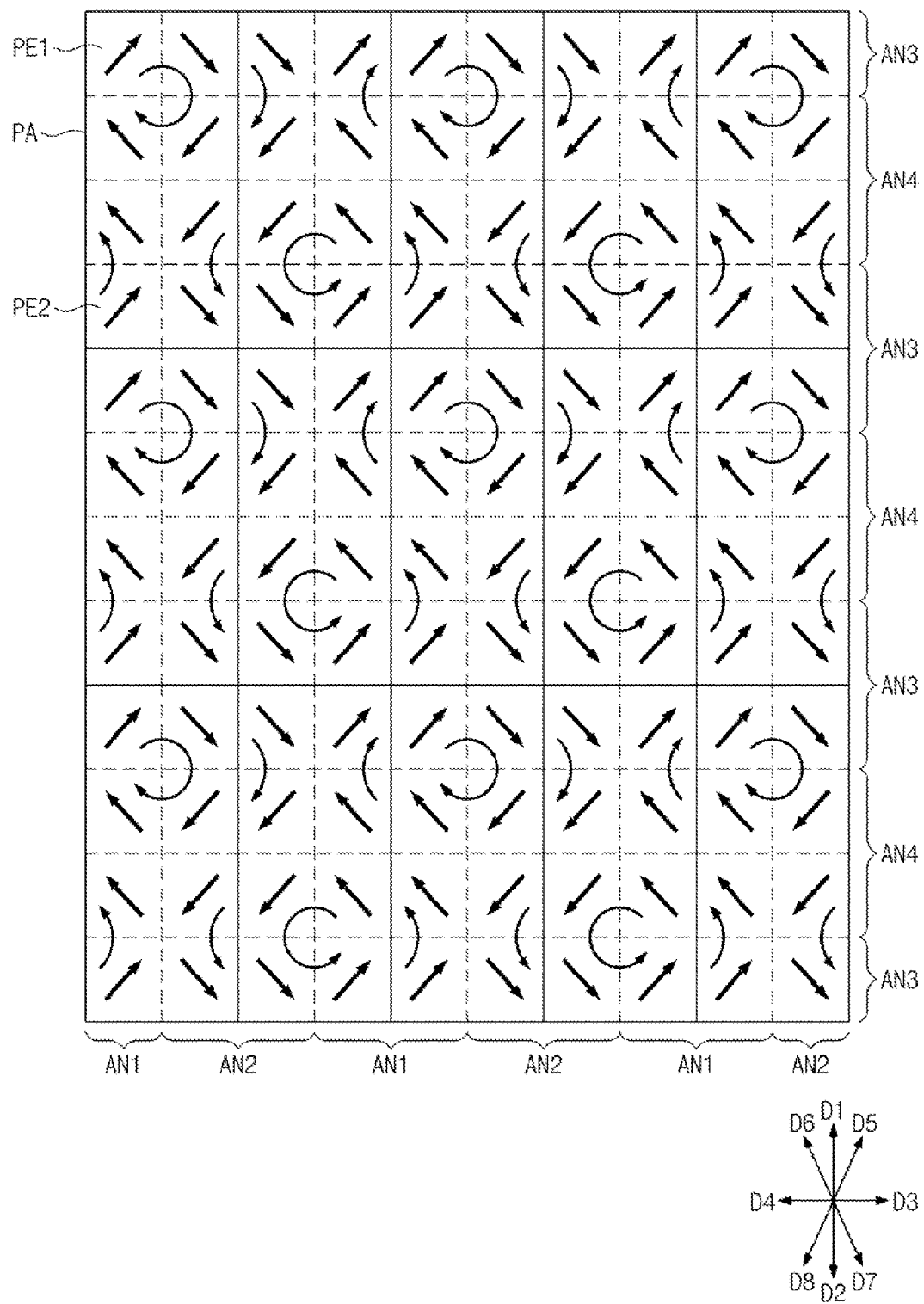
FIG. 34 is a plan view, which is similar to FIG. 32, showing an LCD, in which pixel areas of FIG. 31C are repeatedly aligned in a 3×5 matrix pattern.

FIG. 34 is a plan view, which is similar to FIG. 32, showing an LCD, in which pixel areas are repeatedly aligned in a 3×5 matrix pattern.

Referring to FIG. 34, the first and second alignment regions AN1 and AN2 are aligned alternately with each other along the columns. In addition, the first and second alignment regions AN1 and AN2 may partially overlap two pixel areas adjacent to each other in the same row. The third and fourth alignment regions AN3 and AN4 are aligned alternately with each other along the rows. In addition, the third and fourth alignment regions AN3 and AN4 may partially overlap two pixel areas adjacent to each other in the column direction. For instance, the third alignment region AN3 overlaps the second sub-pixel electrode PE2 provided in one of the two sub-pixel areas adjacent to each other in the column direction, and overlaps the first sub-pixel electrode PE1 provided in the other of the two sub-pixel areas adjacent to each other in the column direction. In addition, the fourth alignment region AN4 overlaps the second sub-pixel electrode PE2 provided in one of the two sub-pixel areas adjacent to each other in the column direction and overlaps the first sub-pixel electrode PE1 provided in the other of the two sub-pixel areas adjacent to each other in the column direction.

In addition, each of the sub-pixel areas includes first to fourth domains DM1 to DM4, in which the alignment sequence of the first to fourth domains DM1 to DM4 in one pixel area is different from that of the adjacent pixel areas. In addition, the rotation type pixel areas and the convergent-divergent type pixel areas are alternately aligned with each other in the row and column directions. Thus, if one pixel area is the rotation type pixel area, four pixel areas adjacent to the rotation type pixel area in the row direction or the column direction are the convergent-divergent type pixel areas. In contrast, if one pixel area is the convergent-divergent type pixel area, four pixel areas adjacent to the convergent-divergent type pixel area in the row direction or the column direction are the rotation type pixel areas.

Because the LCD having the above structure can adjust the alignment direction of the liquid crystal layer 300 while presenting the same gray scale by the first and second sub-pixel electrodes PE1 and PE2, the lateral visibility of the LCD can be improved. In addition, because the first and second sub-pixel electrodes PE1 and PE2 correspond to the different alignment regions in one pixel area, the mobility of ionic impurities can be reduced. The ionic impurities exist in the liquid crystal layer of the LCD. The ionic impurities may easily migrate at the edge of the electric filed. However, because the gap between the first and second sub-pixel electrodes PE1 and PE2 corresponds to the gap between the third and fourth alignment regions AN3 and AN4, the alignment direction of the liquid crystal layer 300 is different at this region, so that the ionic impurities may not easily migrate.

According to the present exemplary embodiment, the first and second sub-pixel electrodes PE1 and PE2 are aligned in the column direction, but the embodiments are not limited thereto. The number and shape of the sub-pixel electrodes can be variously changed and the sub-pixel electrodes can be aligned in various directions. For instance, the first and second sub-pixel electrodes PE1 and PE2 can be aligned in the row direction. Further, the first sub-pixel electrode PE1 can be divided into two sub-pixel electrodes PE1. In this case, the second sub-pixel electrode PE2 is provided between the two sub-pixel electrodes PE1.

Although the exemplary embodiments have been described, it is understood that the present invention should not be limited to these exemplary embodiments but various changes and modifications can be made by one ordinary skilled in the art within the spirit and scope of the present disclosure.

For instance, although the pixel area has been illustrated as a rectangular shape, the pixel area may have various shapes. In addition, the number and the shape of the pixel electrodes can be variously changed.

What is claimed is:
1. A liquid crystal display comprising:
a first substrate comprising a plurality of pixel electrodes, each pixel electrode corresponding to one of a plurality of pixel areas;
a second substrate comprising a common electrode facing the pixel electrodes;
a first alignment layer disposed on the first substrate and comprising a first region aligned in a first direction, a second region aligned in a second direction different from the first direction;
a second alignment layer disposed on the second substrate and comprising a third region aligned in a third direction different from the first and second directions, and a fourth region aligned in a fourth direction different from the first to third directions; and a liquid crystal layer comprising liquid crystal molecules interposed between the first and second substrates, wherein the liquid crystal molecules are aligned in different directions in each of a plurality of domains in the liquid crystal layer, the domains defined in each pixel area by the first to fourth regions of the first and second alignment layers, wherein each pixel electrode comprises an extension part extending in at least one of the first to fourth directions at a portion of the pixel electrode corresponding to at least one of the domains.

2. The liquid crystal display of claim 1, wherein each of the first and second alignment layers comprises polymer materials that undergo one of decomposition, dimerization, and isomerization reactions when irradiated with light, the domains comprise a first domain defined as an overlapping area of the first and third regions, a second domain defined as an overlapping area of the first and fourth regions, a third domain defined as an overlapping area of the second and third regions, and a fourth domain defined as an overlapping area of the second and fourth regions, and the liquid crystal molecules are aligned in the first domain in a fifth direction defined as a vector addition of first and third directions, aligned in the second domain in a sixth direction defined as a vector addition of first and fourth directions, aligned in the third domain in a seventh direction defined as a vector addition of second and third directions, and aligned in the fourth domain in an eighth direction defined as a vector addition of second and fourth directions.

3. The liquid crystal display of claim 2, wherein, when the fifth direction, sixth direction, seventh direction and eight direction are sequentially rotated counterclockwise, the extension part of each pixel electrode comprises a first extension part extending outward in the third direction at a portion of the pixel electrode corresponding to the first domain, a second extension part extending outward in the first direction at a portion of the pixel electrode corresponding to the second domain, a third extension part extending outward in the second direction at a portion of the pixel electrode corresponding to the third domain, and a fourth extension part extending outward in the fourth direction at a portion of the pixel electrode corresponding to the fourth domain.

4. The liquid crystal display of claim 2, wherein, when the fifth direction, sixth direction, seventh direction and eight direction are sequentially rotated clockwise, the extension part of each pixel electrode comprises a first extension part extending outward in the first direction at a portion of the pixel electrode corresponding to the first domain, a second extension part extending outward in the fourth direction at a portion of the pixel electrode corresponding to the second domain, a third extension part extending outward in the third direction at a portion of the pixel electrode corresponding to the third domain, and a fourth extension part extending outward in the second direction at a portion of the pixel electrode corresponding to the fourth domain.

5. The liquid crystal display of claim 2, wherein, when the fifth direction faces the eighth direction, the extension part of each pixel electrode comprises a first extension part extending outward in the first direction at a portion of the pixel electrode corresponding to the second domain, a second extension part extending outward in the fourth direction at a portion of the pixel electrode corresponding to the second domain, a third extension part extending outward in the second direction at a portion of the pixel electrode corresponding to the third domain, and a fourth extension part extending outward in the third direction at a portion of the pixel electrode corresponding to the third domain.

6. The liquid crystal display of claim 2, wherein, when the sixth direction is opposite to the seventh direction, the extension part of each pixel electrode comprises a first extension part extending outward in the first direction at a portion of the pixel electrode corresponding to the first domain, a second extension part extending outward in the third direction at a portion of the pixel electrode corresponding to the first domain, a third extension part extending outward in the second direction at a portion of the pixel electrode corresponding to the fourth domain, and a fourth extension part extending outward in the fourth direction at a portion of the pixel electrode corresponding to the fourth domain.

7. The liquid crystal display of claim 1, wherein the first alignment layer covers the pixel electrode and the second alignment layer layer covers the common electrode, wherein the first direction is opposite to the second direction, the third direction is substantially perpendicular to the first direction, and the fourth direction is opposite to the third direction.

8. The liquid crystal display of claim 7, wherein each pixel electrode comprises first and second sub-pixel electrodes, which receive voltages different from each other for a same gray scale, and the extension part extends in at least one of the first to fourth directions from each of the first and second sub-pixel electrodes at portions of each of the first and second sub-pixel electrodes corresponding to at least one of the domains.

9. The liquid crystal display of claim 8, wherein the domains of the first and second sub-pixel electrodes comprise a first domain defined as an overlapping area of the first and third regions, a second domain defined as an overlapping area of the first and fourth regions, a third domain defined as an overlapping area of the second and third regions, and a fourth domain defined as an overlapping area of the second and fourth regions, and the liquid crystal molecules are aligned in the first domain in a fifth direction defined as a vector addition of first and third directions, aligned in the second domain in a sixth direction defined as a vector addition of first and fourth, aligned in the third domain in a seventh direction defined as a vector addition of second and third directions, and aligned in the fourth domain in an eighth direction defined as a vector addition of second and fourth directions.

10. The liquid crystal display of claim 9, wherein, when the fifth direction, sixth direction, seventh direction and eighth direction are sequentially rotated counterclockwise, the extension part of each of the first and second sub-pixel electrodes comprises a first extension part extending outward in the third direction at a portion of each of the first and second sub-pixel electrodes corresponding to the first domain, a second extension part extending outward in the first direction at a portion of each of the first and second sub-pixel electrodes corresponding to the second domain, a third extension part extending outward in the second direction at a portion of each of the first and second sub-pixel electrodes corresponding to the third domain, and a fourth extension part extending outward in the fourth direction at a portion of each of the first and second sub-pixel electrodes corresponding to the fourth domain.

11. The liquid crystal display of claim 10, wherein the first substrate further comprises a plurality of data lines extending in the first direction and aligned in the third direction and a plurality of gate lines extending in the third direction and aligned in the first direction, and the first and second sub-pixel electrodes are adjacent to each other in the first direction.

12. The liquid crystal display of claim 11, wherein each pixel is provided between two adjacent data lines, and the first and second extension parts of each of the first and second sub-pixel electrodes overlap with the two adjacent data lines, respectively.

13. The liquid crystal display of claim 9, wherein, when the fifth direction, sixth direction, seventh direction and eighth direction are sequentially rotated clockwise, the extension part of each of the first and second sub-pixel electrodes comprises a first extension part extending outward in the first direction at a portion of each of the first and second sub-pixel electrodes corresponding to the first domain, a second extension part extending outward in the fourth direction at a portion of each of the first and second sub-pixel electrodes corresponding to the second domain, a third extension part extending outward in the third direction at a portion of each of the first and second sub-pixel electrodes corresponding to the third domain, and a fourth extension part extending outward in the second direction at a portion of each of the first and second sub-pixel electrodes corresponding to the fourth domain.

14. The liquid crystal display of claim 9, wherein, when the fifth direction faces the eighth direction, the extension part of each of the first and second sub-pixel electrodes comprises a first extension part extending outward in the first direction at a portion of each of the first and second sub-pixel electrodes corresponding to the second domain, a second extension part extending outward in the fourth direction at a portion of each of the first and second sub-pixel electrodes corresponding to the second domain, a third extension part extending outward in the second direction at a portion of each of the first and second sub-pixel electrodes corresponding to the third domain, and a fourth extension part extending outward in the third direction at a portion of each of the first and second sub-pixel electrodes corresponding to the third domain.

15. The liquid crystal display of claim 9, wherein, when the sixth directions is opposite to the seventh direction, the extension part of each of the first and second pixel electrodes comprises a first extension part extending outward in the first direction at a portion of each of the first and second sub-pixel electrodes corresponding to the first domain, a second extension part extending outward in the third direction at a portion of each of the first and second sub-pixel electrodes corresponding to the first domain, a third extension part extending outward in the second direction at a portion of each of the first and second sub-pixel electrodes corresponding to the fourth domain, and a fourth extension part extending outward in the fourth direction at a portion of each of the first and second sub-pixel electrodes corresponding to the third domain.

16. The liquid crystal display of claim 8, wherein each pixel area further comprises a first transistor connected to the first sub-pixel electrode and a second transistor connected to the second sub-pixel electrode, the first and second sub-pixel electrodes are adjacent to each other in the first direction, and the first and second transistors are provided between the first and second sub-pixel electrodes.

17. The liquid crystal display of claim 16, wherein the first substrate further comprises a plurality of data lines extending in the first direction and aligned in the third direction and a plurality of gate lines extending in the third direction and aligned in the first direction, and the first and second transistors are connected to a same data line and a same gate line.

18. The liquid crystal display of claim 16, wherein the first substrate further comprises a plurality of data lines extending in the first direction and aligned in the third direction and a plurality of gate lines extending in the third direction and aligned in the first direction,
each pixel area is provided between two adjacent data lines, and
the first transistor of each pixel area is connected to one of the two data lines and the second transistor is connected to a remaining one of the two data lines.

19. The liquid crystal display of claim 8, wherein the second sub-pixel electrode comprises two electrode parts spaced apart from each other by a predetermined distance in the first direction while being electrically connected to each other, and the first sub-pixel electrode is provided between the two electrode parts.

20. The liquid crystal display of claim 1, wherein the second substrate further comprises a black matrix, and the extension part of each pixel electrode partially overlaps the black matrix.

21. A liquid crystal display comprising:
a first substrate comprising a plurality of pixels;
a second substrate facing the first substrate; and
a liquid crystal layer comprising liquid crystal molecules interposed between the first and second substrates,
wherein each pixel comprises a plurality of domains, within each domain the liquid crystal molecules are aligned in substantially the same direction, and the direction the liquid crystal molecules are aligned is different for each domain,
wherein at least one of the first and second substrates comprises a light blocking layer positioned at a boundary between one or more of the domains, and an end of the light blocking layer is chamfered in a direction substantially parallel to the direction the liquid crystal molecules are aligned in one of the two domains adjacent to each other about the light blocking layer.

22. The liquid crystal display of claim 21, wherein the first substrate comprises a pixel electrode provided in each pixel and a storage interconnection part overlapping with the pixel electrode, and the light blocking layer extends from the storage interconnection part.

23. The liquid crystal display of claim 21, wherein the first substrate comprises a pixel electrode provided in each pixel and a storage interconnection part overlapping with the pixel electrode, and the light blocking layer is spaced apart from the storage interconnection part by a predetermined distance.

24. The liquid crystal display of claim 21, wherein the pixel comprises a first sub-pixel and a second sub-pixel, the second sub-pixel is charged with a voltage lower than a voltage charged in the first sub-pixel, the first sub-pixel comprises a first sub-pixel electrode divided into first to fourth domains, and the second sub-pixel comprises a second sub-pixel electrode divided into first to fourth domains.

25. The liquid crystal display of claim 24, wherein the directions the liquid crystal molecules are aligned in the first to fourth domains of each of the first and second sub-pixels are sequentially rotated counterclockwise.

26. The liquid crystal display of claim 25, wherein the light blocking layer faces the first sub-pixel electrode, a first end of the light blocking layer is positioned at a boundary between the first and second domains and chamfered in the direction the liquid crystal molecules in the second domain are aligned, and a second end of the light blocking layer is positioned at a boundary between the third and fourth domains and chamfered in the direction the liquid crystal molecules in the third domain are aligned.

27. The liquid crystal display of claim 25, wherein the first sub-pixel electrode comprises a first extension part extending from the first domain and a second extension part extending from the forth domain, and the second sub-pixel electrode comprises a third extension part extending from the first domain and a fourth extension part extending from the fourth domain.

28. The liquid crystal display of claim 27, wherein the first and second sub-pixel electrodes are provided between first and second data lines adjacent to each other, the first and second extension parts of the first sub-pixel electrode overlap the first and second data lines, respectively, and third and fourth extension parts of the second sub-pixel electrode overlap the first and second data lines, respectively.

29. The liquid crystal display of claim 28, wherein the first and second data lines are bent four times in one pixel.

30. The liquid crystal display of claim 24, wherein the directions the liquid crystal molecules in the first to fourth domains of the first sub-pixel are aligned are different from directions the liquid crystal molecules in the first to fourth domains of the second sub-pixel are aligned.

31. The liquid crystal display of claim 30, wherein the first sub-pixel electrode comprises a fifth extension part extending from the second domain and a sixth extension part extending from the third domain, and the second sub-pixel electrode comprises a third extension part extending from the first domain and a fourth extension part extending from the fourth domain.

32. The liquid crystal display of claim 31, wherein the first and second sub-pixel electrodes are provided between first and second data lines adjacent to each other, the fifth and sixth extension parts of the first sub-pixel electrode overlap the first and second data lines, respectively, and third and fourth extension parts of the second sub-pixel electrode overlap the first and second data lines, respectively.

33. The liquid crystal display of claim 32, wherein the first and second data lines are bent two times in one pixel.

34. The liquid crystal display of claim 21, further comprising:
a first alignment layer formed on the first substrate and comprising, in each pixel, a first region aligned in a first direction and a second region aligned in a second direction different from the first direction; and
a second alignment layer formed on the second substrate while facing the first alignment layer.

35. The liquid crystal display of claim 34, wherein each of the first and second alignment layers comprise polymer materials, which undergo one of decomposition, dimerization, and isomerization reactions when irradiated with light.

36. A liquid crystal display comprising:
a first base substrate comprising a plurality of pixel areas having a plurality of columns and rows;
pixel electrodes provided in the pixel areas;
a first alignment layer covering the pixel electrodes and comprising a plurality of first alignment regions extending along the columns and aligned in a first direction, and a plurality of second alignment regions extending along the columns and alternating with the first alignment region;
a second base substrate facing the first base substrate;
a common electrode formed on the second base substrate while facing the pixel electrodes;
a second alignment layer covering the common electrode and comprising a plurality of third alignment regions extending along the rows and aligned in a third direction perpendicular to the first direction, and a plurality of fourth alignment regions extending along the rows and alternating with the third alignment regions, the fourth alignment regions aligned in a fourth direction opposite to the third direction; and
a liquid crystal layer comprising liquid crystal molecules interposed between the first and second alignment layers,
wherein, when viewed in a plan view, the first and second alignment regions partially overlap two pixel areas adjacent to each other in a same row, respectively, and the third and fourth alignment regions partially overlap two pixel areas adjacent to each other in a same column.

37. The liquid crystal display of claim 36, wherein the liquid crystal layer comprises a first domain defined as an overlapping area of the first and third regions, a second domain defined as an overlapping area of the first and fourth regions, a third domain defined as an overlapping area of the second and third regions, and a fourth domain defined as an overlapping area of the second and fourth regions, and wherein alignment directions of the liquid crystal molecules are different from each other in the first to fourth domains.

38. The liquid crystal display of claim 37, wherein alignment directions of liquid crystal molecules in two domains, which are adjacent to each other and aligned in different pixel areas, are identical to each other.

39. The liquid crystal display of claim 37, wherein the liquid crystal molecules are aligned in a fifth direction defined as a vector addition of first and third directions in the first domain, aligned in a sixth direction defined as a vector addition of first and fourth directions in the second domain, aligned in a seventh direction defined as a vector addition of second and third directions in the third domain, and aligned in an eighth direction defined as a vector addition of second and fourth directions in the fourth domain.

40. The liquid crystal display of claim 39, wherein each pixel area comprises the first to fourth domains, and a sequence of alignment directions in the first to fourth domains in one pixel area is different from a sequence of alignment directions in the first to fourth domains in other pixel areas adjacent to the one pixel area.

41. The liquid crystal display of claim 40, wherein, if pixel areas where the alignment directions of the liquid crystal molecules in the first to fourth domains are sequentially rotated clockwise or counterclockwise are referred to as rotation type pixel areas and pixel areas where the alignment direction of the liquid crystal molecules in the first domain is opposite to or faces the alignment direction of the liquid crystal molecules in the fourth domain or the alignment direction of the liquid crystal molecules in the second domain is opposite to or faces the alignment direction of the liquid crystal molecules in the third domain are referred to as convergent-divergent type pixel areas, the rotation type pixel areas and the convergent-divergent type pixel areas are alternately arranged in row and column directions.

42. The liquid crystal display of claim 37, wherein an overlapping area between each pixel area and the first alignment region is identical to an overlapping area between each pixel area and the second alignment region.

43. The liquid crystal display of claim 42, wherein an overlapping area between each pixel area and the third alignment region is identical to an overlapping area between each pixel area and the fourth alignment region.

44. The liquid crystal display of claim 42, wherein an overlapping area between each of the first to fourth alignment regions and one of two adjacent pixel areas is different from an overlapping area between each of the first to fourth alignment regions and remaining one of two adjacent pixel areas.

45. The liquid crystal display of claim 37, further comprising a plurality of gate lines extending in an extension direction of the row and aligned in an extension direction of the column on the first base substrate and a plurality of data lines extending in the extension direction of the column and aligned in the extension direction of the row on the first base substrate.

46. The liquid crystal display of claim 45, wherein each pixel area further comprises a thin film transistor connected to one of the gate lines and one of the data lines, and the thin film transistor is connected to a corresponding pixel electrode.

47. The liquid crystal display of claim 45, wherein each pixel electrode is provided between two adjacent data lines and comprises first and second sub-pixel electrodes receiving voltages different from each other for a same gray scale.

48. The liquid crystal display of claim 47, wherein each pixel area further comprises a first thin film transistor connected to one of the gate lines and one of the two adjacent data lines and a second thin film transistor connected to one of the gate lines and remaining one of the two adjacent data lines, the first sub-pixel electrode is connected to the first thin film transistor, and the second sub-pixel electrode is connected to the second sub-pixel electrode.

49. The liquid crystal display of claim 47, wherein the first and second sub-pixel electrodes provided in each pixel area extend in the extension direction of the column, the first sub-pixel electrode overlaps one of the first and second alignment regions, and the second sub-pixel electrode overlaps remaining one of the first and second alignment regions.

50. The liquid crystal display of claim 47, wherein the first sub-pixel electrode overlaps one of the third and fourth alignment regions, and the second sub-pixel electrode overlaps remaining one of the third and fourth alignment regions.

51. A liquid crystal display comprising:
a plurality of pixels,
wherein each pixel comprises:
a first base substrate comprising four sub-pixel areas in a 2×2 matrix;
sub-pixel electrodes provided in the sub-pixel areas;
a first alignment layer covering the sub-pixel electrodes and comprising first and second alignment regions aligned in opposite directions to each other;
a second base substrate facing the first base substrate;
a common electrode formed on the second base substrate while facing the sub-pixel electrodes;
a second alignment layer covering the common electrode and comprising third and fourth alignment regions aligned in opposite directions to each other and in perpendicular directions to the first and second alignment regions; and
a liquid crystal layer interposed between the first and second alignment layers,
wherein the second alignment regions are provided between the first alignment regions while partially overlapping with two sub-pixel areas adjacent to each other in a same row, and the fourth alignment regions are provided between the third alignment regions while partially overlapping with two sub-pixel areas adjacent to each other in a same column.

52. The liquid crystal display of claim 51, wherein the liquid crystal layer comprises a plurality of domains, each including liquid crystal molecules aligned in different directions different from each other along two alignment regions, which correspond to each other when viewed in a plan view.

53. The liquid crystal display of claim 52, wherein, when viewed in a plan view, the liquid crystal layer of each sub-pixel area comprises a first domain defined as an overlapping area of the first and third regions, a second domain defined as an overlapping area of the first and fourth regions, a third domain defined as an overlapping area of the second and third regions, and a fourth domain defined as an overlapping area of the second and fourth regions.

* * * * *